United States Patent
Hayama

(10) Patent No.: US 6,532,078 B2
(45) Date of Patent: Mar. 11, 2003

(54) SPLIT IMAGE-FORMING METHOD AND DEVICE AND SPLIT IMAGE-PRINTING METHOD AND DEVICE FOR TAPE PRINTING APPARATUS

(75) Inventor: Hitoshi Hayama, Siojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/177,778

(22) Filed: Oct. 23, 1998

(65) Prior Publication Data

US 2002/0075502 A1 Jun. 20, 2002

(30) Foreign Application Priority Data

Nov. 27, 1997 (JP) .............................................. 9-344244

(51) Int. Cl.[7] .............................................. G06K 15/00
(52) U.S. Cl. ...................... 358/1.15; 358/1.12; 358/1.18
(58) Field of Search ................. 358/1.1–1.9, 1.11–1.18; 345/619–641, 721–724, 788–801; 347/16, 41, 101–107, 153, 157

(56) References Cited

U.S. PATENT DOCUMENTS

| | | | | |
|---|---|---|---|---|
| 5,551,785 A | * | 9/1996 | Mori et al. ..................... 400/76 |
| 5,795,086 A | * | 8/1998 | Watanabe et al. ......... 400/615.2 |
| 5,873,110 A | * | 2/1999 | Toyosawa et al. ........... 707/518 |
| 5,887,997 A | * | 3/1999 | Watanabe et al. ......... 400/615.2 |
| 5,947,619 A | * | 9/1999 | Kurashina et al. ........ 400/615.2 |
| 5,967,679 A | * | 10/1999 | Beadman et al. ......... 400/615.2 |
| 6,062,750 A | * | 5/2000 | Ueno et al. ............... 400/615.2 |
| 6,134,016 A | * | 10/2000 | Watanabe et al. ............. 358/1.1 |

FOREIGN PATENT DOCUMENTS

JP            63162256            7/1988

* cited by examiner

*Primary Examiner*—Gabriel Garcia
*Assistant Examiner*—King Y. Poon
(74) *Attorney, Agent, or Firm*—Hogan & Hartson, LLP

(57) ABSTRACT

There are provided a split image-forming method and device for dividing a basic image comprised of m lines of character string images and a background image including at least one of an outer frame and a background pattern and having the m lines of character string image arranged therein, into n image split images, as well as a split image-printing method and device for printing the split images. On condition that it is determined that the width of the basic image is larger than the width of the tape, and at the same time all of the widths of the m lines of the character string images are each smaller than the width of the tape, the width of the basic image is allocated to n split image widths representative of respective widths of n split images including m split images containing the m lines of character string images, respectively, to thereby divide the basic image into the n split images in a manner such that the m lines of character images can be separately printed on the tape without splitting any of the lines.

10 Claims, 20 Drawing Sheets

SPLIT IMAGE-FORMING METHOD AND DEVICE AND SPLIT IMAGE-PRINTING METHOD AND DEVICE FOR TAPE PRINTING APPARATUS

BACKGROUND OF THE INVENTION

1. Field of the Invention

This invention relates to a tape printing apparatus for printing print images comprised of inputted characters, symbols, figures and their combinations on tapes so as to obtain printed labels or the like, and more particularly to a tape printing apparatus which splits a print image larger in width than a tape width into split images, for printing.

2. Prior Art

In a typical tape printing apparatus for producing labels and the like, the dot number of a print image in the direction of the width thereof is limited by a tape width and the print resolution with respect to the tape width. That is, the maximum printable width of a print image is limited to a tape width. On the other hand, there has been proposed a tape printing apparatus which is capable of printing a character string (e.g. of horizontal writing) comprised of enlarged characters with sizes in the direction of the width of the tape (e.g. with character heights in horizontal writing) n times as large as those of standard characters printable within the width of a tape mounted in the apparatus, by splitting the character string into n portions and allocating the n portions to n tapes, respectively (see Japanese Laid-Open Patent Publication (Kokai) No. 63-162256).

The proposed tape printing apparatus is used for producing a so-called transfer tape on which is printed an image subjected to pressure-sensitive transfer printing. For instance, assuming that n=two, to facilitate registration of the upper half of a character with the lower half of the same, no lower margin is provided when the upper half of the character is printed, no upper margin is provided when the lower half of the character is printed. Further, when n is not an integer, e.g. when n=1.5, a second tape to be printed has a lower half thereof printed as a blank space.

However, the above tape printing apparatus for producing transfer tapes can only set the proportion of an image element representative of a character string comprised of characters, such as letters and symbols, so that it is impossible for the apparatus to form and print a print image including a desired background image, such as an outer frame and a background pattern. Further, when the print image has a width larger than a tape width, a character string image has to be split at an intermediate portion thereof for printing, and hence, if the apparatus is used for creating labels, when printed strips of the tape are cut off and affixed to a desired place (affixing area) such that corresponding side edges thereof meet each other, a background color or the like of the affixing area can be viewed through a gap undesirably formed between the printed tape strips, or connecting portions of outlines of respective characters can be displaced together, resulting in unattractive appearance of the combined label.

SUMMARY OF THE INVENTION

It is a first object of the invention to provide a split image-forming method and device for a tape printing apparatus, which are capable of forming a plurality of split images each printable on a tape as an element forming a print (basic) image which is larger in width than a tape and has character string images arranged in a background image including an outer frame and a background pattern, and more particularly, a method and device of the above kinds for forming attractive split images when the split images are connected to each other after they are printed.

It is a second object of the invention to provide a split image-printing method and device for a tape printing apparatus, which are capable of printing split images formed by the above split image-forming method and device.

To attain the first object, according to a first aspect of the invention, there is provided a method of forming split images to be printed on a tape by a tape printing apparatus, the method comprising the steps of:

detecting a basic image width D0 representative of a width of a basic image which contains m (m is an integer equal to or larger 1) lines of character string images and a background image including at least one of an outer frame and a background pattern and having the m lines of character string images arranged therein;

detecting provisional split image widths PRD(j)(j is an integer from 1 to m) each representative of a width of each of the m lines of character string images;

determining whether or not the basic image width D0 is larger than a tape image width W representative of a width of the tape, and at the same time all of the provisional split image widths PRD(j) are each smaller than the tape image width W; and dividing the basic image width D0 into n (n is an integer larger than 1, and at the same time m≦n) split image widths D(i) (i is an integer from 1 to n, provided that D(i)≦W and a sum total ΣD(i)=D0) representative of respective widths of n split images including m split images containing the m lines of character string images, respectively, on condition that it is determined that the basic image width D0 is larger than the tape image width W, and at the same time the all of the provisional split image widths PRD(j) are each smaller than the tape image width W, to thereby divide the basic image into the n split images in a manner such that the m lines of character images can be separately printed on the tape without splitting any of the lines.

To attain the first object, according to a second aspect of the invention, there is provided a split image-forming device for forming split images to be printed on a tape by a tape printing apparatus, comprising:

a first detecting section for detecting a basic image width D0 representative of a width of a basic image which contains m (m is an integer equal to or larger 1) lines of character string images and a background image including at least one of an outer frame and a background pattern and having the m lines of character string images arranged therein;

a second detecting section for detecting provisional split image widths PRD(j) (j is an integer from 1 to m) each representative of a width of each of the m lines of character string images;

a determining section for determining whether or not the basic image width D0 is larger than a tape image width W corresponding to a real tape width as a width of the tape, and at the same time all of the provisional split image widths PRD(j) are each smaller than the tape image width W; and a dividing section for dividing the basic image width D0 into n (n is an integer larger than 1, and at the same time m≦n) split image widths D(i) (i is an integer from 1 to n, provided that $D(i) \leq W$ and a sum total $\Sigma D(i)=D0$) representative of respective widths of n split images including m split images containing the m lines of character string images, respectively, on condition that it is determined that the basic image width D0 is larger than the tape image width W, and at the same time the all of the provisional split image widths PRD(j) are each smaller than the tape image width W, to thereby divide the basic image into the n split images in a manner such that the m lines of character images can be separately printed on the tape without splitting any of the lines.

According to these method and device, the basic image width D0 of the basic image which has m lines ($1 \leq m$) of character string images arranged on a background image is divided into the n ($1 < n$, $m \leq n$) split image widths $D(i)$ ($i=1$ to n, where $D(i) \leq W$, the sum total $\Sigma D(i)=D0$) including m split image widths corresponding to the m lines, to thereby split the basic image into n split images having the respective n split image widths $D(i)$. In this process, it is only required that the basic image width D0 is larger than the tape image width W, and at the same time each of the provisional split image widths PRD(j) (j=1 to m) of the m character string images arranged therein is smaller than the tape image width W.

For instance, in the case of m=1, assuming that the width of a background image portion located above or below a character string image is added to the provisional split image width PRD(j) (j=1) of the one line of the character string image, if the sum is smaller than the tape image width W, the width including the width of the background image portion can be set to the split image width D(1), while the split image width of the other background image portion can be set to the split image width D(2), whereby two (n=2) split images can be formed.

On the other hand, when the sum becomes larger than the tape image width W, the width of an upper background image portion, the width of the character string image and the width of a lower background image portion are set to respective split image widths $D(i)$ (i=1 to 3), whereby it is possible to form three (n=3) split images separately from each other. In the above process, when the split image width of at least one of the upper and lower background image portions is larger than the tape image width W, the background image portion is further split to thereby form four or more ($n \geq 4$) split images.

Furthermore, in the case of m=2, for instance, assuming that the width of an upper background image portion is added to the width (provisional split image width PRD(1)) of a first line of character string image and the width (provisional split image width PRD(2)) of a lower background image is added to the width of a second line of character string image, if each resulting image width is smaller than the tape image width W, it is possible to create two (n=2) split images having a split image width D(1) and a split image width D(2), respectively. If any resulting image width becomes larger than the tape image width W when the width of an adjacent background image is added to the width of each character string image, it is only required to increase the split number n, similarly to the above case where m=1. Furthermore, in the case of m>2, the same process as above can be carried out.

In any of the above cases, the split image widths $D(i)$ (i=1 to n) of the n split images including the m split images containing the respective m lines of character string images are each smaller than the tape image width W and hence each split image can be printed on the real tape L.

Therefore, according to the tape printing apparatus having the split image-forming method and device applied thereto, it is possible to print each line of character string image without splitting the same at an intermediate portion thereof simply by sequentially printing the above m split images. That is, each line of character string image can be printed without splitting the same, even if the basic image width D0 of the basic image as a whole is larger than the tape image width W. Hence, it is possible to further prevent a juncture of connected split images from being conspicuously formed than when split character images are printed and connected to each other.

As a result, according to the split image-forming method and device, it is possible to form a plurality of split images separately printable on respective strips of tape as elements forming the whole print (basic) image which is larger in width than the tape and has character string images arranged in a background image including an outer frame and a background pattern, and more particularly, to form attractive split images when the split images are connected to each other after the split images are separately printed. It should be noted that in the above split image-forming method and device, a basic image may be split into n split images after creating the basic image or n split images may be directly formed or created.

Preferably, the basic image is represented by basic image data, and the n split images are represented by respective split image data items, and the method includes the step of storing the basic image data in a storage device, and the step of storing the split image data items in the storage device.

Preferably, the basic image is represented by basic image data, and the n split images are represented by respective split image data items, and where the split image-forming device includes a storage device for storing the basic image data and the split image data items.

According to these preferred embodiments, the basic image data representative of the basic image and the n split image data items representative of the respective split images can be stored in the storage device, whereby it is possible to split the basic image into split images by reading the basic image data from the storage device, and store the split image data items representative of the split images in the storage device.

It should be noted that throughout the specification, the width (including "image width" and "dot width") of an image represented by an image data item will be also simply referred to as the width (including "image width" and "dot width") of the image data item.

Preferably, the tape image width W represents a real tape width L as the width of the tape in terms of a number of dots, the basic image width D0, the provisional split image width PRD(j), the split image width D(i) being also each defined in terms of a number of dots.

Preferably, the method includes the step of setting the real tape width L.

Preferably, the split image-forming device includes a tape width-setting section for setting the real tape width L.

According to these preferred embodiments, by setting the real tape width, it is possible to split the basic image into split images for being suitably printed on separate strips of the tape having a particular tape width.

It is further preferred that the tape width is automatically detected from a tape set in the tape printing apparatus.

Preferably, the method includes the step of creating the basic image.

Preferably, the split image-forming device includes a basic image-creating section for creating the basic image.

According to these preferred embodiments, it is possible to first creating the basic image, and then split the created basic image into split images.

Preferably, the method includes the step of adding an image width of an image formed by only part of the background image to one of the provisional split image widths PRD(j) representative of a width of one of the character string images adjacent to the image to thereby set one of the split image widths D(j) representative of a width of one of the split images containing the one of the character string images.

Preferably, the split image-forming device includes an adding section for adding an image width of an image formed by only part of the background image to one of the provisional split image widths PRD(j) representative of a width of one of the character string images adjacent to the image to thereby set one of the split image widths D(j) representative of a width of one of the split images containing the one of the character string images.

According to these preferred embodiments, it is possible to form a split image in which an image not including any character string image, such as a portion of the outer frame included in the background image, is added to the character string image, whereby it is possible to prevent the basic image from being split into unnecessarily small-sized images and thereby make the combined image of the split images attractive in appearance, which is formed when the tape strips on which the split images are printed are affixed to an affixing area.

To attain the first object, according to a third aspect of the invention, there is provided a method of forming split images to be printed on a tape by a tape printing apparatus, the method comprising the steps of:

storing a background image which has a provisional basic image width F0 and includes at least one of an outer frame and a background pattern;

assuming that m (m is an integer equal to or larger than 1) character string images having respective m provisional image widths F(j) (j is an integer from 1 to m) each representative of a width of a corresponding one of the character string images are arranged in the background image, calculating n (n is an integer equal to or larger than m) provisional split image widths F(i) (i is an integer from 1 to n, provided that a sum total $\Sigma F(i)=F0$ representative of respective widths of n split images, the n provisional split image widths F(i) including the m provisional image widths F(j), and a maximum provisional split image width F(k) (k is an integer from 1 to n) of the n provisional split image widths F(i);

setting a real tape width L as a width of the tape;

determining a ratio G ($G \leq W/F(k)$) based on which each of the split images should be increased or decreased in size in a manner such that one of the split images having the maximum provisional split image width F(k) can be arranged within a tape image width W representative of the real tape width L; and dividing the background image into n split background images each having a split image width D(i) (provided that $D(i)=G \times F(i)$ and a sum total $\Sigma D(i)=D0$) representative of a width of a corresponding one of the n split background images, based on the ratio G, and at the same time arranging the character string images in respective corresponding ones of the split background images based on the ratio G, to thereby form n split images each having the split image width D(i).

To attain the first object, according to a fourth aspect of the invention, there is provided a split image-forming device for forming split images to be printed on a tape by a tape printing apparatus, comprising:

a storage device for storing a background image which has a provisional basic image width F0 and includes at least one of an outer frame and a background pattern;

a calculating section for, assuming that m (m is an integer equal to or larger than 1) character string images having respective m provisional image widths F(j) (j is an integer from 1 to m) each representative of a width of a corresponding one of the character string images are arranged in the background image, calculating n (n is an integer equal to or larger than m) provisional split image widths F(i) (i is an integer from 1 to n, provided that a sum total $\Sigma F(i)=F0$) representative of respective widths of n split images, the n provisional split image widths F(i) including the m provisional image widths F(j), and a maximum provisional split image width F(k) (k is an integer from 1 to n) of the n provisional split image widths F(i);

a tape width-setting section for setting a real tape width L as a width of the tape;

a ratio-determining section for determining a ratio G ($G \leq W/F(k)$) based on which each of the split images should be increased or decreased in size in a manner such that one of the split images having the maximum provisional split image width F(k) can be arranged within a tape image width W representative of the real tape width L; and a split image-forming section for dividing the background image into n split background images each having a split image width D(i) (provided that $D(i)=G \times F(i)$ and a sum total $\Sigma D(i)=D0$) representative of a width of a corresponding one of the n split background images, based on the ratio G, and at the same time arranging the character string images in respective corresponding ones of the split background images based on the ratio G, to thereby form n split images each having the split image width D(i).

According to the split image-forming method and device, assuming that each of the m character string images is arranged as it is in the background image having a provisional basic image width F0, n ($m \leq n$) provisional split image widths F(i) (i=1 to n, where the sum total $\Sigma F(i)=F0$) including m provisional split image widths F(j) (j=1 to m) each having one of the character string images arranged therein, and the maximum provisional split image width F(k) (k is equal to any of numerals from 1 to n) are determined. That is, assuming that without changing the size of stored background image data, the m character string images are arranged in the background image, provisional split image widths F(i) of the m split images each including a character string image, and provisional split image widths F(i) of (n−m) split images each having only a background image therein, and the maximum provisional split image width F(k) of the provisional split image widths F(i) are determined.

Next, the ratio G for adjusting the size of a split image having the maximum provisional split image width F(k) within the tape image width W printable within the real tape width L is determined.

That is, if a background image portion and a character string image forming each split image are developed at the ratio G , each of the n split images can be arranged in the tape image width W. In other words, each of the split images increased or decreased in size can be printed within the real tape width L. Therefore, according to the split image-forming method and device, the background image and each character string image are increased/decreased in size at the ratio G, whereby it is possible to produce n split images each printable within the real tape width L.

This makes it possible for the tape printing apparatus having the split image-forming method and device applied thereto to each line of character string image without splitting the same, thereby preventing a juncture of split images joined to each other from becoming conspicuous.

Therefore, according to the split image-forming method and device, it is possible to create n split images each printable on a tape, as elements forming a print (basic) image which is larger in width than a tape and has character string images arranged in a background image including an outer frame and a background pattern, and more particularly to form split images with excellent appearance even when connected to each other after the split images are printed. Further, if the i-th split images are each printed immediately after being produced to thereby carry out the printing operation n times, only one split image item representing each i-th split image is required for each printing operation during the above process, so that the capacity of the memory device can be saved. Moreover, the creation and printing of split images can be carried out in parallel with each other to create and print the split images one after another, thereby enhancing processing speed of the apparatus.

Preferably, the tape image width W represents the real tape width L in terms of a number of dots, the provisional basic image width F0, the provisional split image width F(j), the provisional split image width F(i), the maximum provisional split image width F(k), and the split image width D(i) being also each defined in terms of a number of dots.

Preferably, the background image is represented by background image data, and the n split images are represented by respective split image data items, and the method includes the step of storing the background image data in a storage device and the step of storing the split image data items in the storage device.

Preferably, the background image is represented by background image data, and the n split images are represented by respective split image data items, and the storage device stores the background image in the form of the background image data and the split images in the form of the split image data items.

Preferably, the method according to each of the first and third aspects of the invention further includes an actual print image-forming step of allocating at least one of the split image width D(i) and a split margin image width E(i)(E(i)= W−D(i)) representative of a width of a margin, in each of n image areas each having the tape image width W, and assigning an i-th split image of the split images to an area having the split image width D(i) within a corresponding one of the n image areas, to thereby produce n actual print images each having the tape image width W.

Preferably, the split image-forming device according to each of the second and fourth aspects of the invention further includes an actual print image-forming section for allocating at least one of the split image width D(i) and a split margin image width E(i)(E(i)=W−D(i)) representative of a width of a margin, in each of n image areas each having the tape image width W, and assigning an i-th split image of the split images to an area having the split image width D(i) within a corresponding one of the n image areas, to thereby produce n actual print images each having the tape image width W.

According to these preferred embodiments, there are produced n actual print images each having the tape image width W and including one of the n split images forming basic image. The tape image width W of each actual print image corresponds to the real tape width L and hence when split image is to be printed on a tape, the printing operation can be started from a side edge of the tape. That is, according to the tape printing apparatus having the split image-forming method and device applied thereto, n actual print images are sequentially printed, whereby the n split images can be easily printed. Further, if the actual print image data representative of the actual print image is stored, the user can repeat the same printing operation as desired, without carrying out another basic image-splitting process on subsequent occasions. In this embodiment, the tape image width W of each actual print image corresponds in size to the real tape width L and hence, when a split image is to be printed on a tape, the printing operation can be started from the side edge of the tape. That is, according to the tape printing apparatus having the split image-forming method and device applied thereto, by printing the n actual print images in sequence, the n split images can be easily printed. Further, if the actual print image data is stored, the user can repeat the same printing operation as desired, without carrying out another basic image data-splitting process on a subsequent occasion.

Preferably, the actual print image-forming step includes assigning the split margin image width E(i) to at least one of an upper margin position and a lower margin position where adjacent ones of the actual print images overlap, when the i-th split image is connected to at least one of an (i−1)-th split image and an (i+1)-th split image in the direction of a width thereof.

Preferably, the actual print image-forming section includes an assigning section for assigning the split margin image width E(i) to at least one of an upper margin position and a lower margin position where adjacent ones of the actual print images overlap, when the i-th split image is connected to at least one of an (i−1)-th split image and an (i+1)-th split image in the direction of a width thereof.

According to these preferred embodiments, the split margin image widths E(i) are assigned to at least one of an upper margin position and a lower margin position where adjacent ones of actual print images overlap, when the i-th split image and at least one of an (i−1)-th split image and an (i−1)-th split image are connected to each other in the direction of the width thereof. That is, the tape printing apparatus having the split image-forming method and device applied thereto can sequentially print n actual print images, and the split images can be connected to each other by using respective split overlap widths R(i) of printed strips of the tape, which correspond in position and size to the split margin image widths E(i), as overlap margins. Further, in the above process, split images are connected to each other by using the overlap margins, so that it is possible to prevent a ground color of an affixing area from being viewed through a gap between connected split images, thereby producing more attractive labels or the like.

To attain the second object, according to a fifth aspect of the invention, there is provided a method of printing split images on a tape by a tape printing apparatus, comprising the steps of:

detecting a basic image width D0 representative of a width of a basic image which contains m (m is an integer equal to or larger 1) lines of character string images and a background image including at least one of an outer frame and a background pattern and having the m lines of character string images arranged therein;

detecting provisional split image widths PRD(j)(j is an integer from 1 to m) each representative of a width of each of the m lines of character string images;

determining whether or not the basic image width D0 is larger than a tape image width W corresponding to a real tape width as a width of the tape, and at the same time all of the provisional split image widths PRD(j) are each smaller than the tape image width W; and dividing the basic image width D0 into n (n is an integer larger than 1, and at the same time m≦n) split image widths D(i) (i is an integer from 1 to n, provided that D(i) ; W and a sum total ΣD(i)=D0) representative of respective widths of n split images including m split images containing the m lines of character string images, respectively, on condition that it is determined that the basic image width D0 is larger than the tape image width W, and at the same time the all of the provisional split image widths PRD(j) are each smaller than the tape image width W, to thereby divide the basic image into the n split images in a manner such that the m lines of character images can be separately printed on the tape without splitting any of the lines; and a printing step of allocating at least one of a split printing width T(i) corresponding to the split image width D(i) and a split overlap width R(i)(R(i)=L−T(i)) as a width of a margin, in the real tape width L, to thereby print the n split images on the tape separately from each other by correlating an i-th split image of the n split images to a split printing area having the split printing width T(i)on the tape.

To attain second object, according to a sixth aspect of the invention, there is provided a method of printing split images on a tape by a tape printing apparatus, comprising: the steps of:

storing a background image which has a provisional basic image width F0 and includes at least one of an outer frame and a background pattern;

assuming that m (m is an integer equal to or larger than 1) character string images having respective m provisional image widths F(j) (j is an integer from 1 to m) each representative of a width of a corresponding one of the character string images are arranged in the background image, calculating n (n is an integer equal to or larger than m) provisional split image widths F(i) (i is an integer from 1 to n, provided that a sum total ΣF(i)=F0) representative of respective widths of n split images, the n provisional split image widths F(i) including the m provisional image widths F(j), and a maximum provisional split image width F(k) (k is an integer from 1 to n) of the n provisional split image widths F(i);

setting a real tape width L as a width of the tape;

determining a ratio G (G≦W/F(k)) based on which each of the split images should be increased or decreased in size in a manner such that one of the split images having the maximum provisional split image width F(k) can be arranged within a tape image width W representative of the real tape width L; and dividing the background image into n split background images each having a split image width D(i) (provided that D(i)=G×F(i) and a sum total ΣD(i)=D0) representative of a width of a corresponding one of the n split background images, based on the ratio G, and at the same time arranging the character string images in respective corresponding ones of the split background images based on the ratio G, to thereby form n split images each having the split image width D(i); and a printing step of allocating at least one of a split printing width T(i) corresponding to the split image width D(i) and a split overlap width R(i)(R(i)=L−T(i)) as a width of a margin, in the real tape width L, to thereby print the n split images on the tape separately from each other by correlating an i-th split image of the n split images to a split printing area having the split printing width T(i)on the tape.

To attain the second object, according to a seventh aspect of the invention, there is provided a split image-printing device for a tape printing apparatus, which prints split images on a tape, comprising:

a first detecting section for detecting a basic image width D0 representative of a width of a basic image which contains m (m is an integer equal to or larger 1) lines of character string images and a background image including at least one of an outer frame and a background pattern and having the m lines of character string images arranged therein;

a second detecting section for detecting provisional split image widths PRD(j) (j is an integer from 1 to m) each representative of a width of each of the m lines of character string images;

a determining section for determining whether or not the basic image width D0 is larger than a tape image width W corresponding to a real tape width as a width of the tape, and at the same time all of the provisional split image widths PRD(j) are each smaller than the tape image width W; and a dividing section for dividing the basic image width D0 into n (n is an integer larger than 1, and at the same time m≦n) split image widths D(i) (i is an integer from 1 to n, provided that D(i)≦W and a sum total ΣD(i)=D0) representative of respective widths of n split images including m split images containing the m lines of character string images, respectively, on condition that it is determined that the basic image width D0 is larger than the tape image width W, and at the same time the all of the provisional split image widths PRD(j) are each smaller than the tape image width W, to thereby divide the basic image into the n split images in a manner such that the m lines of character images can be separately printed on the tape without splitting any of the lines; and a printing device for allocating at least one of a split printing width T(i) corresponding to the split image width D(i) and a split overlap width R(i)(R(i)=L−T(i)) as a width of a margin, in the real tape width L, to thereby print the n split images on the tape separately from each other by correlating an i-th split image of the n split images to a split printing area having the split printing width T(i)on the tape.

To attain the second object, according to an eighth aspect of the invention, there is provided a split image-printing device for a tape printing apparatus, which prints split images on a tape, comprising:

a storage device for storing a background image which has a provisional basic image width F0 and includes at least one of an outer frame and a background pattern;

a calculating section for, assuming that m (m is an integer equal to or larger than 1) character string images having respective m provisional image widths F(j) (j is an integer from 1 to m) each representative of a width of a corresponding one of the character string images are arranged in the background image, calculating n (n is an integer equal to or larger than m) provisional split image widths F(i) (i is an integer from 1 to n, provided that a sum total ΣF(i)=F0) representative of respective widths of n split images, the n provisional split image widths F(i) including the m provisional image widths F(j), and a maximum provisional split image width F(k) (k is an integer from 1 to n) of the n provisional split image widths F(i);

a tape width-setting section for setting a real tape width L as a width of the tape;

a ratio-determining section for determining a ratio G (G≦W/F(k)) based on which each of the split images should be increased or decreased in size in a manner such that one of the split images having the maximum provisional split image width F(k) can be arranged within a tape image width W representative of the real tape width L; and a split image-forming section for dividing the background image into n split background images each having a split image width D(i) (provided that D(i)=G×F(i) and a sum total ΣD(i)=D0) representative of a width of a corresponding one of the n split background images, based on the ratio G, and at the same time arranging the character string images in respective corresponding ones of the split background images based on the ratio G, to thereby form n split images each having the split image width D(i); and a printing device for allocating at least one of a split printing width T(i) corresponding to the split image width D(i) and a split overlap width R(i)(R(i)=L−T(i)) as a width of a margin, in the real tape width L, to thereby print the n split images on the tape separately from each other by correlating an i-th split image of the n split images to a split printing area having the split printing width T(i)on the tape.

These methods and devices are comprised of each split image-forming method and device and each printing process and device for printing split images, described above, respectively, so that it is possible to obtain the advantageous effects obtained when the split image-forming method and device are applied to a tape printing apparatus. Further, according to these split image-printing method and device, at least either split printing widths T(i) or split overlap widths R(i) are allocated in the real tape width L, and an i-th split image is printed in a split printing area having the split printing width T(i), whereby it is possible to suitably print n split images in the split printing area.

Preferably, the printing step includes assigning the split margin width R(i) to at least one of a top overlap margin position and a bottom overlap margin position for use in connecting an i-th split image printed the tape to at least one of an (i−1)-th split image printed immediately before printing the i-th split image and an (i+1)-th split image printed immediately after printing the i-th split image in the direction of a width of the tape.

Preferably, the printing device includes an assigning section for assigning the split margin width R(i) to at least one of a top overlap margin position and a bottom overlap margin position for use in connecting an i-th split image printed the tape to at least one of an (i−1)-th split image printed immediately before printing the i-th split image and an (i+1)-th split image printed immediately after printing the i-th split image in the direction of a width of the tape.

According to these preferred embodiments, each of the split overlap widths R(i) is assigned to at least one of a top overlap margin position and a bottom overlap margin position, such that an i-th split image-printed portion of the real tape having the i-th split image printed thereon can be connected to at least one of an (i−1)-th split image printed immediately before printing the i-th split image and an (i+1)-th split image printed immediately after printing the i-th split image in the direction of the width of each real tape. This enables a label or the like to be produced simply by printing split images and thereafter connecting the printed split images to each other by using an area to which each split overlap width R(i) is assigned as the width of an overlap margin. Further, since split images are connected to each other by using overlap margins, it is possible to prevent a ground color of an affixing area from being viewed through a gap between connected split images. thereby producing more attractive labels or the like.

Preferably, the method according to each of the fifth and sixth aspects of the invention further includes an actual print image-forming step of allocating at least one of the split image width D(i) and a split margin image width E(i)(E(i)= W−D(i)) representative of a width of a margin, in each of n image areas each having the tape image width W, and assigning an i-th split image of the split images to an area having the split image width D(i) within a corresponding one of the n image areas, to thereby produce n actual print images each having the tape image width W; and the printing step includes printing the n actual print images on the tape separately from each other.

Preferably, the split image-printing device according to each of the seventh and eight aspects of the invention further includes an actual print image-forming section for allocating at least one of the split image width D(i) and a split margin image width E(i)(E(i)=W−D(i)) representative of a width of a margin, in each of n image areas each having the tape image width W, and assigning an i-th split image of the split images to an area having the split image width D(i) within a corresponding one of the n image areas, to thereby produce n actual print images each having the tape image width W, and the printing device includes means for printing the n actual print images on the tape separately from each other.

According to these preferred embodiments, it is possible to obtain the same advantageous effects described above concerning the actual split image-forming step and the actual split image-forming section of the respective split image-forming method and device.

The above and other objects, features, and advantages of the invention will become more apparent from the following detailed description taken in conjunction with the accompanying drawings.

DETAILED DESCRIPTION

The invention will now be described in detail with reference to the drawings showing embodiments thereof. In these embodiments, a method and a device for forming split images and a method and a device for printing split images according to the invention are applied to a tape printing apparatus.

Figure 1:
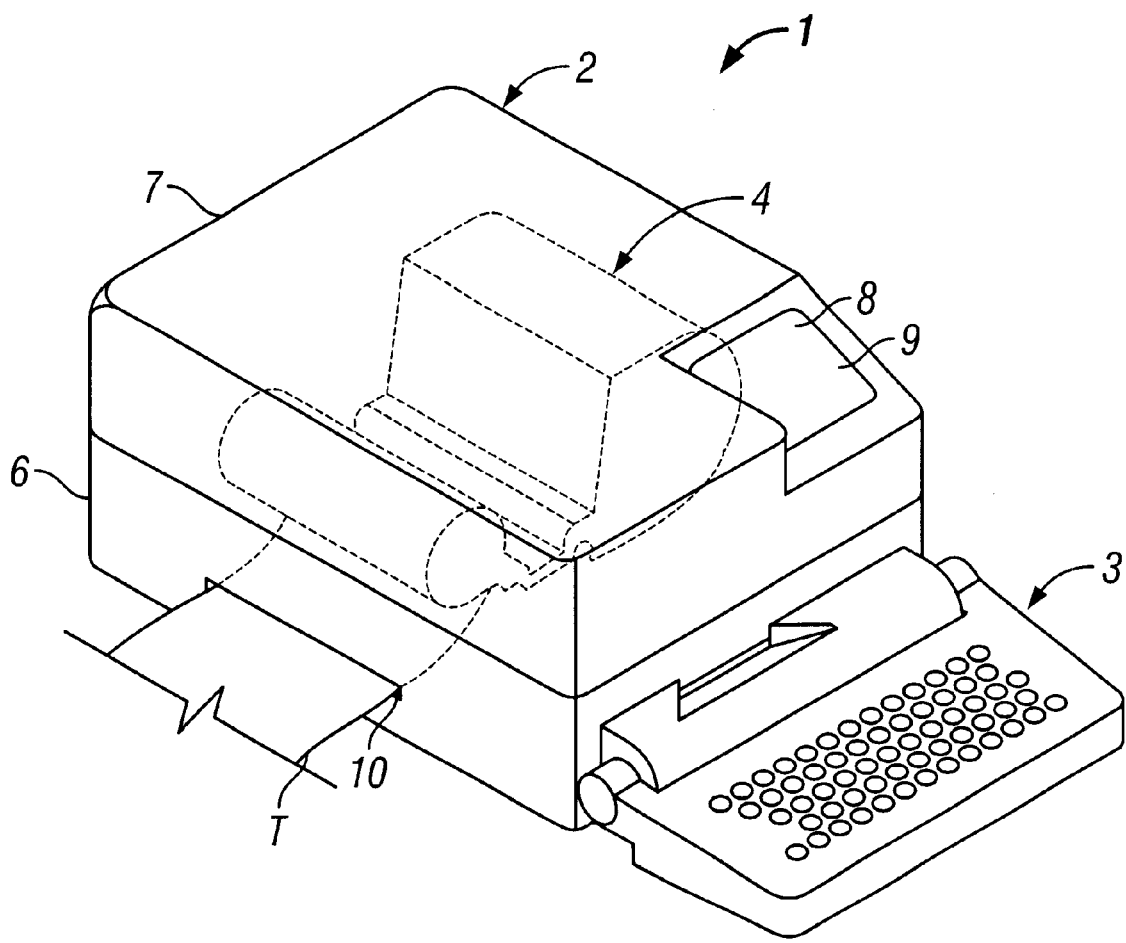
FIG. 1 is a perspective view of an appearance of a tape printing apparatus according to an embodiment of the invention.
Figure 2:
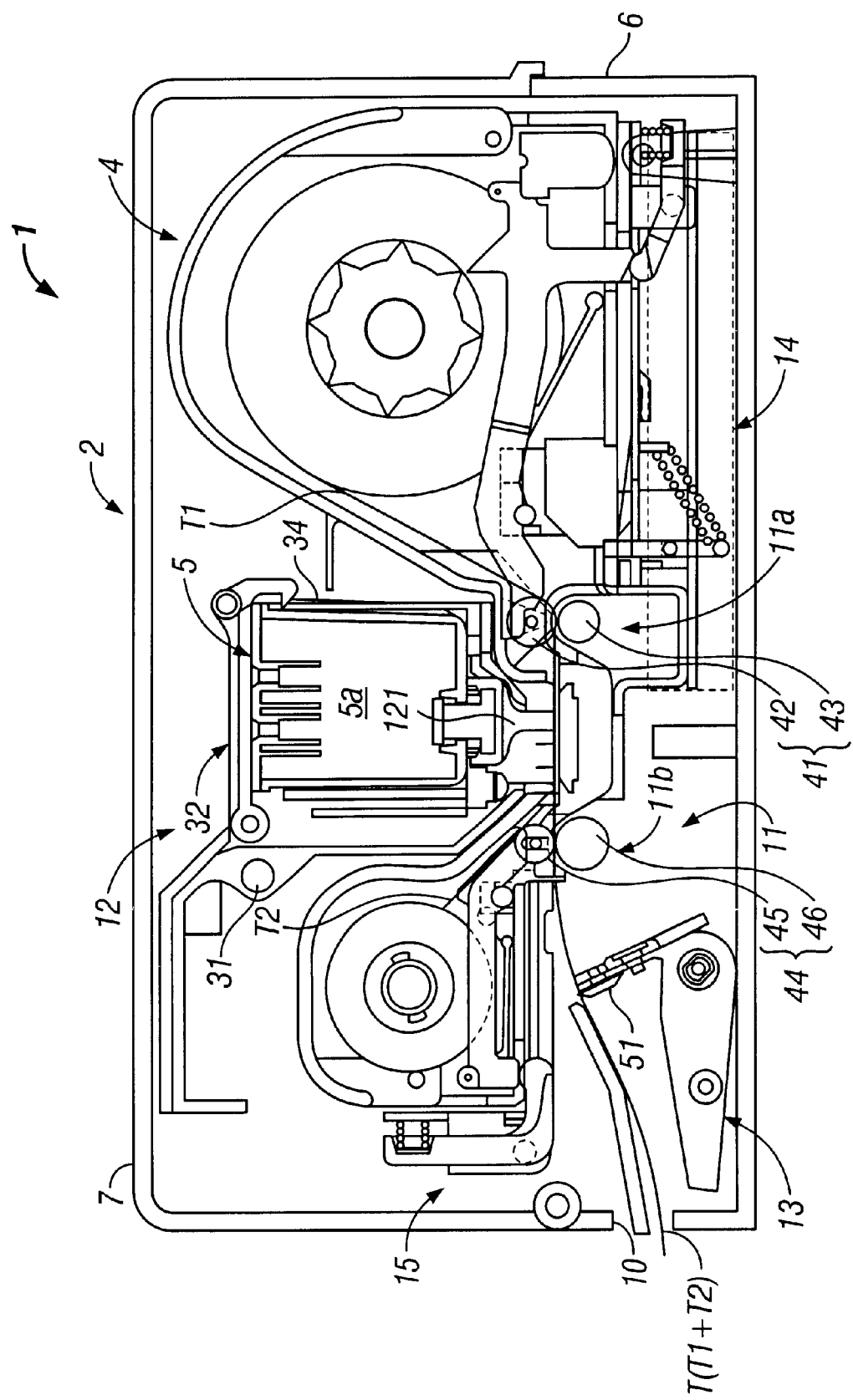
FIG. 2 is a cross-sectional view of a body of the FIG. 1 tape printing apparatus.

FIG. 1 is a perspective view of an appearance of the tape printing apparatus and FIG. 2 is a cross-sectional view of a body of the tape printing apparatus. The tape printing apparatus 1 is capable of carrying out color printing of a print image on a printing tape T1 by an ink jet printing method as well as cutting off the printed portion or strip of the printing tape T1 to thereby produce a label. The print image is formed according to entered desired characters and the like.

Further, not only the printing tape T1 but also a laminating tape T2 is mounted in the tape printing apparatus 1, whereby it is possible to affix the laminating tape T2 to the printed portion of the printing tape T1 and thereafter cut the printing tape T1 and the laminating tape T2 in the laminated state, thereby producing a laminated label. Hereinafter, a type formed of the printing tape T1 alone and a type formed of both the printing tape T1 and the laminating tape T2 will be generically referred to as "the tape T".

The printing tape T1 is comprised of a substrate tape, an adhesive layer coated on a underside surface of the substrate tape and a peel-off paper tape affixed to the adhesive layer. The substrate tape is formed of a material which is capable of readily absorbing ink, such as paper, paper with a coated layer or a film with a coated layer. The adhesive layer is used for affixing a printing tape T1 as a label to an object article, such as a file and the like, while the peel-off paper tape is used for preventing dust or dirt from depositing on the adhesive layer.

On the other hand, the laminating tape T2 is comprised of a substrate tape and an adhesive layer coated on a underside surface of the substrate tape. The substrate tape is formed of a transparent film having a thickness of approximately 16 to 38 $\mu$m. The printing tape T1 and the laminating tape T2 are fabricated to have substantially identical widths and affixed to each other in a manner such that lateral sides thereof are aligned one upon the other. Actually, the laminating tape T2 has a slightly smaller width (by approximately 0.3 mm) than the printing tape T2 such that slight lateral displacement of the laminating tape T2 can be accommodated when the same is affixed to the printing tape T1.

There are provided several kinds (approximately 10 kinds) of tape T having various tape widths (approximately 4.5 to 96 mm), each of which is supplied in a state received in a tape cartridge 4 therefor. A print image having a resolution of 24 to 1024 dots in the direction of the width thereof is printed on the printing tape T in a manner dependent on the width thereof. It should be noted that there are provided still other tapes T which are different in material or have background colors other than white and that it is possible to use at least several tens of kinds of tape T including ones to be adopted in the future.

The tape cartridges 4 are classified into a type which can load both a printing tape T1 and a laminating tape T2 therein (see FIG. 3) and a type which can load only a printing tape T1 therein. Each of the two types includes three kinds of tape cartridges i.e. "Large", "Medium" and "Small" cartridges, which are different in height, i.e. width of tapes contained.

Referring to FIGS. 1 and 2, the tape printing apparatus 1 is comprised of a body 2, a keyboard 3 mounted on a front-side portion of the body 2, a tape cartridge 4 accommodating the tape T (the printing tape T1 and the laminating tape T2) and an ink cartridge 5 filled with inks of four colors. The tape cartridge 4 and the ink cartridge 5 are removably loaded in the body 2.

The body 2 includes an apparatus casing 6. The upper part of the apparatus casing 6 is in the form of a lid 7 which can be opened and closed for loading and removing the tape cartridge 4 and the ink cartridge 5. The apparatus casing 6 has a side wall formed with a tape exit 10 in the form of a slit via which the tape T is delivered out of the apparatus.

Inside the apparatus casing 6 there are mounted a tape feed block 11 for feeding the tape T (the printing tape T1 and the laminating tape T2) and affixing the laminating tape T2 to the printing tape T1, a printer block 12 for carrying out color printing on the printing tape T1, a cutting block 13 for cutting off the tape T, a latching mechanism 15 for setting the tape cartridge 4 in the tape printing apparatus, and a circuit board 14.

On the circuit board 14 are mounted not only batteries, such as nicad batteries, and a power supply unit, but also circuits of a control block 200, described hereinafter, for controlling respective blocks in the tape printing apparatus 1 (see FIG. 4).

The printer block 12 includes a carriage guide shaft 31 having opposite ends thereof supported by a frame, not shown, a carriage 32 slidably mounted on the carriage guide shaft 31, a timing belt, not shown, traveling in normal and reverse directions for reciprocating the carriage 32 rightward and leftward (in the direction of the width of the tape T), a carriage motor (CR motor) 122, not shown, for causing the timing belt to travel in the normal and reverse directions.

At lower and upper portions of the carriage 32 there are mounted an ink jet head 121 for printing characters and figures on the tape T and a cartridge holder 34 for loading the ink cartridge 5 for supplying ink to the ink jet head 121, respectively, in a manner forming a unit. The ink jet head 121 faces downward, and the ink cartridge 5 is mounted within a cartridge holder 34 such that it has its delivery port directed downward.

When the ink cartridge 5 is mounted, ink reservoirs 5a thereof, each of which contains ink of a different color, communicates with the ink jet head 121 for supply of ink. The ink reservoirs 5a contain yellow ink, cyan ink, magenta ink, and black ink, respectively.

Further, the carriage 32 has light shields, not shown, projecting therefrom. When one of the light shields is brought before an associated one of position-detecting sensors 98 each comprised of a photo interrupter or the like, the ink jet head 121 is detected to be at a home position, not shown, whereby the correction of the position of the ink jet head 121, such as zero position adjustment, is carried out.

The home position serves not only as a standby position of the ink jet head 121 but also as a reference position for printing. The CR motor 122 is driven for rotation in a predetermined number of steps from the reference position, whereby the carriage 32 is moved with accuracy to each position in the direction of the width of the tape T within a printing range, and the ink jet head 121 is driven in synchronism with movement of the carriage 32 to thereby effect printing of characters and figures on a surface of the tape T in a desired manner.

Figure 3:
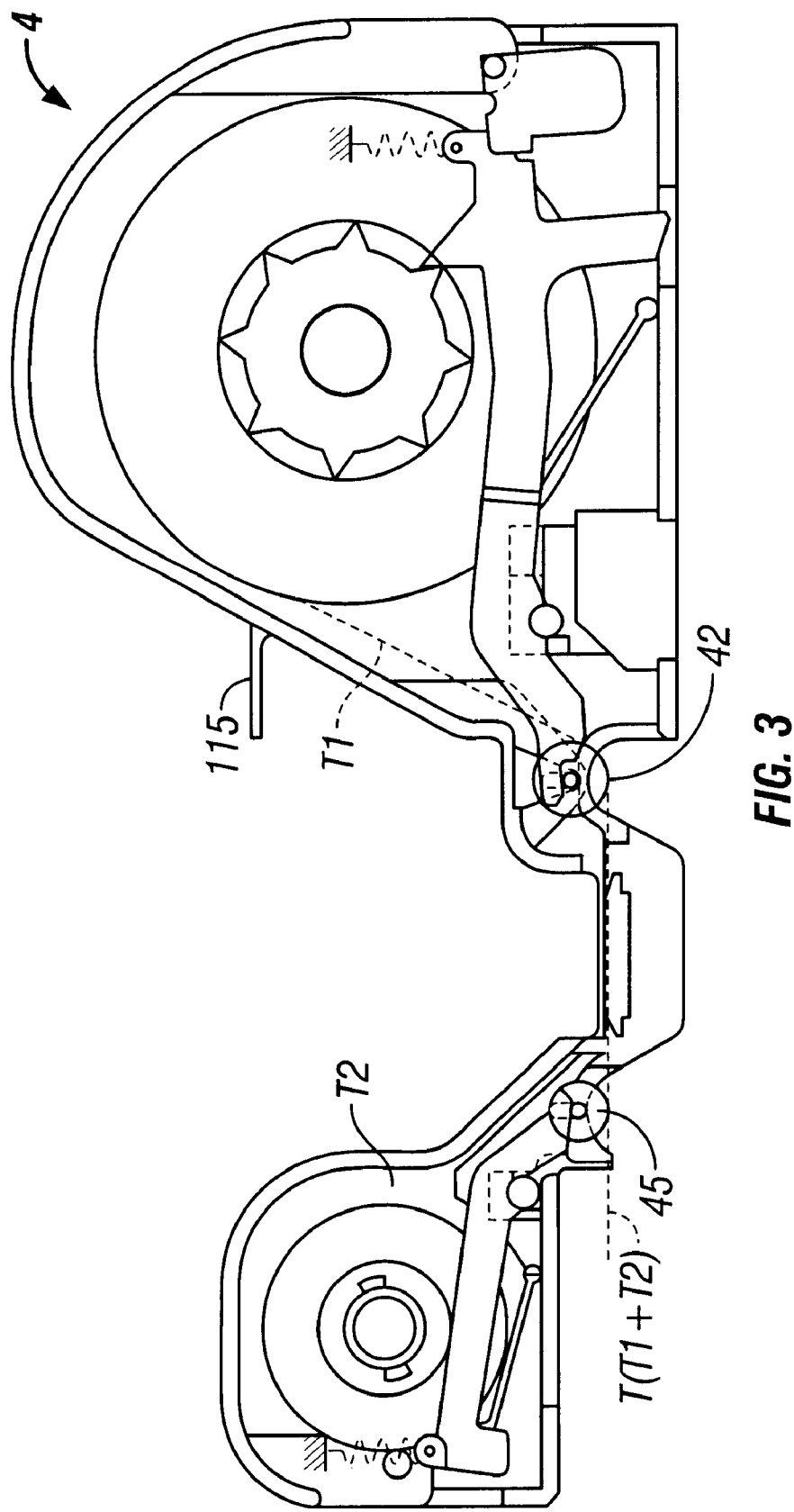
FIG. 3 is a side cross-sectional view of a tape cartridge mounted in the FIG. 1 tape printing apparatus.

The tape cartridge 4 is provided with a discriminating plate 115 bearing discriminating information based on bit patterns or the like (see FIG. 3). A discriminating sensor 99, not viewed in the FIGS. 1 and 2 (see FIG. 4), mounted on the carriage 32 is brought to the discriminating plate 115 to thereby discriminate the type or kind of tape cartridge 4, printing tape T1 and laminating tape T2 as well as detect a print-starting position for starting a printing operation on each printing tape T1.

The printer block 12 has a head cap mechanism, not shown, for closing ink nozzles of the ink jet head 121 and cleaning the same by using a pump motor 123 (see FIG. 4) as required.

The tape feed block 11 has a printing tape feed mechanism 11a and a laminating tape feed mechanism 11b arranged on opposite sides of the printer block 12 in a direction of feeding of the tape T. The printing tape feed mechanism 11a includes feed roller means 41 comprised of a feed driven roller 42 positioned above and a feed drive roller 43 positioned below and a tape feed motor 111 (PF motor), not shown, for driving the feed drive roller 43 for rotation.

The feed drive roller 43 is arranged in the body 2 of the tape printing apparatus, while the feed driven roller 42 is arranged in the tape cartridge 4. When the tape cartridge 4 is mounted in the body 2, the feed driven roller 42 presses the printing tape T1 in a manner sandwiching the tape T1 between the feed drive roller 43 and the feed driven roller 42 itself. The printing tape T1 is advanced in this state as the feed motor rotates.

The laminating tape feed mechanism 11b includes laminating roller means 44 comprised of a laminating driven roller 45 positioned above and a laminating drive roller 46 positioned below, and a laminating motor, not shown, for driving the laminating drive roller 46 for rotation. The laminating motor and the tape feed motor are implemented by an identical or single motor (PF motor 111), torque of which is split via a reduction gear train and transmitted to the feed roller means 41 and the laminating roller means 44, respectively.

The laminating drive roller 46 is arranged in the body 2, while the laminating driven roller 45 is arranged in the tape cartridge 4. When the tape cartridge 4 is mounted in the body 2, the laminating driven roller 45 presses the printing tape T1 and the laminating tape T2 in a manner sandwiching the same between the laminating drive roller 46 and the laminating driven roller 45 itself. The printing tape T1 and the laminating tape T2 are advanced in this state while being affixed to each other as the feed motor rotates.

The cutting block 13 includes a cutter 51 and a cutter motor 131, not shown in FIG. 2, for driving the cutter 51 for cutting operation. After the printing is completed, the tape T (the printing tape T1+the laminating tape T2) is stopped when the PF motor 111 feeds the same further by a predetermined number of steps, and at the same time, the cutter motor 131 starts driving the cutter 51 for cutting the tape T. It should be noted that in the tape printing apparatus 1 a cutting key 340 is provided so that the cutting operation can be manually carried out by key stroke, and it is possible to selectively set an automatic cutting mode and a manual cutting mode.

As shown in FIG. 1, the keyboard 3 is hinged on a lower portion of a front surface of the body 2 of the tape printing apparatus 1 such that it can be brought either to an upright position or to a horizontal position for use with the body 2. The keyboard 3 is brought to the horizontal position when the apparatus 1 is in use, while it is held in the upright or folded position, i.e. covers the front surface of the apparatus 1 when the apparatus 1 is carried by the user. The lid 7 has a small window 9 formed in a right-side front portion thereof in a manner corresponding to a liquid crystal display 8 arranged within the apparatus body 2. The keyboard 3 and the liquid crystal display 8 will be described in detail in the following description of a control system.

Next, the basic configuration of the control system of the tape printing apparatus 1 will be described with reference to FIG. 4. The control system is basically comprised of the control block 200, the keyboard 3, the position-detecting sensors 98, the discriminating sensor 99, a driving circuit block 280, and the liquid crystal display (LCD) 8.

The position-detecting sensors 98 detect that the ink jet head 121 has reached the home position, as described above, and generate a position-detecting signal indicative of detection of the home position of the ink jet head 121, which is supplied to the control block 200. The discriminating sensor 99 discriminates the type or kind of tape cartridge 4 and that of the tape T, and detects the print-starting position for starting a printing operation on each printing tape T1, and generates a signal indicative of detection of printing-start position or a discriminating information signal indicative of the sensed type or kind of the tape cartridge 4 or the tape T, which is supplied to the control block 200.

The driving circuit block 280 includes a head-driving circuit 281, a motor-driving circuit 282 and a liquid crystal display (LCD)-driving circuit 283. The head-driving circuit 281 drives the ink jet head 121 of the printer block 12 in response to control signals delivered from the control block 200, i.e. in accordance with commands carried by the signals. Similarly, the motor-driving circuit 282 drives the CR motor 122 and the pump motor 123 of the printer block 12, the PF motor 111 of the tape feed block 11, and the cutter motor 131 of the cutting block 13 in accordance with commands from the control block 200. Similarly, the liquid crystal display (LCD)-driving circuit 283 controls the liquid crystal display (LCD) 8 in accordance with commands from the control block 200.

The liquid crystal display 8 has a display screen 81 which is capable of displaying an image represented by display image data of 96×64 dots on a rectangular display area of approximately 6 cm in the horizontal direction (X direction)×4 cm in the vertical direction (Y direction). The user uses the liquid crystal display 8 to enter data via the keyboard 3 to form or edit a character string image represented by character string image data and a print image represented by character image data, view an image represented by the formed or edited data and enter various commands including selection commands via the same.

On the keyboard 3 there are arranged a character key group 310 including an alphabet key group 311, a symbol key group 312, a number key group 313, a kana key group 314 for entering Japanese hirakana letters and Japanese katakana letters and a nonstandard character key group 315 for calling nonstandard characters for selection, a function key group 320 for designating various operation modes, and so forth.

The function key group 320 includes a power key 321, a print key 322 for instructing a printing operation, a selection key 323 for fixing data for entry and feeding lines during text entry as well as selecting modes on a selection screen, a color specification key 324 for specifying printing colors and its neutral color (mixed color) of a print image represented by print image data, a color-setting key 325 for setting colors of characters and their background, and four cursor keys 330 (330U, 330D, 330L, 330R: hereinafter referred to as e.g. "the cursor" ↑ "key 330U") for moving a cursor or scrolling the display range of the print image on the display screen 81 in respective upward "↑", downward "↓", leftward "←", and rightward "→" directions, neither of which is shown.

The function key group 320 also includes an escape key (i.e. cancel key) 326 for canceling instructions, a shift key 327 for use in shifting roles of respective keys as well as modifying a registered image represented by registered image data, an image key 328 for alternately switching between a text entry screen or a selection screen, and a display screen (image screen) for displaying an image represented by image data, a proportion-changing (zoom) key 329 for changing a proportion between the size of the print image and the size of the display image displayed on the image screen, and the cutting key 340 for manually cutting the tape T.

The function key group 320 further includes an imaginary tape width-setting key 341 for setting an imaginary tape width, described hereinafter, a split printing key 342 for sequentially printing split images, which are produced by splitting a print image according to the imaginary tape width, a split-between-lines printing key 343 for sequentially printing split images split between lines, which are produced by splitting the print image according to line and represented by respective split image data items, and a columnar split printing key 344 for sequentially printing vertically split images, which are produced by splitting the print image into a plurality of images in a transverse direction to the direction of lines of characters (in the direction of the width of the print image represented by the print image data) and represented by respective split image data items.

Similarly to keyboards of the general type, the above key entries may be made by separate keys exclusively provided for respective key entries and/or by a smaller number of keys operated in combination with the shift key 332 or the like. Here, for purposes of ease of understanding, the following description will be made assuming that there are provided as many keys as described above.

Figure 4:
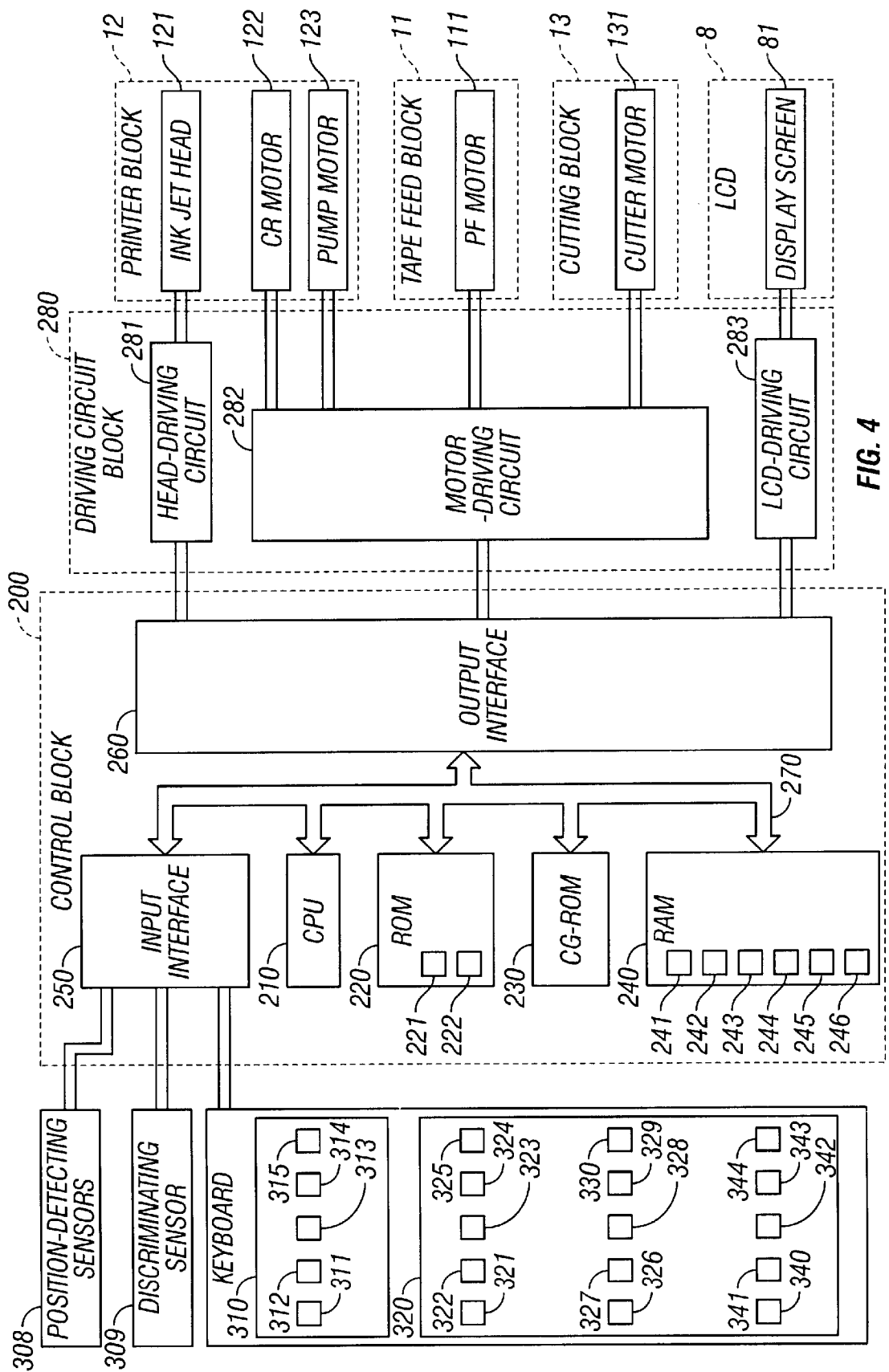
FIG. 4 is a block diagram schematically showing a control system of the FIG. 1 tape printing apparatus.

Referring to FIG. 4, from the keyboard 3, various commands described above and data are input to the control block 200.

The control block 200 includes a CPU 210, a ROM 220, a character generator ROM (hereinafter referred to as "the CG-ROM") 230, a RAM 240, an input interface 250, and an output interface 260, all of which are connected to each other by an internal bus 270.

The ROM 220 stores control programs executed by the CPU 210 as well as a color conversion table 221 and a character modification table 222. The CG-ROM 230 stores font data, i.e. data defining characters, symbols, figures and the like, provided for the tape printing apparatus 1. When code data for identifying characters or the like are input thereto, it outputs the corresponding font data.

The RAM 240 is supplied with power by a backup circuit, not shown, such that stored data items can be preserved even when the power is turned of f by operating the power key 321. The RAM 240 includes areas of a register group 241, a text memory 242 for storing text data of letters or the like entered by the user via the keyboard 3, a displayed image data memory 243 for storing image data representative of an image displayed on the display screen 81, a print image data memory 244 for storing print image data representative of a print image, a registered image data memory 245 for storing registered image data representative of a registered image as well as a conversion buffer memory 246, such as a color conversion buffer. The RAM 240 is used as a work area for carrying out the control process.

The input interface 250 is a circuit which is connected to the keyboard 3, the position-detecting sensors 98 and the discriminating sensor 99, for receiving commands and data entered via the keyboard 3, the position-detecting signal generated by the position-detecting sensors 98 and the discriminating information signal generated by the discriminating sensor 99, and inputting these to the internal bus 270. The output interface 260 is a circuit for outputting data and control signals sent through the internal bus 270 by the CPU 210 or the like and intended for use by the driving circuit block 280.

The CPU 210 of the control block 200 receives via the input interface 250 the commands and data entered via the keyboard 3, the position-detecting signal from the position-detecting sensors 98 and the discriminating information signal from the discriminating sensor 99 according to the control program read from the ROM 220, processes font data from the CG-ROM 230 and various data stored in the RAM 240, and delivers control signals to the driving circuit block 280 via the output interface 260 to thereby carry out position control during printing operations, discriminating control of discriminating the type or kind of tape cartridge 4 and the tape T, the display control of the display screen 18, and the printing control that causes the ink jet head 121 to carry out color printing on the tape T under predetermined printing conditions. In short, the CPU 210 controls the overall operation of the tape printing apparatus 1.

Next, the overall control process carried out by the tape printing apparatus 1 will be described with reference to FIG. 5. As shown in the figure, when the program for carrying out the control process is started e.g. when the power of the tape printing apparatus 1 is turned on, first, at a step S1, initialization of the system including restoration of saved control flags is carried out to restore the tape printing apparatus 1 to the state it was in before the power was turned off the last time. Then, the image that was displayed on the display screen 81 before the power was turned off the last time is shown as the initial screen at a step S2.

Figure 5:
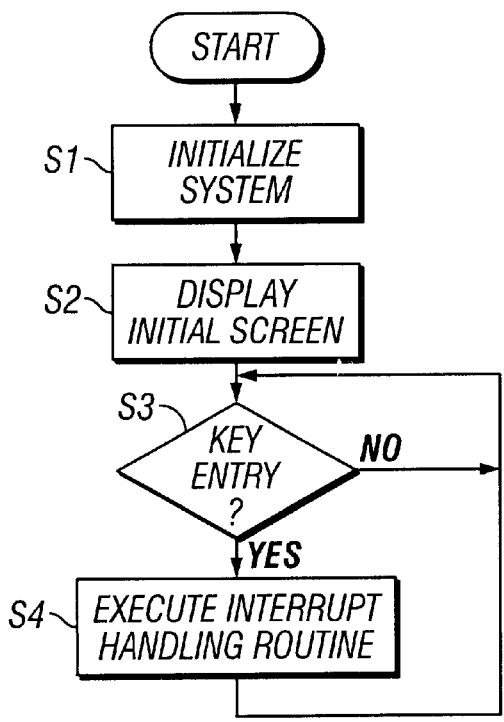
FIG. 5 is a flowchart showing an overall control process executed by the FIG. 1 tape printing apparatus.

The following steps in FIG. 5, that is, a step S3 for determining whether or not a key entry has been made and a step S4 for carrying out an interrupt handling routine are conceptual representations of actual operations. Actually, when the initial screen has been displayed at the step S2, the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at a step S4, and after the interrupt handling routine is terminated, the key entry wait state is again enabled and maintained (No to S3).

As described above, in the tape printing apparatus 1, main processing operations by the apparatus are carried out by task interrupt handling routines, and hence if print image data representative of a print image for use in printing is provided or has been prepared, the user can print the print image represented by the print image data at a desired time, by depressing the print key 322 or any of the split printing keys 342 to 344. Further, operating procedures up to the printing operation can be selectively carried out by the user as he desires.

Therefore, in the following, a typical operating procedure will be described with reference to FIG. 6. According to this procedure, the process for setting the imaginary tape width, which is characteristic of the invention, is carried out, and then original print image to be split (hereinafter referred to as "the basic image" represented by "the basic image data" so as to make it easy to distinguish the same from images obtained by splitting the basic image) is divided into split images represented by respective split image data items, followed by sequentially printing the split images. Key operations to be carried out by the user at respective steps of the operating procedure, processes for displaying images on the display screen 81 and other internal processes executed by the apparatus will be described with reference to FIG. 7 et. seq.

Figure 11:
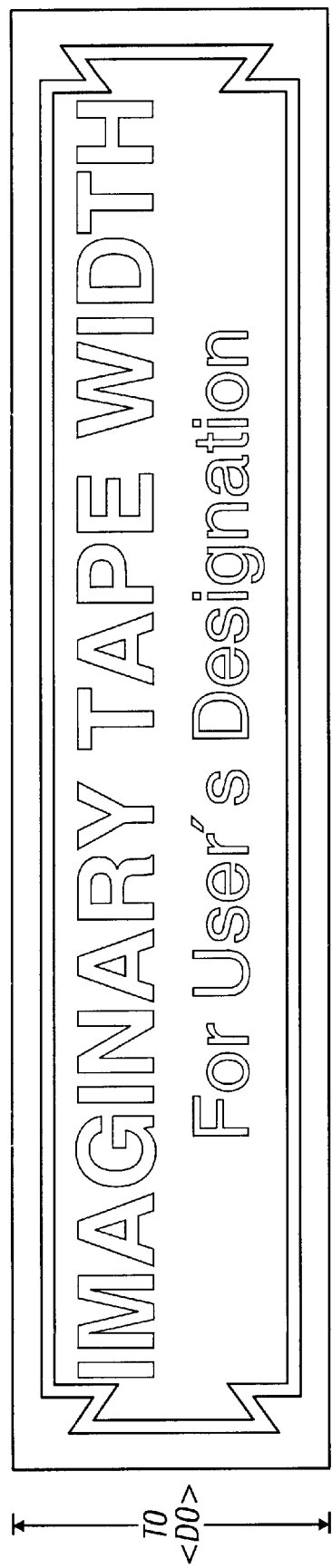
FIG. 11 is a diagram which is useful in explaining a basic image before being split into split images and a label (imaginary tape) after connecting split images which are printed through the FIG. 6 slit image-printing process.

In an example illustrated in FIG. 11, it is assumed that a character string image (basic image) of "IMAGINARY TAPE WIDTH For User's Designation" with an ornamental outer frame is printed on the printing tape to prepare a label or the like which is to be affixed to an affixing area having a width (length of a short side of a rectangular affixing area) of e.g. 240 mm (T0) (In this case, the label is considerably large, so that the label may be used as a small poster posted outdoors). In this embodiment, as shown in FIG. 6, a basic image (and hence basic image data representative of the basic image) is first created based on text input at a step S91.

It should be noted that the above method of forming a basic image represented by basic image data (print image represented by print image data) per se is the same as one adopted in the conventional tape printing apparatus and detailed description thereof is omitted. However, in the tape printing apparatus 1 according to the embodiment, a tape width of an imaginary tape which does not exist as a real tape to be actually mounted in the apparatus, e.g. the above-mentioned tape width of 240 mm, is dealt with and hence an arithmetic expression or a table is required for setting a dot width (image width) of print image data that can be printed on the real tape having the real tape width. It should be noted that "dot width" expresses the width (image width) of an image or object in terms of a number of dots or dot printing units. Further, in the present embodiment, an image is represented by image data processed by a computer, and creation, splitting or other processing of an image means creation, splitting or other processing of image data representative of the image. In short, the presence of an image is necessarily accompanied by the presence of image data or an image data item representative of the image, and therefore the image data will be not referred to, unless otherwise required.

In the illustrated example, from the relationship of the tape width of 96 mm (of a type of tape having the maximum size) and the dot width of 1024 dots printable thereon, a dot width of 2560 dots corresponding to the width of 240 mm shown in FIG. 11 is obtained (hereinafter the tape width and the dot width corresponding thereto will be shown in the form of "tape width <dot width>", "240 <2560>" for instance. Further, the dot width of the above basic image is referred to as "the basic dot width D0". That is, in the above case, the basic dot width D0 is equal to 2560 dots).

Although the tape printing apparatus 1 according to the embodiment is capable of treating a tape with a relatively large width of up to 96 mm, there are a lot of tape printing apparatuses of a conventional equivalent type which can deal with a tape having a maximum tape width of only approximately 24 mm. In the case of this level of printing apparatuses, it is impossible to print even an image having a width of approximately 40 mm and it goes without saying that they have greater needs for the method of forming split images, described hereinbelow, and the method of printing the split images.

Figure 6:
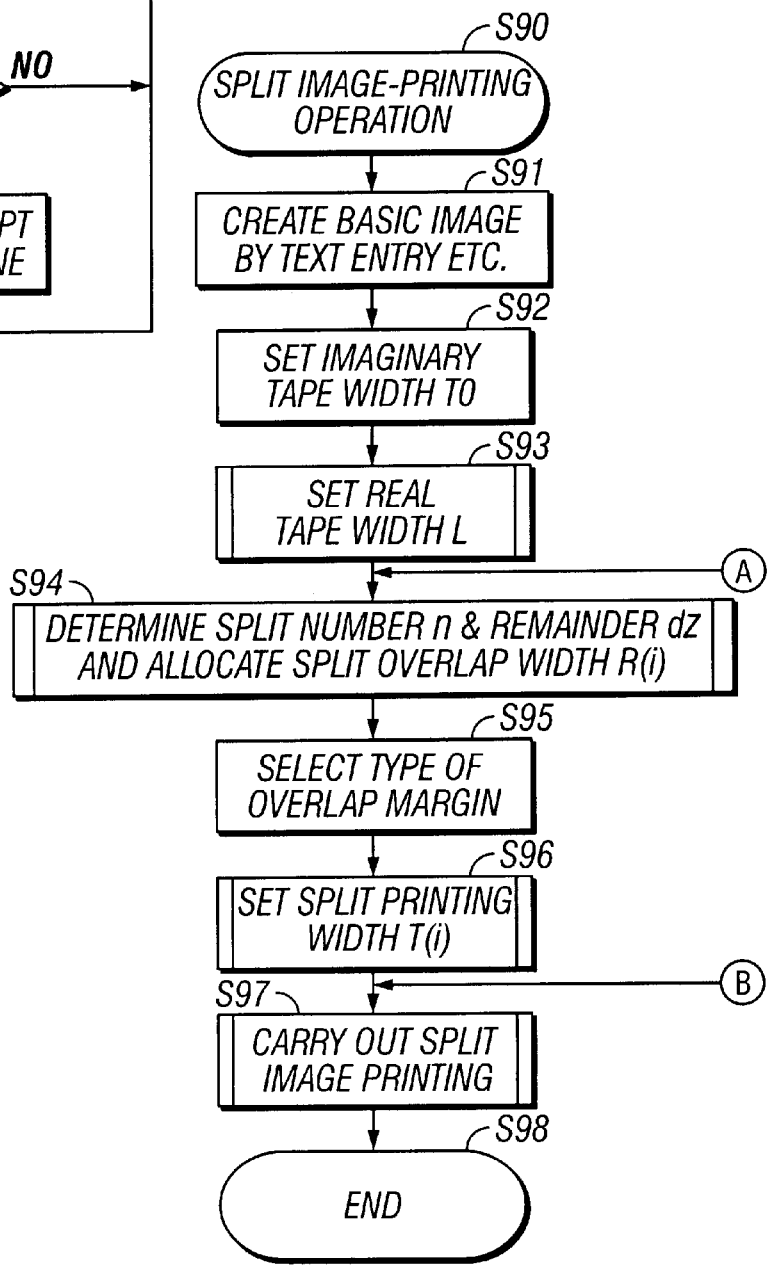
FIG. 6 is a diagram showing a typical operating procedure for printing split images.

As shown in FIG. 6, when the basic image is formed and stored in the RAM 240 at the step S91, then, an imaginary tape width T0 is set at a step S92.

Figure 7:
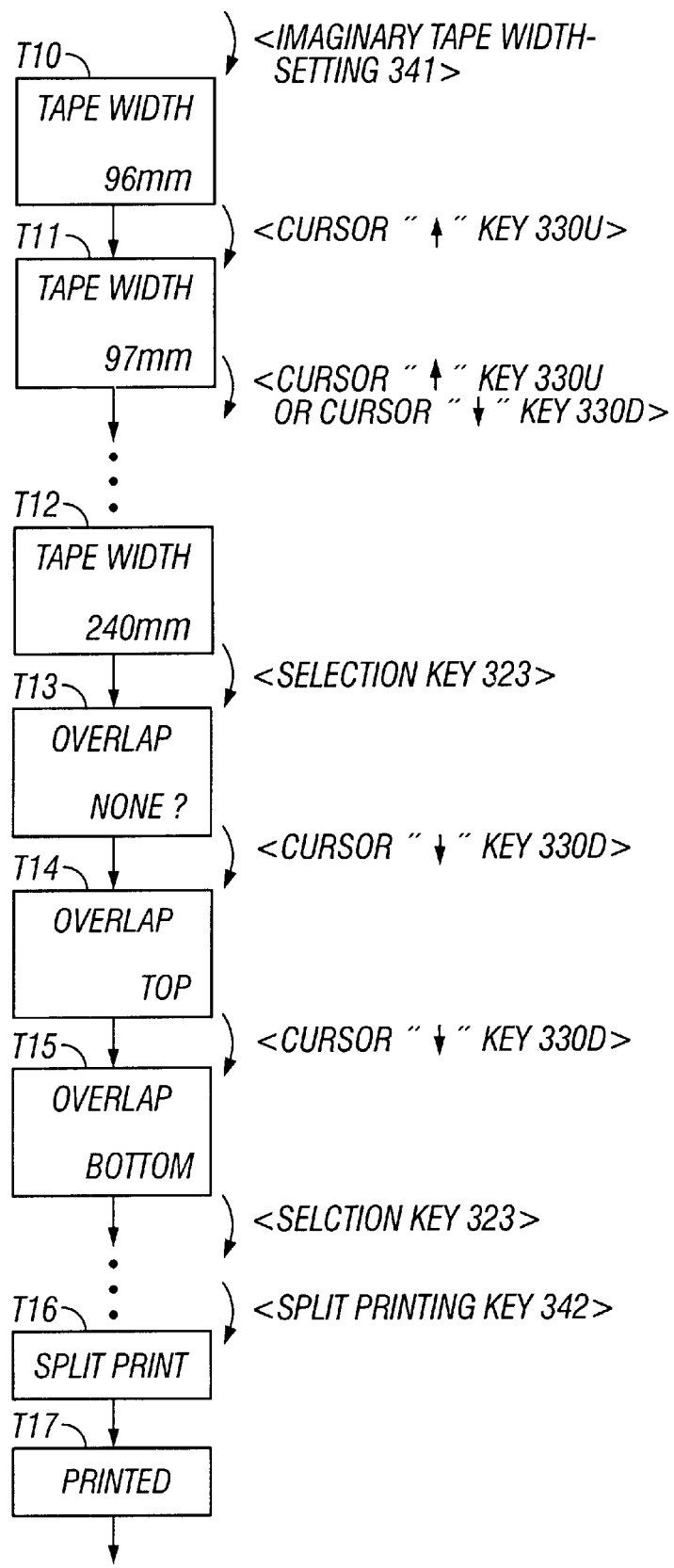
FIG. 7 is a diagram schematically showing images displayed on the screen which are useful in explaining the FIG. 6 split image-printing process.

In this process, in the key entry wait state described above with reference to FIG. 5, e.g., in the state of a text display screen after entering text data, if the imaginary tape width-setting key 341 is depressed, a keyboard interrupt is generated to start a routine for carrying out the imaginary tape width-setting process. As shown in FIG. 7, a message of "TAPE WIDTH" is displayed on the display screen 81 to show an imaginary tape width-setting screen (screen T10: hereinafter, contents displayed on the display screen 81 are referred to as "screen T??" (? represents a digit) and reference numeral for such a particular screen is shown only by T??).

In an initial state after starting the interrupt handling process, a tape width (real tape width) of a tape (real tape) mounted in the apparatus is displayed and hence in the present case, the real tape width 96 mm is displayed (T10). In this state, the displayed tape width (96 mm) can be incremented by 1 mm whenever the cursor "↑" key 330U (T11) is depressed. Inversely, the displayed tape width can be decremented by 1 mm by depressing the cursor "↓" key 330D. According to the present embodiment, the range of setting of the tape width is from 4 mm to 1000 mm, for instance. Further, it is also possible to directly set a value of the tape width by entry via the number key group 313.

As described above, when the user depresses the selection key 323 for determining the setting of the tape width in a state displaying a tape width (240 mm) desired to be set as the imaginary tape width T0 (T12), the setting of the imaginary tape width T0 (to e.g. 240 mm) is determined or fixed. After setting the imaginary tape width T0 at the step S92, there are automatically carried out as internal processes for the following processes up to a step immediately before a screen display process (T13) for a step S95 shown in FIG. 6 at which the type of an overlap margin to paste up is selected. Now, these processes will be described one by one.

As shown in FIG. 6, when the imaginary tape width T0 is set at the step S92, then, information of the type or kind of the mounted tape T is obtained from the discriminating sensor to set a real tape width L at a step S93. Of course, the tape printing apparatus 1 according to the embodiment may be configured such that the real tape width L can be manually set in the same manner as described above with reference to the setting of the imaginary tape width T0.

After setting the real tape width L at the step S93, a routine for carrying out an allocating process is started at the step S94. The allocating process determines a split number n and a remainder dz, and allocates a split overlap width R(i).

Figure 8:
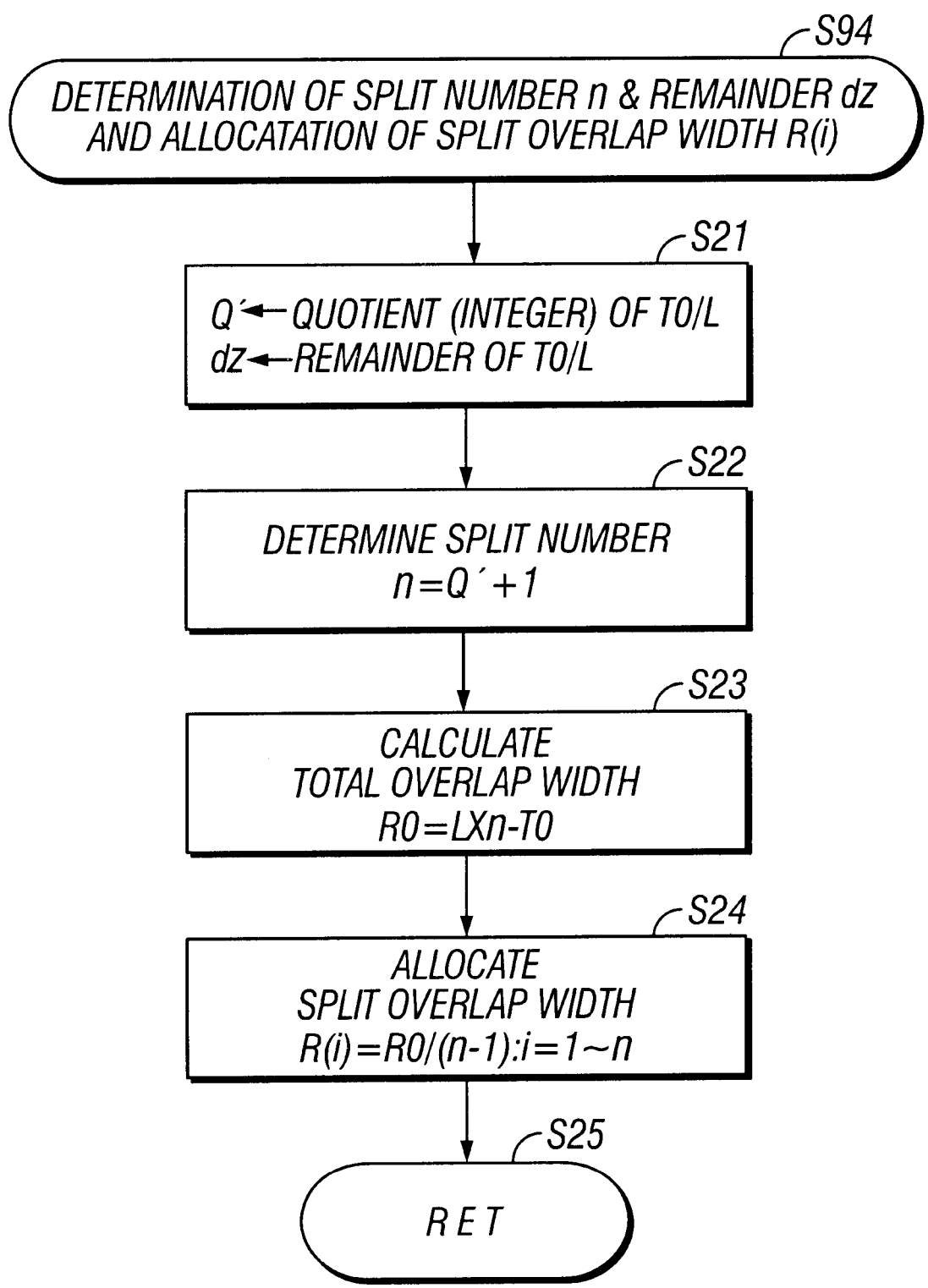
FIG. 8 is a flowchart showing a process for determining a split number and a remainder and a process for allocating split overlap widths in FIG. 6.

In the allocating process (S94), as shown in FIG. 8, the integral part Q' of a quotient Q and the remainder dz are obtained by substituting values of the imaginary tape width T0 and the real tape width L to a formula T0/L at a step S21 and then the split number n=Q'+1 is determined at a step S22. For instance, when the imaginary tape width T0=240 <2560> and the real tape width L=96 <1024> hold, the integral part Q' of the quotient Q=(an integral part of 240/96)=(the integral part of 2.5)=2, the remainder dz=(a remainder of 240/96)=240−96×2=48 (S21). Therefore, the split number n=Q'+1=3 hold (S22).

It should be noted that the split number n is defined as an integer which is larger than the integral part Q' of the quotient Q so as to enable the overlap width to be secured. This means that even if the split number n is set to Q'+2, Q'+3 or the like, it is possible to carry out the same kind of process as described hereafter. Further, if only whether or not the remainder dz is equal to 0 is determined, branching determination at a step 38 in FIG. 9, described hereinafter, can be carried out, so that the remainder dz may be substituted by a flag or the like which indicates whether or not the imaginary tape width T0 can be divided by the real tape width L.

When the split number n (=3) is determined at the step S22, next, a total overlap width R0 is calculated at a step S23 by using the following equation: R0=L×n−T0 (=96×3−240= 288−240=48 <512>).

After the total overlap width R0 is calculated at the step S23, the split overlap width R(i) (i=1 to n) is allocated at a step S24. Here, for purposes of ease of understanding, a simple allocating method is employed by using a formula R(i)=R0/(n−1). When the formula is applied to the above example, the split overlap width R1=R2=R3=48/(3−1)=24 <256> (S23) is obtained. In the following description, for ease of recognition, the suffix i will be added in the form of (i), as appearing in R(i), similarly to a general method of description of a sequence of elements in a program. That is, in the above case, R(i)=48 (where, i=1 to 3) holds. Further, in FIGS. 8 and 9, the portion "(where, i=1 to 3)", for instance, is shown as ": i=1~3" (see S24).

In the illustrated example, the sum total ΣR(i) of split overlap width R(i) (i=1 to 3) is apparently equal to 24 <256>×3=72 <768>. However, R(3) is set to 0 by a process described hereafter, and hence the sum total ΣR(i)=R(1)+R (2)+R(3)=R(1)+R(2)+0=24+24+0=48=R0 holds.

Further, another allocating method may be employed, since it is only required that the sum total ΣR(i) is equal to R0. For instance, the split overlap width R(i) may be allocated such that ΣR(i)=R0=0+48+0 or ΣR(i)=24+0+24 holds, or even in an unbalanced manner such that ΣR(i)= 12+0+36 holds. In the last case, for instance, when a character string image comprised of three lines with respective heights of e.g. 84 mm, 96 mm and 60 mm is split into three images to print the split character string images on three tapes each having a real tape width L of 96 mm, it is possible to prevent each line from being split at an intermediate portion or height thereof. The method of splitting images without splitting each line at an intermediate portion thereof will be described hereinafter with reference to FIG. 13 et. seq. Although it is contemplated that the above character string image can be split for being printed on a plurality of real tapes having different real tape widths, the case is only suggested and detailed description thereof is omitted.

When the process of allocating the split overlap width R(i)(R(i)=24, where i=1 to 3) is terminated at the step S24, the routine (S94) for determining the split number n and the remainder dz as well as for allocating the split overlap width R(i) is completed at a step S25. Then, a next process for selecting the type of an overlap margin is started at the step S95, as shown in FIG. 6. As described above, after the imaginary tape width T0 is determined by depressing the selection key 323 in the imaginary tape width-setting process (S92), the above processes (S93 to S94) are automatically carried out. Thereafter, the next process (S95) for selecting the type of an overlap margin is started and an overlap-selecting screen is displayed (T13 to T15), as shown in FIG. 7.

First, an option which was selected before the power was turned off the last time, e.g. an option "NONE" is displayed (T13) under a message "OVERLAP" indicative of the overlap width-selecting screen. From this state, by depressing the cursor "↓" key 330D, the options can be displayed sequentially for selection, such that "NONE"→ "TOP"→"BOTTOM"→"NONE". Inversely, by depressing the cursor "↑" key 330U, the options can be displayed sequentially, such that "NONE"→"BOTTOM"→"TOP"→"NONE" (T13 to T15).

In a state where a desired option, e.g. the option "BOTTOM" is displayed (T15), by depressing the selection key 323, the overlap margin position is set to the "BOTTOM" position.

The tape printing apparatus 1 may be configured, for instance, such that for each of first to (j−1)-th split images ($1 \leq j \leq n$) of the n split images in lowering order of position, an overlap margin to paste up is provided at the bottom or lowest part of the tape (see FIGS. 12A to 12C), whereas for each of a (j+1)-th to n-th split images, an overlap margin to paste is provided at the top or highest part of the tape. Further, the tape printing apparatus 1 may be configured such that both the top and bottom overlap margin positions can be designated for the same split image e.g. such that no overlap margins are designated for first and third split images, whereas the top and bottom overlap margin positions are designated for the second split image. In the above cases, e.g. if the overlap margins are provided at the "BOTTOM", it is easy to affix or connect split images to each other in lowering order, whereas if the overlap margins are provided at the "TOP", the adverse effects of rain falls can be reduced, since rain is prevented from entering glued surfaces of the overlap margins, e.g. when printing tapes T1 with split images printed thereon are used outdoors. As described above, the position (top or bottom) of each overlap margin can be designated depending on the use of printing tapes T1 with split images printed thereon.

In the following, to indicate existence of and distinguish values between an overlap width at the top position and an overlap width at the bottom position provided in association with the split printing width T(i), the overlap width at the top position or on the upper side of the split printing width T(i) is referred to as the top overlap width Ru(i), whereas the overlap width at the bottom position or on the lower side of the split printing width T(i) is referred to as the bottom overlap width Rd(i). The sum total of Ru(i) and Rd(i) is represented by a split overlap width R(i)=Ru(i)+Rd(i).

Figure 9:
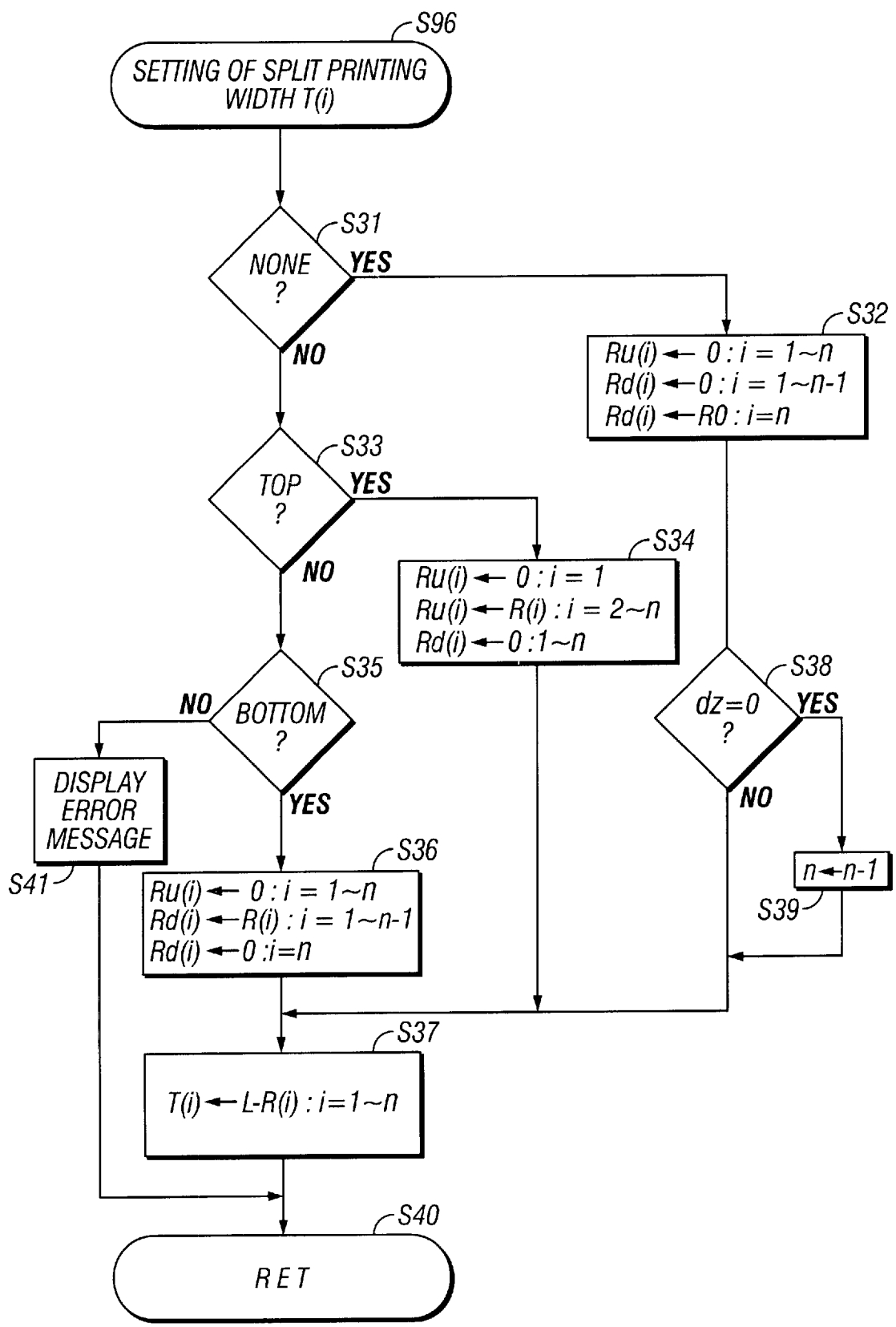
FIG. 9 is a flowchart showing a split printing width-setting process appearing in FIG. 6.

In a state (T15) where a desired option (e.g. the option "BOTTOM") is displayed, by depressing the selection key 323 to determine the entry of the overlap margin position (e.g. "BOTTOM"), a split printing width-setting routine is started at a step S96. As shown in FIG. 9, it is determined at a step 31 whether or not the selected overlap margin position is "NONE". If it is determined that "NONE" has been selected as the overlap margin position (Yes to S31), the top overlap width Ru(i)=0 (where i=1 to n (e.g. n=3)), the bottom overlap width Rd(i)=0 (where i=1 to n−1 (e.g. n−1=2)), and the bottom overlap width Rd(i)=R0 (where i=n (=3)) are set at a step S32.

For instance, in the illustrated example described above, assuming that "NONE" has been selected for the overlap margin position, the top overlap width Ru(i)=Ru(1)=0 (where i=1) is obtained. Similarly, the top overlap width Ru(2)=Ru(3)=0 is obtained. Further, the bottom overlap width Rd(1)=Rd(2)=0 is obtained. When i=3 holds, the bottom overlap width Rd(3)=R0=48 <512> is obtained.

In the case of the above example, the above-mentioned remainder dz=48 <512> holds, so that it is determined at a next step (S38) that dz≠0 (No to S38) and the program proceeds to a next step (S37) for setting the split printing width T(i).

That is, the split printing width-setting process is carried out at the step S37 to set the split printing width T(i), followed by terminating the split printing width-setting routine at a step S40.

Figure 10:
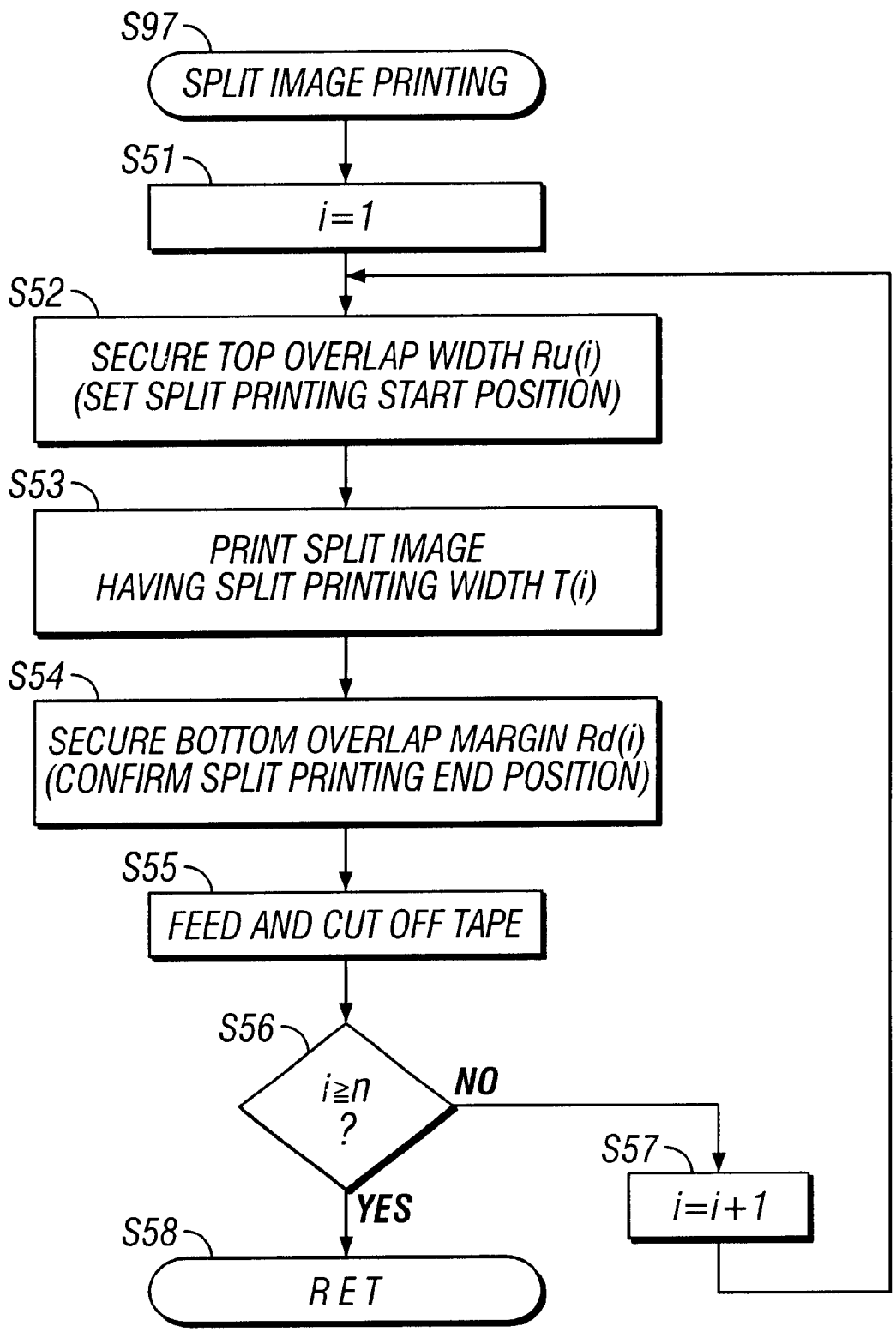
FIG. 10 is a flowchart showing a split image-printing process appearing FIG. 6.

In the above case, a first (i=1) split printing width T(1)= L−R(1)=L−(Ru(1)+Rd(1))=96 <1024>−0=96 <1024> holds and accordingly a split image-printing process, described hereinafter with reference to FIG. 10, is carried out to print a first (i=1) split image with a dot width of 1024 dots over the whole real tape width L (=96 mm). Similarly, a second (i=2) split printing width T(2)=96 <1024> holds and accordingly a second (i=2) split image having the dot width of 1024 dots is printed over the whole real tape width L (=96 mm). Further a third (i=3) split printing width T(3)=48 <512> holds and accordingly a third (i=3) split image with a dot width of 512 dots is printed on an upper half portion (48 mm) of the real tape width L (=96 mm), finally leaving a blank margin of 48 mm, i.e. a margin for 512 dots.

In the following, a dot width of an i-th split image is referred to as a "split dot width D(i)". That is, in the above case, the split dot width D(1)=1024 dots, the split dot width D(2)=1024 dots, and the split dot width D(3)=512 dots hold, which correspond to the split printing width T(1)=96 mm, the split printing width T(2)=96, the split printing width T(3)=48 mm, respectively. Further, needless to say, the sum total ΣD(i) of the split dot width=D(1)+D(2)+D(3)=2560 coincides with the basic dot width D0 (=2560 dots) corresponding to the imaginary tape width T0 (=240 mm).

On the other hand, when the above-mentioned remainder dz=0 (Yes to S38), the last or (i=n)-th split printing width T(n) has no split image corresponding thereto and hence, for print control purposes, to prevent the printing operation from being carried out with the last or (i=n)-th portion as a blank space, n−1 is substituted for n at the following step S39 and then the program proceeds to the step S37 for setting the split printing width T(i). Of course, in this case, if it is detected that a split overlap width R(i) is equal to or larger than the real tape width L before starting the split image-printing process in FIG. 10, described hereinafter, to thereby stop the printing operation, the above substituting process (S39) is not required, and further, the process (part of step S21) for obtaining the remainder dz in the FIG. 8 routine is not required, either.

If it is determined at the step S31 that the option "NONE" is not selected as the overlap margin position (No to S31), it is determined at a step S33 whether or not the selected overlap margin position is the option "TOP". When it is determined that the option "TOP" has been selected (Yes to S33), the top overlap width Ru(i) is set to 0 (where i=1), the top overlap width Ru(i) is set to R(i) (where i=2 to n (e.g. n=3)) and the bottom overlap width Rd(i) is set to 0 (where i=1 to n (e.g. n=3) at a step S34.

For instance, when the option "TOP" has been selected for the overlap margin position in the example described above, the top overlap width Ru(1)=0 (when i=1), the top overlap width Ru(2)=R(2)=24 <256> (when i=2), the top overlap width Ru(3)=R(3)=24 <256> (when i=3) and the bottom overlap width Rd(1)=Rd(2)=Rd(3)=0 are obtained.

In the case where the option "TOP" has been selected for the overlap margin position, after completing the allocation and setting of each split overlap width R(i) (the top overlap width Ru(i) and the bottom overlap width Rd(i)) at the step S34, the split printing width-setting process (S37) is carried out to set the split printing width T(i), followed by terminating the split printing width-setting routine (S96) at the step 40.

In the example described above, for instance, the split printing width T(1)=L−R(1)=L−(Ru(1)+Rd(1))=96 <1024>−(0+0)=96 <1024>, and the split printing width T(2)=96 <1024>−(24 <256>+0)=72 <768> are obtained. Similarly, the split printing width T(3)=72 <768> is obtained.

That is, when the split image-printing process, described hereinafter (see FIG. 10), is carried out, the first (i=1) split image having the split dot width D(1) (=1024 dots) is printed on the whole real tape width L (=96 mm). Further, after printing the first (i=1) split image, i.e. when i=2, an overlap margin having a width corresponding to 256 dots i.e. the top overlap width Ru(2) (24 mm) is secured from the upper side edge of the real tape having the real tape width L. In the split printing area below the overlap margin, which has the split printing width T(2) (=72 mm), a second (i=2) split image having the split dot width D(2) (=768 dots) is printed.

In the following, the dot width of an overlap margin having the split overlap width R(i) is referred to as a "split margin dot width E(i)". Assuming that, similarly to the split overlap width R(i), the width of a top overlap margin and that of a bottom overlap margin are represented by dot widths (respectively referred to as an "top overlap dot width Eu(i)" and a "bottom overlap dot width Ed(i)"), the split margin dot width E(i)=Eu(i)+Ed(i) holds. Further, the dot width corresponding to the real tape width L is referred to as the "real dot width W" ("tape image width").

For instance, in the above case, when the second (i=2) split image is printed, a margin (blank image) having a top overlap dot width Eu(2) (=256 dots) is assigned to an overlap area (having the top overlap width Ru(2) (24 mm)) extending downward from the upper side edge of the real tape having the real tape width L (=96 mm) corresponding to or represented by the real dot width W (=1024 dots). In the split printing area below the top overlap margin, which has the split printing width T(2) (=72 mm), the second (i=2) split image having the split dot width D(2) (=768 dots) is printed.

Similarly, when a third (i=3) split image is printed, a margin (blank image) having a top overlap dot width Eu(3) (=256 dots) is allocated to an overlap area (having the top overlap width Ru(3) (24 mm)) extending downward from the upper side edge of the real tape having the real tape width L (=96 mm) corresponding to the real dot width W (=1024 dots). In the split printing area below the margin, which has the split printing width T(3) (=72 mm), the third (i=3) split image having the split dot width D(3) (=768 dots) is printed.

If the option "TOP" has not been selected as the overlap margin position (No to S33), it is determined at a next step S35 whether or not the selected overlap margin position is the "BOTTOM". If the option "BOTTOM" has not been selected (No to S35), an error message is displayed at a step S41 to indicate that there has occurred an erroneous operation or a malfunction of a function key, followed by terminating the split printing width-setting routine (S96) at the step 40.

On the other hand, if the option "BOTTOM" has been selected (Yes to S35), the top overlap width Ru(i)=0 (where i=1 to n (e.g. n=3)), the bottom overlap width Rd(i)=R(i) (where i=1 to n−1 (e.g. n−1=2)), and the bottom overlap width Rd(i)=0 (where i=n (e.g. n=3)) are set at a step S36.

In the above example, for instance, since the "BOTTOM" has been selected for the overlap margin position, the top overlap width Ru(1)=Ru(2)=Ru(3)=0, the bottom overlap width Rd(1)=R(1)=24 <256>, the bottom overlap width Rd(2)=R(2)=24 <256> and the bottom overlap width Rd(3)=0 are obtained.

After terminating the allocation and setting of each split overlap width R(i) (the top overlap width Ru(i) and the bottom overlap width Rd(i)) at the step S36 in the case of the option "BOTTOM" being selected for the overlap margin position, the split printing width-setting process (S37) is carried out to set the split printing width T(i), followed by terminating the split printing width-setting routine (S96) at the step 40.

In the above example, for instance, the split printing width T(1)=L−R(1)=L−(Ru(1)+Rd(1))=96 <1024>−(0+24 <256>)=72 <768> is obtained. Similarly, the split printing width T(2)=72 <768> and the split printing width T(3)=96 <1024>−(0+0)=96 <1024> are obtained.

When the split printing width-setting routine (S96) is completed, as shown in FIG. 6, the program proceeds to the split image-printing process at a step S97. This process is started by a keyboard interrupt (hereinafter referred to as "the split printing keyboard interrupt") generated by depressing the split printing key 342.

For instance, when the selection key 323 is depressed in the state of the option "BOTTOM" being displayed on the selection screen for selecting the type of overlap margin (T15), described above with reference to FIG. 7, the selection of the "BOTTOM" for the overlap margin position is determined, and the split printing width-setting routine (S96) described above is automatically carried out. Thereafter, when the split printing key 342 is depressed in the state of the above T15 or in the state of another screen (e.g. the display screen in the text display mode) being displayed during another process, the split printing keyboard interrupt is generated, and, as shown in FIG. 7, a message "SPLIT PRINT" (split printing) is displayed (T16), which notifies that a printing operation being carried out is "split printing" different from a normal and collective printing operation (in which a print (basic) image is printed by one printing operation). And, in the state of the message being displayed, the split image-printing process at the step S97 in FIG. 6 is started to start the split printing operation.

Referring to FIG. 10, when the split image-printing process (S97) is started, first, i=1 is set as an initial value and then, the top overlap width Ru(i)=Ru(1) is secured at a step S52. In other words, in this process, a split printing start position at which the split printing is to be started is set to thereby secure a blank area extending up to the split printing-starting position, as the overlap margin.

In the above example, however, since the option "BOTTOM" is selected for the overlap margin position and hence the top overlap width Ru(1)=0 is set, no blank area for the top overlap margin is provided and the upper side edge of the tape T is set to the split printing-starting position. In the tape printing apparatus 1, as described above, the printing position can be accurately controlled by using the position-detecting sensors 98 and the discriminating sensor 99 (see FIG. 4).

After securing the top overlap width Ru(i)=Ru(1) at the step S52, a split image having a split printing width T(1), i.e. the first (i=1) split image is printed at a step S53, and then, the bottom overlap width Rd(1) is secured at a step S54. That is, at this step S54, a split printing end position at which the split printing has been terminated is confirmed. When there occurs a displacement of a position and the like, an error message or the like is displayed instead of the message "SPLIT PRINT" (split printing), described above with reference to FIG. 7.

Of course, since printing of a split image has been terminated at this time point (S54), and the bottom overlap width Rd(i) can be automatically secured as a margin by subtracting the top overlap width Ru(i) and the split printing width T(i) from the real tape width L, the step S54 for securing (confirming) the bottom overlap width Rd(i) may be omitted if there is no need to effect the confirmation of the ending position or the display of the error message, described above.

After the bottom overlap width Rd(1) has been secured (confirmed), then, feeding and cutting off of the real tape T is carried out at a step S55, where the tape T is fed by a predetermined number of steps by the PF motor 111, and cut off by using the cutter 51 as described above. As a result, a first (i=1) tape (label) which has the first (i=1) split image printed thereon is prepared.

On this first (i=1) tape printed, the margin (blank image) having the top overlap dot width Eu(1) is allocated to the overlap area having the top overlap width Ru(1), which extends downward from the upper side edge of the tape having the real tape width L corresponding to the real dot width W. In the split printing area below the margin, which has the split printing width T(1), the first (i=1) split image having the split dot width D(1) is printed. The margin (blank image) having the bottom overlap dot width Ed(1) is allocated to the overlap area having the bottom overlap width Rd(1) below the split printing area.

Figure 12A:
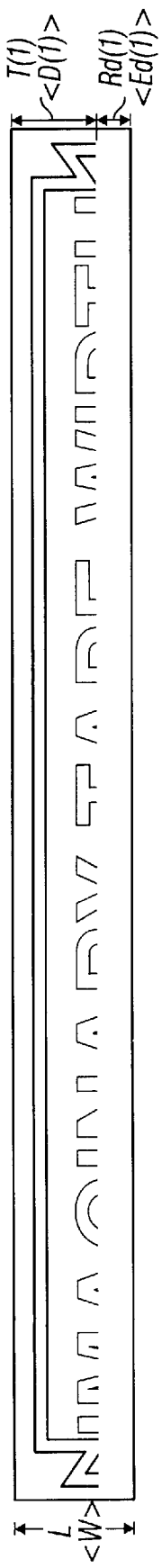
FIGS. 12A to 12C are diagrams which are useful in explaining split images of the FIG. 11 basic image, an actual print image having the split image laid out therein, and a real tape (label) produced by printing the actual print image.

In the illustrated example described above, for instance, a tape (label) which has the first (i=1) split image printed thereon, shown in FIG. 12A, is produced at this step. On this first (i=1) tape, the margin (blank image) having the top overlap dot width Eu(1) (=0 dot) is allocated to an overlap area having the top overlap width Ru(1) (=0 mm), which extends downward from the upper side edge of the tape having the real tape width L (=96 mm) corresponding to the real dot width W (=1024 dots). In the split printing area below the margin, which has the split printing width T(1) (=72 mm), the first (i=1) split image having the split dot width D(1) (=768 dots) is printed. The margin (blank image) having the bottom overlap dot width Ed(1) (=256 dots) is allocated to an overlap area having the bottom overlap width Rd(1) (=24 mm) below the split printing area.

After forming the first (i=1) tape (label) which has the first (i=1) split image printed thereon at the step S55, it is determined at a step S56 whether or not the preparation of tapes (labels) up to an n-th tape (label) is completed, that is, whether or not i≧the split number n holds. Since i<n (i (=1)<3) (No to S56) at this time point in the present case, next, after incrementing i (i=i+1), the same process as that carried out when i=1 is carried out again.

That is, when i=2, similarly to the case where i=1, the top overlap width Ru(i)=Ru(2) is secured at the step S52, the split image is printed in the split printing area having the split printing width T(i)=T(2) at the step S53, and the bottom overlap width Rd(i)=Rd(2) is secured (confirmed) at the step S54. Thereafter, the feeding and cutting off of the real tape T is carried out at the step S55, whereby a second (i=2) tape (label) which has the second (i=2) split image printed thereon is prepared at the step S55.

Figure 12B:
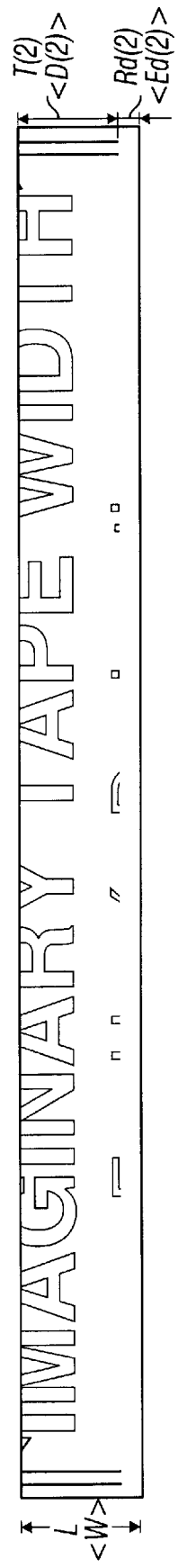

In the illustrated example, for instance, a second (i=2) tape (label), shown in FIG. 12B, which has the second (i=2) split image printed thereon, is prepared at this step. On the tape, the margin (blank image) having the top overlap dot width Eu(2) (=0 dot) is allocated to an overlap area having the top overlap width Ru(2) (=0 mm), which extends downward from the upper side edge of the tape having the real tape width L (=96 mm) corresponding to the real dot width W (=1024 dots). In the split printing area below the margin, which has the split printing width T(2) (=72 mm), the second (i=2) split image having the split dot width D(2) (=768 dots) is printed. The margin (blank image) having the bottom overlap dot width Ed(2) (=256 dots) is allocated to an overlap area of the bottom overlap width Rd(2) (=24 mm) below the split printing area.

After the second (i=2) tape (label) which has the second (i=2) split image printed thereon is prepared at the step S55, next, it is determined at the step S56 whether or not the preparation of tapes (labels) up to the third (n=3) tape (label) is completed. Since i<n (i (=2)<3) holds (No to S56) at this time point in the present case, next, i is incremented (i=i+1=3) and then, the same process as that carried out when i=1 is carried out again. That is, also when i=3, a top overlap width Ru(3) is secured at the step S52, the split image is printed in a split printing area having the split printing width T (3) at the step S53, and a bottom overlap width Rd(3) is confirmed at the step S54. Thereafter, the feeding and cutting off of the real tape T is carried out at the step S55, whereby a third (i=3) tape (label) which has a third (i=3) split image printed thereon is produced at the step S55.

Figure 12C:
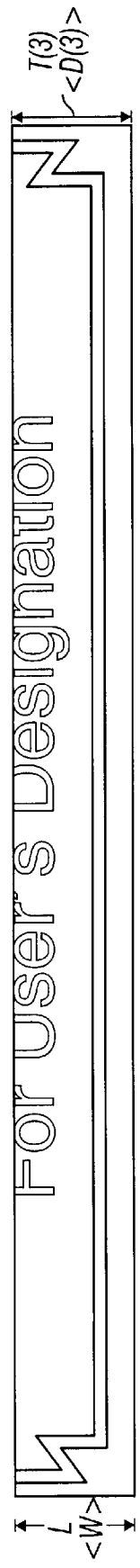

In the above example, for instance, a third (i=3) tape (label), shown in FIG. 12C, which has the third (i=3) split image printed thereon is prepared at this step. On the tape, the margin (blank image) having the top overlap dot width Eu(3) (=0 dot) is allocated to an overlap area having the top overlap width Ru(3) (=0 mm), which extends downward from the upper side edge of the real tape width L (=96 mm) corresponding to the real dot width W (=1024 dots). In the split printing area below the margin, which has the split printing width T(3) (=96 mm), the third (i=3) split image having the split dot width D(3) (=1024 dots) is printed. The margin (blank image) having the bottom overlap dot width Ed(3) (=0 dot) is allocated to an overlap area having the bottom overlap width Rd(3) (=0 mm) below the split printing area.

After the third (i=3) tape (label) which has the third (i=3) split image printed thereon is produced at the step S55, next, it is determined at the step 556 whether or not the preparation of tapes (labels) up to the third (n=3) tape (label) is completed. Since i=n (=3) (Yes to S56), the split image-printing process (S97) is terminated at a step S58. As shown in FIG. 7, a message of "PRINTED" (T17) is displayed and then the whole split image-printing operation (S90) is terminated at a step S98.

As described above, in the tape printing apparatus 1 according to the embodiment of the invention, a length of a side of an affixing area to which a printed tape (real tape) is to be affixed is set as an imaginary tape width T0 and the split number n (n>(integral part Q' of a quotient Q of the formula T0/L) is determined based on the imaginary tape width T0 and the real tape width L. Further, the total overlap width R0 (R0=L×n−T0) is calculated to allocate the same to n split overlap widths R(i) (0≦R(i)≦L, where i=1 to n, provided that the sum total ΣR(i)=R0) and the basic image having the basic dot width D0 and printable within the imaginary tape width T0 is split into n split images each having a split dot width D(i) corresponding to a split printing width T(i) (T(i)=L−R(i), where i=1 to n).

More specifically, in the example described above with reference to FIGS. 11 to 12C, the length (width) 240 mm of a side of the affixing area is set as the imaginary tape width T0 (=240 mm) and the split number n=3 (>Q' (=2)) is determined by dividing the imaginary tape width T0 by the real tape width L (=96 mm). Further, the total overlap width R0 (=L×n−T0=48 mm) is calculated and allocated to n (=3) split overlap widths R(i), that is, the split overlap width R(1)=24 mm, the split overlap width R(2)=24 mm and the split overlap width R(3)=0 mm are determined. In this case, the sum total ΣR(i)=R(1)+R(2)+R(3)=24+24+0=R0.

After allocating the total overlap width R0, the basic image having the basic dot width D0 (=2560 dots) and printable within the imaginary tape width T0 (=240 mm) is split into n (=3) split images having the split dot width D(1)=768 dots, the split dot width D(2)=768 dots and the split dot width D(3)=1024 dots, respectively. The n (=3) split images correspond to n (=3) split printing widths T(i)=L−R(i) (i=1 to n (=3)), i.e. the split printing width T(1)=72 mm, the split printing width T(2)=72 mm and the split printing width T(3)=96 mm.

If n (=3) tapes each having the real tape width L (96 mm in the above examples) are juxtaposed in the direction of the width thereof, it is possible to print an image with a dot width (=3072 dots) corresponding to a printing width of L×n (=96×3=288 mm). Therefore, there is no remainder of the basic image of 2560 dots which is printable within the imaginary tape width T0 (=240 mm) when the basic image is divided into the above n (=3) split images. That is, the whole basic image can be divided into the n split images.

Further, since the split dot width D(i) of each split image corresponds to the split printing width T(i) (≦L), each split image can be printed on the real tape having the real tape width L.

Therefore, according to the split image-forming method and device applied to the tape printing apparatus 1, a (basic) image with a size (dot width) correspondent to the affixing area, which is prepared and/or stored, can be split into split images each printable on a tape, regardless of the (real) tape width of the (real) tape as a printing object.

Further, even if a tape having a small width is used, the tape printing apparatus 1 is capable of printing the whole of a large print image to be presented in a state unified as a whole, simply by printing n split images on the tape sequentially. That is, even when the method and device for forming split images according to the present embodiment is applied to a small-sized tape printing apparatus which can deal with only a tape having a small width, the whole of a large print image can be printed. This makes it possible to form and print a print image having a desired outer frame added thereto or including a margin adapted to an affixing area Moreover, according to the split image-printing method and device applied to the tape printing apparatus 1, as described above with reference to FIG. 10, each split overlap width R(i) is allocated in a real tape width L, whereby an i-th split image is printed in the split printing area having a split printing width T(i) and hence it is possible to suitably print n (=3) split images in the split printing areas. In this process, when the allocation of the split printing width T(i) is determined, the allocation of each split overlap width R(i) associated therewith is also determined, so that it is also possible to suitably print the n (=3) split images in the split printing area. It goes without saying that the same advantageous effects can be obtained by allocating both the split overlap width R(i) and the split printing width T(i).

Further, according to the split image-printing method and device applied to the tape printing apparatus 1, each split overlap width R(i) is assigned to a top overlap margin position and/or a bottom overlap margin position, such that an i-th split image formed by printing an i-th split image can be connected, in the direction of the width of each real tape, to an (i−1)-th split image printed immediately before printing the i-th split image and/or an (i+1)-th split image printed immediately after printing the i-th split image.

In the example described above with reference to FIGS. 11 to 12C, for instance, on the first (i=1) tape shown in FIG. 12A, on which the first (i=1) split image is printed, the split overlap width R(1) (the bottom overlap width Rd(1)) is allocated below the split image-printed portion (portion where the split printing width T(1) is provided). Therefore, the second (i+1=2) split image-printed portion of the second (i+1=2) tape shown in FIG. 12B printed after the first split image-printed portion can be connected to the first split image-printed portion by using the bottom overlap width Rd(1) as an overlap margin to paste up.

Similarly, on the second tape shown in FIG. 12B, the bottom overlap width Rd(2) is allocated below the second split image-printed portion (portion where the split printing width T(2) is allocated) and hence by using the bottom overlap width Rd(2) as an overlap margin, the third (i+2=3) split image-printed portion of the third (i+2=3) tape shown in FIG. 12C can be connected to the second split image-printed portion. The above connecting operation makes it possible to compose(reconstruct) the basic image for the imaginary tape width T0 shown in FIG. 11.

In the example described above with reference to FIG. 9, in which the split width setting is carried out assuming that the option "TOP" has been designated for setting the overlap margin at the step S34, inversely to the example shown in FIG. 11, the top overlap width Ru(2) is allocated above the second split image-printed portion of the second tape and the top overlap width Ru(3) is allocated above the third split image-printed portion of the third tape. As a result, the second split image-printed portion can be connected to the first split image-printed portion of the first tape and the third split image-printed portion can be connected to the second split image-printed portion of the second tape. It is also possible to compose (reconstruct) the basic image shown in FIG. 11 through this process.

Further, let it be assumed that the upper part of the image printed on the area having the split printing width T(2) shown in FIG. 12B, that is, part of the image corresponding to the bottom overlap width Rd(1) shown in FIG. 12A, is moved to the corresponding bottom overlap margin in FIG. 12A. This is possible if the top overlap width Ru(1)=Ru(3)=0, the bottom overlap width Rd(1)=Rd(3)=0, the split printing width T(1)=T(3)=96 mm, the top overlap width Ru(2)= 24 mm, the split printing width T(2)=48 mm and the bottom overlap width Rd(2)=24 mm are set.

In this case, since overlap margins can be secured both above and below the second split image-printed portion of the second tape and hence, by connecting the first split image-printed portion of the first tape to the second split image-printed portion by using the top overlap margin and connecting the third split image-printed portion of the third tape to the second split image-printed portion by using the bottom overlap margin, it is possible to compose (reconstruct) the basic image shown in FIG. 11 through this process, as well.

Therefore, according to the split image-printing method and device applied to the tape printing apparatus 1, each split overlap width R(i) is allocated to a top overlap margin position and/or a bottom overlap margin position, so that it is possible to produce a label or the like with an imaginary tape width T0 and having a basic image printed thereon, simply by printing split images and thereafter connecting the printed split images to each other by using overlap margins each having a split overlap width R(i).

As described above, if each split overlap width R(i) is allocated to a position (a top overlap margin position and/or a bottom overlap margin position) such that suitable overlap margins are provided for printed portions of tape which are cut off into n pieces and juxtaposed in the direction of the width thereof, a label or the like with the imaginary tape width T0 can be produced simply by printing split images and thereafter connecting the same to each other by using overlap margins each having a split overlap width R(i).

That is, the total overlap width R0 (=ΣR(i))=L×n−T0 holds and hence a resulting width of the connected split images L×n−ΣR(i)=T0 holds, which corresponds to a value set as the imaginary tape width. This makes it possible to affix printed tapes to each other in a manner accurately adapted to the affixing area.

In this embodiment, since a basic image can be combined or reconstructed from split images by using each split overlap width R(i), it is possible to save the trouble of cutting off needless margins before affixing printed tapes or strips of tape to the affixing area. Further, since a gap is hard to be formed at a joint of tapes, a juncture of connected split images can be prevented from becoming conspicuous even when the basic image to be reconstructed has an outer frame or a margin with a background color.

Also in this embodiment, there is no need to manually calculate the width of a label or the like to be formed and it is only required to directly set a length of a side of an affixing area as the imaginary tape width T0, so that it is possible to dispense with troublesome calculations.

Therefore, according to the split image-forming method and device applied to the tape printing apparatus 1 of the present embodiment, even if a tape with a small width is used, it is possible to split a print image with a size corresponding to an affixing area into split images which can be printed on the tape and easily connected to each other. Further, according to the split image-printing method and device for printing the split images, it is possible to obtain the above advantageous effects obtained when the split image-forming method or device is applied to the tape printing apparatus.

The invention is not necessarily limited to the above embodiment, but can be carried out or put into practice in various ways.

For instance, although in the above embodiment, the basic image is printed while splitting the same into split images during execution of the split image-printing process (S97), printing of the basic image can be effected similarly if images adapted to the real tape width L are produced in advance before the printing operation.

More specifically, for example, the same images as printed on the tape strips as shown in FIGS. 12A to 12C are produced. Hereinafter, each image of this kind is referred to as "actual print image".

In the above process, the split margin dot width E(i) (the top overlap dot width Eu(i)+the bottom overlap dot width Ed(i)) corresponding to the split overlap width R(i) (the top overlap width Ru(i)+the bottom overlap width Rd(i)) is allocated in each of n (=3) image-printing areas having the real dot width W corresponding to the real tape width L respectively. And, an i-th split image is allocated in the remaining area having the split dot width D(i) corresponding to the split printing dot width T(i)), whereby n (=3) actual print images each having the real dot width W are produced, where i=1 to n. Further, the actual print images can be similarly produced through the allocation of the split dot widths D(i) alone as well as through the allocation of both the split margin dot width E(i) and the split dot width D(i).

In the above split image-forming method and device, in actual print images each having a real dot width W corresponding to a real tape width L are produced, each of which includes one of n split images forming the basic image. The real dot width W of each actual print image corresponds to the real tape width L and hence when a split image is to be printed on a tape, the printing operation can be started from a side edge of the tape. That is, according to the tape printing apparatus having the split image-forming method and device applied thereto, n split images can be easily printed simply by printing n actual print images. Further, if the actual print image data items representative of the actual print images are stored, the user can repeat the same printing operation as desired without effecting another basic image-splitting process, when any of the actual print images is printed on a subsequent occasion.

Assuming that this variation is applied to the image described with reference to FIGS. 12A to 12C, it is preferable to form actual print images such that each split margin dot width E(i) is assigned to a top overlap margin position and/or a bottom overlap margin position where actual print images overlaps, when an i-th split image is connected in the direction of the width thereof to an (i−1)-th split image and/or an (i+1)-th split image.

In other words, according to the tape printing apparatus having the split image-forming method and device applied thereto, as described above, simply by sequentially printing n actual print images sequentially, it is possible to connect split images to each other by using each split overlap width R(i) of each printed tape corresponding to the split margin dot width E(i) as an overlap margin to produce a label or the like with the imaginary tape width T0 and having a basic image printed thereon.

The above-mentioned split image-forming method and device and split image-printing method and device applicable to the tape printing apparatus 1 can be employed in various manners other than the above.

Therefore, in the following, a split image-forming method that splits a print (basic) image having character string images arranged thereon without splitting the character string images at intermediate portions thereof, a split image-printing method for printing the split print image, and a tape printing apparatus 1 having the split image-forming method and device and the split image-printing method and device applied thereto will be described as a second embodiment with reference to FIGS. 13 to 17B.

First, the split image-forming method and device applied to the tape printing apparatus 1 create n split images by splitting the basic image of m (1≦m) character string images arranged in m lines on a background image including an outer frame, a background pattern or the like, into n (1<n and at the same time m≦n) images such that each of the split images can be printed on a real tape having a real tape width L as a printing object.

That is, the basic dot width D0 of the basic image in which m (1≦m) lines of character string images are arranged on a background image is allocated to n (1<n and at the same time m≦n) split dot widths D(i) (i=1 to n, provided that D(i)≦W. and sum total ΣD(i)=D0) to create n split images to thereby divide the basic image split into n split images. The n split dot widths include m split dot widths corresponding to the m lines. In this case, it is only required that a split dot width D(j) (j=1 to m) of each of m split images each having a line of character string image is smaller than a real dot width W.

Figure 17A:
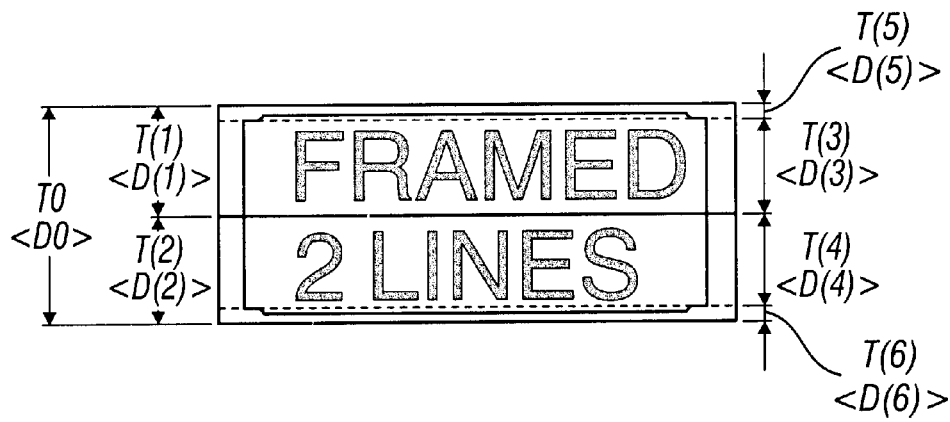
FIGS. 17A and 17B show examples of the basic image used in the FIG. 14 split-between-lines printing process.

For instance, as shown in FIG. 17A, when m=2, even assuming that the width of a background image located above a character string image on a first line is included in (added to) the width of the character string image on the first line, and the width of a background image located below a character string image on a second line is included in (added to) the width of the character string image on the second line, if each split dot width D(j) (J=1 to 2) is smaller than the real dot width W. it is possible to create n (=2) split images each having a split dot width D(1) and a split dot width D(2). If each split dot width D(j) becomes larger than the real dot width W when the width of each background image is included in the width of each character string image, it is only required to increase a split number.

That is, in the latter case, so long as each split dot width D(j) (j=3, 4) as shown in FIG. 17A is smaller than the real dot width W, it is possible to create n (=4) split images having a split dot width D(3) and a split dot width D(4) as well as a split dot width D(5) and a split dot width D(6) for outer frames, respectively.

Now, let it be assumed that the basic image does not contain a character string "2 LINES" in FIG. 17A. That is, the basic image is assumed to be comprised of portions corresponding to the split dot width D(3) as well as the split dot width D(5) and the split dot width D(6) for the upper and lower outer frames, respectively.

In this case, the basic image is formed of a single line "FRAMED", that is m=1. If the split dot width D(j) (j=1), as a total of the dot width of the line and the dot width (e.g. split dot width D(5)) of one (e.g. an upper one) of portions of the background image (outer frame image) above and below the character string image (image of "FRAMED") is smaller than the real dot width W, the width including the character string image and the portion of the background image is set as the split dot width D(1) and the width of the other part formed of the background image alone is set as the split dot width D(2) (corresponding to D(6) in FIG. 17A), whereby it is possible to form n (=2) split images.

Further, if the split dot width D(j) of the character string image becomes larger than the real dot width W when one portion (the upper portion) of the background image is included in the character string image (in the case of D(3)+D(5)>W in FIG. 17A), the width (D(5)) of the upper part of the background image, the width (D(3)) of the character string image and the width (D(6)) of the lower part of the background image are set as respective split dot widths D(i) (i=1 to 3), whereby it is possible to form n (=3) split images separately from each other.

In the above case, when the split dot width (D(5)) of the upper portion of the background image is larger than the real dot width W and/or the split dot width (D(6)) of the lower portion of the background image is larger than the real dot width W, the background image is further split to thereby create four or more (n≧4) split images. The same applies to cases where m>2 (see FIGS. 17B and 16C).

In any of the above cases, each split dot width D(j) (j=1 to m) of the m split images having respective m lines of character string images arranged therein is smaller in width than the real dot width W, so that each of the m split images is printable within the real tape width L.

Therefore, according to the tape printing apparatus 1 having the split image-forming method and device applied thereto, it is possible to print an image of each line of a character string without splitting the same at an intermediate portion thereof by simply printing the above m split images sequentially. That is, each line of character image can be printed without splitting the same, even if the basic dot width D0 of the basic image as a whole is larger than the real dot width W of a real tape. Hence, it is possible to make a juncture of connected split images still less conspicuous than when the line of character image is split for printing.

As a result, according to the split image-forming method and device, it is possible to form a plurality of split images which can be printed on tapes as respective image elements of a print (basic) image which is larger in width than a tape and has character string images arranged on a background image including an outer frame and a background pattern. Especially, it is possible to form split images which present excellent appearance even when connected to each other after split printing.

It should be noted that in the case of the above split image-forming method and device, the basic image may be split into n images after creating the same or n split images may be directly produced.

Therefore, in the following, with reference to FIG. 13, a more specific description will be made of a method of creating n split images by first creating a basic image (FIG. 16C image) larger in width than the tape width, and then divide the created basic image into n split images. Then, a method of directly creating n split images based on an original image which is half in size in terms of a side-to-side ratio compared with the FIG. 16C basic image will be described with reference to FIGS. 14 and 15.

According to the former of the methods mentioned above and the device using the same, a basic image of m (1≦m) character string images arranged in m lines on a background image including an outer frame, a background pattern and the like is split into n (1<n and at the same time m≦n) images such that each of the n images can be printed on a real tape having a real tape width L as a printing object by a split printing method, to thereby create n split images. Referring to FIG. 13, the tape printing apparatus 1 to which the method or device is applied first creates the basic image in response to entry of text data at a step S101 (corresponding to the step S91 in FIG. 6).

Figure 16A:
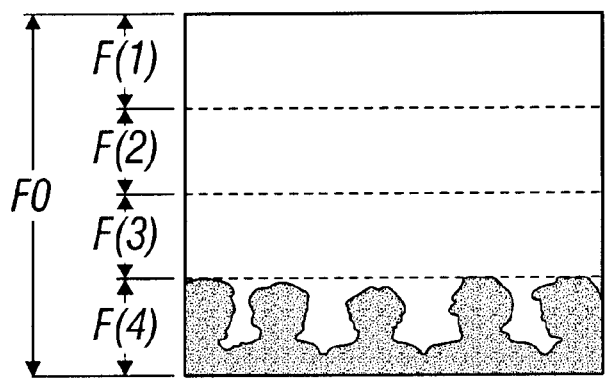
FIGS. 16A to 16C are diagrams which are useful in explaining a background image and a provisional laid-out basic image used in the FIG. 14 split-between-lines printing process, a basic image to be split by the FIGS. 13 and 14 printing processes for split-between-lines printing, and an image of real tapes (labels) produced by printing the above data items and connected to each other.
Figure 16B:
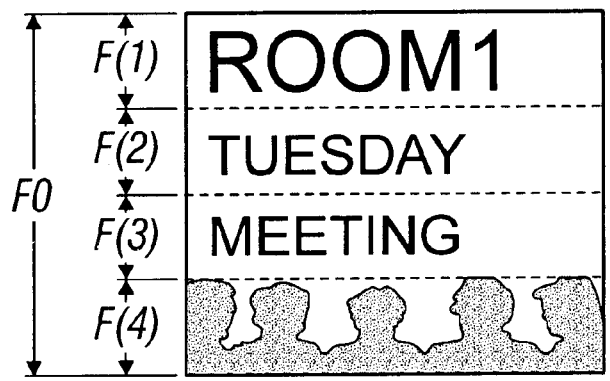

For instance, when an ornamental outer frame image (background image) shown in FIG. 16A has a provisional basic dot width F0, text data items comprised of m (=3) lines, i.e. "ROOM 1", "TUESDAY" and "MEETING" are loaded as m lines of character string images arranged on the background image, whereby a provisional basic image shown in FIG. 16B is produced.

The basic image having the basic dot width D0 can be produced by increasing or decreasing the size of the provisional basic image in proportions of the provisional basic dot width F0 to the basic dot width D0. The proportion and a manner of increasing or decreasing the provisional basic image will be described based on an example described hereinafter with reference to FIG. 14, and the following description is made assuming that the basic image having the basic dot width D0 equal to the provisional basic dot width F0 is created from the beginning. That is, the description is made assuming that the image shown in FIG. 16B is identical in size to the image in FIG. 16C.

After the basic image is created at the step S101, an imaginary tape width T0 is set at a step S102. Although this step can be dispensed with in this embodiment, it is easier to explain and understand the present process in comparison with the FIG. 6 routine when it is included than when it is excluded, so that the step S102 is included in the FIG. 13 routine. Of course, the step S102 corresponds to the step S92 in FIG. 6, and the inclusion of the step makes it easier to prepare a basic image adapted to an affixing area by increasing or decreasing the size of the above provisional basic image, as well as arrange the above-mentioned split margin dot width E(i) and split overlap width R(i) corresponding thereto. This enables all the ideas or methods of the first embodiment to be applied to the present embodiment.

When the imaginary tape width T0 is set at the step S102, next, a real tape width L is set at a step S103 (corresponding to the step S93 in FIG. 6). Then, the basic dot width D0 of the basic image is detected from the basic image, and a dot width of each character string image is detected as a provisional split dot width PRD(j) (j=1 to m, and m=3 in FIGS. 16A to 16C) for each line at a step S104.

Figure 16C:
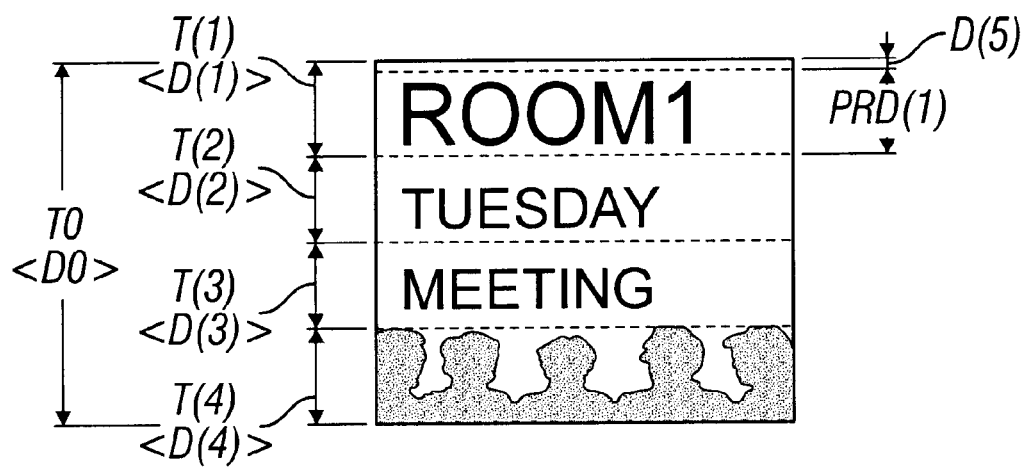

After detecting the basic dot width D0 and the provisional split dot width PRD(j) of each line (S104), it is determined at a step S105 whether or not the basic dot width D0 of the basic image is larger than the real dot width W corresponding to the real tape width L and at the same time each of the provisional split dot widths PRD(j) (j=1 to m, and m=3 in FIGS. 16A to 16C; in a subsequent process, a split dot width D(5) of an upper image of the outer frame adjacent to the provisional dot width PRD(1) in FIG. 16C is added to the provisional dot width PRD(1) to set a split dot width D(1)) of the m split images each including one of the m character string images is smaller than the real dot width W. That is, at the step S105 it is determined whether or not each line can be printed within the real tape width L in the printing process.

Figure 13:
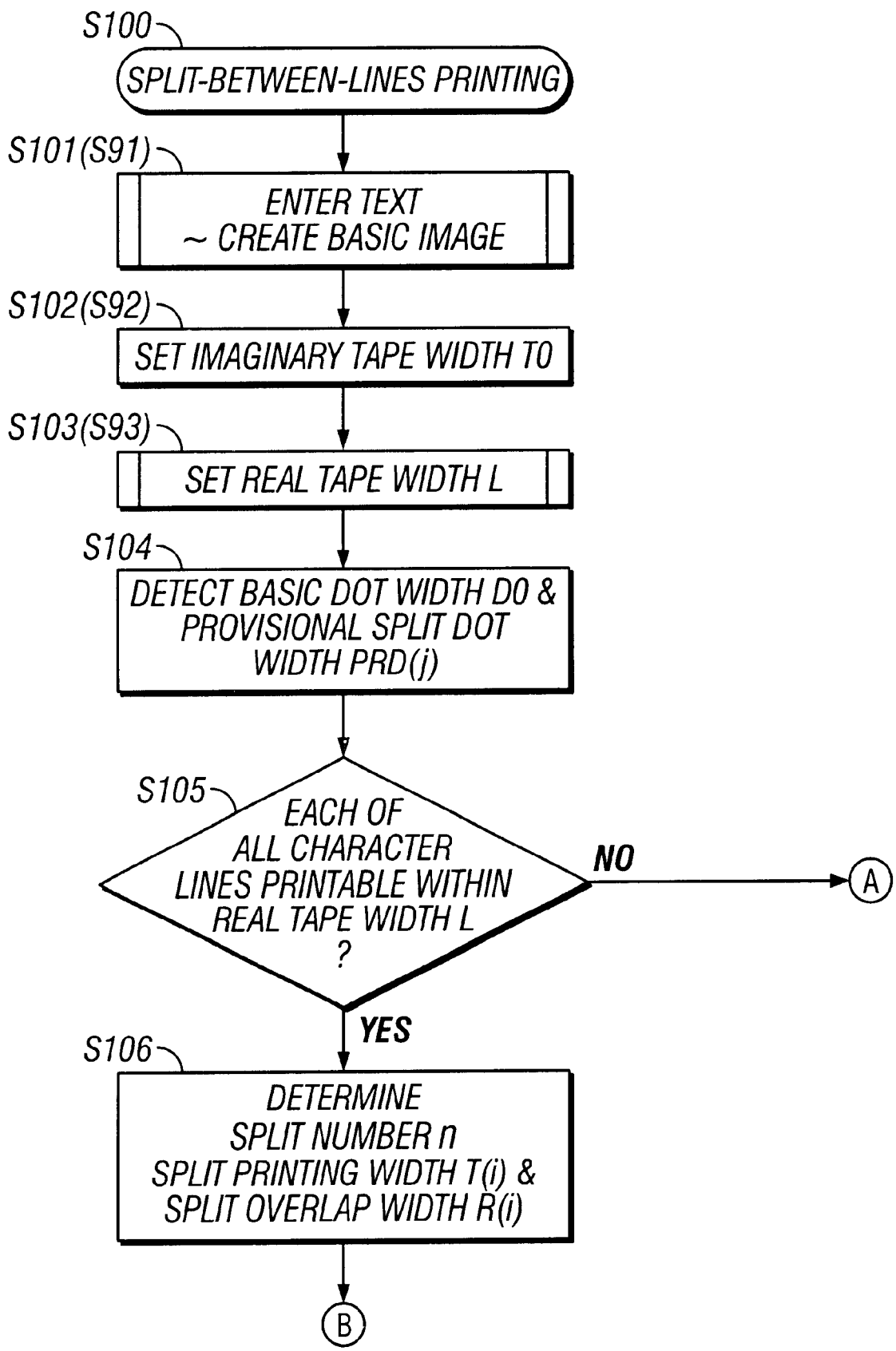
FIG. 13 is a flowchart showing an example of a split-between-lines printing process.

If the above determining conditions are not fulfilled (No to S105), the present image-splitting method can not be applied and hence the process described above with reference to FIG. 6 is carried out (via A shown in FIGS. 13 and 6).

When the determining conditions are fulfilled (Yes to S105), a split number n, each split printing width T(i) and each split overlap width R(i) are determined at a step S106, which are used in allocating the basic dot width D0 to n split dot widths D(i) (i=1 to n, where D(i)≦W. the sum total ΣD(i)=D0). The n split dot widths include the m split dot widths corresponding to the m lines.

For instance, in FIG. 16C, W≧PRD(1), W≧D(2) and W≧D(3) hold, and hence the determining conditions are fulfilled (Yes to S105). Further, W≧PRD(1)+D(4), W<D(3)+D(4) and at the same time W≧D(4) hold. Therefore, at the step S106, the split number n is set to 4, the split printing width T(1) is made equal to the split dot width D(1)=PRD(1)+D(4), the split printing width T(2) to the split dot width D(2), the split printing width T(3) to the split dot width D(3), and the split printing width T(4) to the split dot width D(4), with each split overlap width R(i)=L−T(i).

Processes to be carried out after determining the above settings are the same as described hereinbefore with reference to FIG. 6, and detailed description thereof will be omitted (the program proceeds to FIG. 6 process via B in FIGS. 13 and 6).

In the above process, the m split images corresponding to the m lines (m=3 in FIGS. 16A to 16C), i.e. corresponding to i=1 to 3, are formed as split images printable within the real tape width L. This also makes it possible for the tape printing apparatus 1 having the split image-forming method and device applied thereto to print each line of character string image without slitting the same, so that it is possible to prevent a juncture of connected split images from becoming conspicuous (see FIG. 16C).

Therefore, according to the split image-forming method and device, a print (basic) image that is larger in width than a tape width and has character string images arranged on a background image including an outer frame and a background pattern, can be split into n split images (n=4 in FIGS. 16A to 16C) such that the split images can be printed on respective strips of tape, which are connected to each other to combine the split images into an image having excellent appearance.

Of course, in the above process, if the split overlap width R(i) and the split printing width T(i) (i=1 to n, and n=4 in FIGS. 16A to 16C) are allocated to the real tape width L, and an i-th split image is printed in a split printing area having the split printing width T(i), similarly to the first embodiment described above, the n split images can be suitably printed in the respective split printing areas of the real tape.

Further, if each split overlap width R(i) is allocated to a top overlap margin position and/or a bottom overlap margin position, such that an i-th split image formed by printing an i-th split image is connected in the direction of the width of each real tape with an (i−1)-th split image printed immediately before printing the i-th split image and/or an (i+1)-th split image printed immediately after printing the i-th split image, it is possible to produce a label or the like having a basic image printed thereon, simply by printing the split images and thereafter connecting the printed split images to each other by using the overlap margins each having a split overlap width R(i). Further, since the printed tape strips are connected to each other by using their overlap margins, it is possible to prevent the ground color of the affixing area from being viewed through a gap formed at a juncture of connected split images, and thereby making the label attractive in appearance.

Moreover, if each actual print image adapted to the real tape width L is produced in advance before the printing operation, the same printing as described above can be carried out.

In this case, in each of n (n=4 in FIGS. 16A to 16C) image-printing areas each having the real dot width W corresponding to the real tape width L, the split dot width D(i) and/or the split margin dot width E(i) as a margin thereof (E(i)=W−D(i), i=1 to n) are/is allocated, and an i-th split image is arranged in an area of the split dot width D(i), whereby n actual print images each having the real dot width W are produced. That is, the n actual print images produced each have the real dot width W and contain one of the n split images constituting the basic image.

In the above case, the real dot width W of each actual print image corresponds to the real tape width L and hence split image can be printed on a real tape, starting from a side edge thereof. That is, according to the tape printing apparatus having the split image-forming method and device applied thereto, the n split images can be easily printed by printing n actual print images sequentially. Further, if the actual print image data representative of each actual print image is stored, the user can repeat the same printing operation as desired without carrying out another basic image-splitting process, when the actual image is printed on a subsequent occasion.

Further, if the split margin dot width E(i) is arranged at a top overlap margin position and/or a bottom overlap margin position, such that an i-th split image formed by printing an i-th split image is connected in the direction of the width of each real tape with an (i−1)-th split image printed immediately before printing the i-th split image and/or an (i+1)-th split image printed immediately after printing the i-th split image, it is possible to produce a label or the like having a basic image printed thereon, simply by printing split images and thereafter connecting the printed split images to each other by using overlap margins each having a split overlap width R(i). Further, since the printed tape strips are connected to each other by using their overlap margins, it is also possible to prevent the ground color of the affixing area from being viewed through a gap formed at a juncture of connected split images, and thereby making the label attractive in appearance.

Next, description will be made of the tape printing apparatus 1 to which are applied the above-mentioned split image-forming method and device for directly forming n (1<n) split images each of which can be printed on the real tape having the real tape width as elements of the basic image having m (1≦m and at the same time m≦n) character string images arranged in m lines on a background image including an outer frame and a background pattern.

Figure 14:
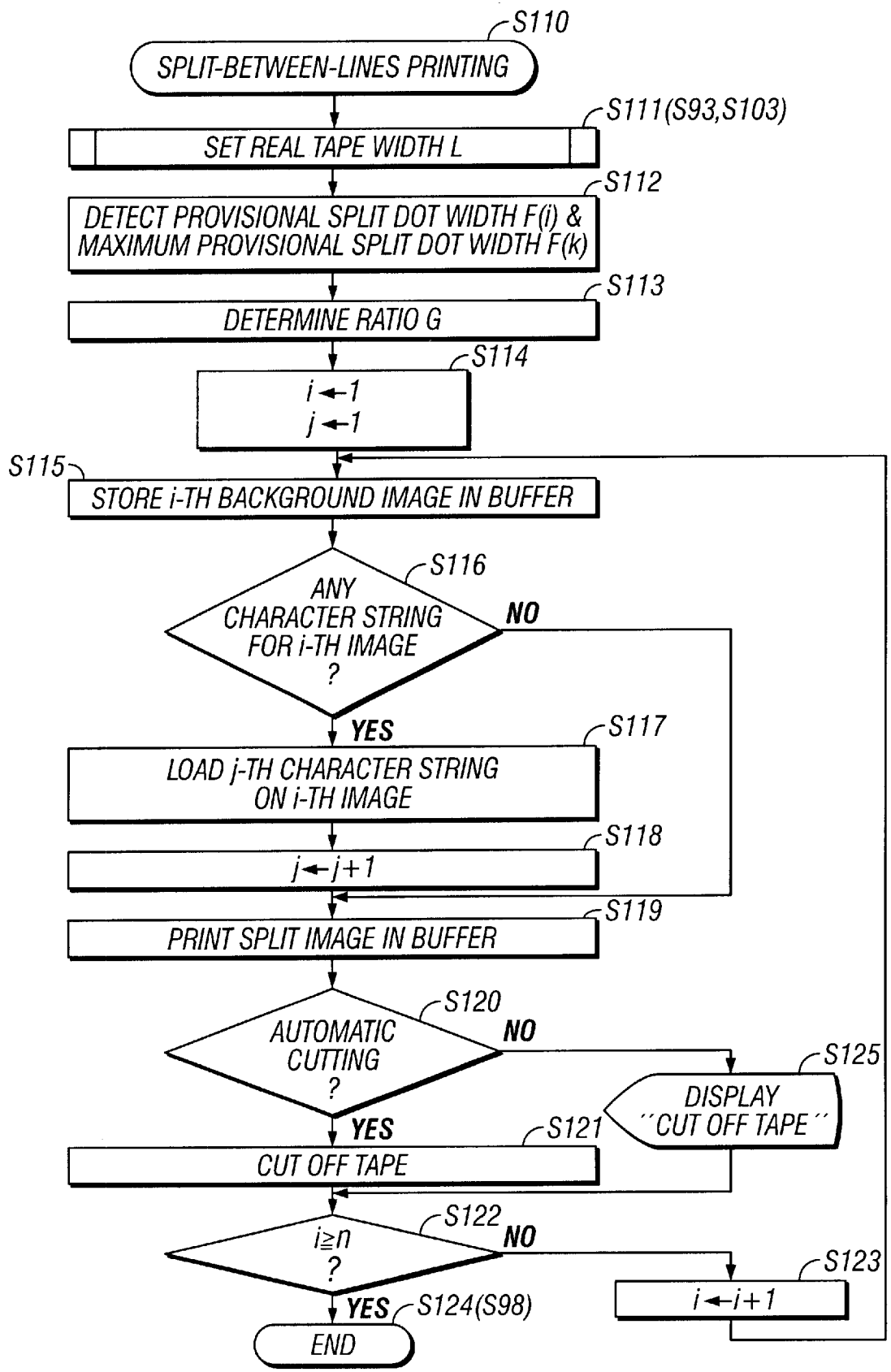
FIG. 14 is a flowchart showing another example of the split-between-lines printing process.

Referring to FIG. 14, according to this split image-forming method and device, a real tape width L is set at a step Sill (corresponding to the step S93 in FIG. 6 and the step S103 in FIG. 13), and then, assuming that each of m character string images is arranged as it is on background image (original image) data having a provisional basic dot width F0, n (m≦n) provisional split dot widths F(i) (i=1 to n, where the sum total ΣF(i)=F0) including m provisional split dot widths F(j) (j=1 to m) each having one of the character string images arranged therein, and the maximum provisional split dot width F(k) (k is equal to one of 1 to n) are determined at a step S112.

That is, assuming that m character string images are arranged on the background image without changing the size of a background image of the stored background image, provisional split dot widths F(i) of m split images each containing one character string image, and provisional split dot widths F(i) of (n−m) split images each containing only a background image therein, and the maximum provisional split dot width F(k) of the provisional split dot widths F(i) are determined.

For instance, let it be assumed that when background image (ornamental outer frame image) shown in FIG. 16A has a dot width F0, the dot width F0 is determined as the provisional basic dot width F0, and m (=3) lines of text data items, i.e. "ROOM 1", "TUESDAY" and "MEETING" are arranged as character string images on the background image.

In other words, assuming that the image as shown in FIG. 16B is loaded, the provisional split dot widths F(1), F(2) and F(3) of the m (=3) split image items each containing a character string image, and the provisional split dot width F(4) of the (n−m) (=1) split image having only a background image therein are determined. For instance, if F(1)≧F(4) ≧F(3)≧F(2) hold, the maximum provisional split dot width F(k) (=F(1)) is determined at the step S112.

Next, a ratio G based on which the size of each split image is increased or decreased so as to receive a split image having the maximum provisional split dot width F(k) within the real dot width W of a possible image printable within the real tape having the real tape width L is determined at a step S113.

For example, in FIG. 16B, the ratio G is determined such that G≦W/F(k)=W/F(1) hold. When the ratio G determined has a value including a decimal portion, such as W/F(k)=2.2, the value G=2.2 may be left as it is or may be converted into an integer, such as G=2, by taking into account the balance between the real tape width L and the provisional split dot width F(i) or ease of processing. Of course, the ratio G may be displayed in a fraction, such as G=2/3. In the following, G=2 is adopted for purposes of ease of description.

After determining the ratio G at the step S113, variables i and j are initialized to 1 at a step S114 and then a first (i=1) background image is loaded based on the ratio G into a print image data buffer at a step S115. In the illustrated example, a portion having the provisional split dot width F(i)=F(1) in the background image shown in FIG. 16A, that is, image data representative of a rectangular area formed by an uppermost portion of the background image and front and rear outer frames is loaded into the buffer based on the ratio G (=2) at the step S115.

In this case, the resulting dot width of the first (i=1) split and loaded image data of the background image (split and loaded background image) is D(i)=D(1)=G×F(i)=2×F(1), compared with an original dot width of the FIG. 16B provisional split dot width F(i)=F(1). In other words, the dot width of the split and loaded background image becomes equal to a value obtained by splitting the basic dot width D0 of the basic image of the FIG. 16C.

Next, it is determined at a step S116 whether or not there is a character string image for the first (i=1) split background image data loaded in the buffer, that is, whether or not there is any character code data which should be developed into a character image to be combined with the first (i=1) split background image of which data is loaded into the buffer. In the illustrated example, as shown in FIG. 16B, the character image "ROOM 1" is required to be allocated in the first (i=1) split background image (Yes to S116) and hence, next, a first text data item of "ROOM 1" is developed into its character string image at a step S117 and the variable j (=1) is updated to j=2 at a step S118.

In this state, the first (i=1) split image having the FIG. 16C split dot width D(i)=D(1) is produced at the step S118, and then, the split image represented by the split image data loaded in the buffer is printed, whereby the split image having the spit printing width T(i)=T(1) is printed on the real tape T at a step S119.

Figure 15:
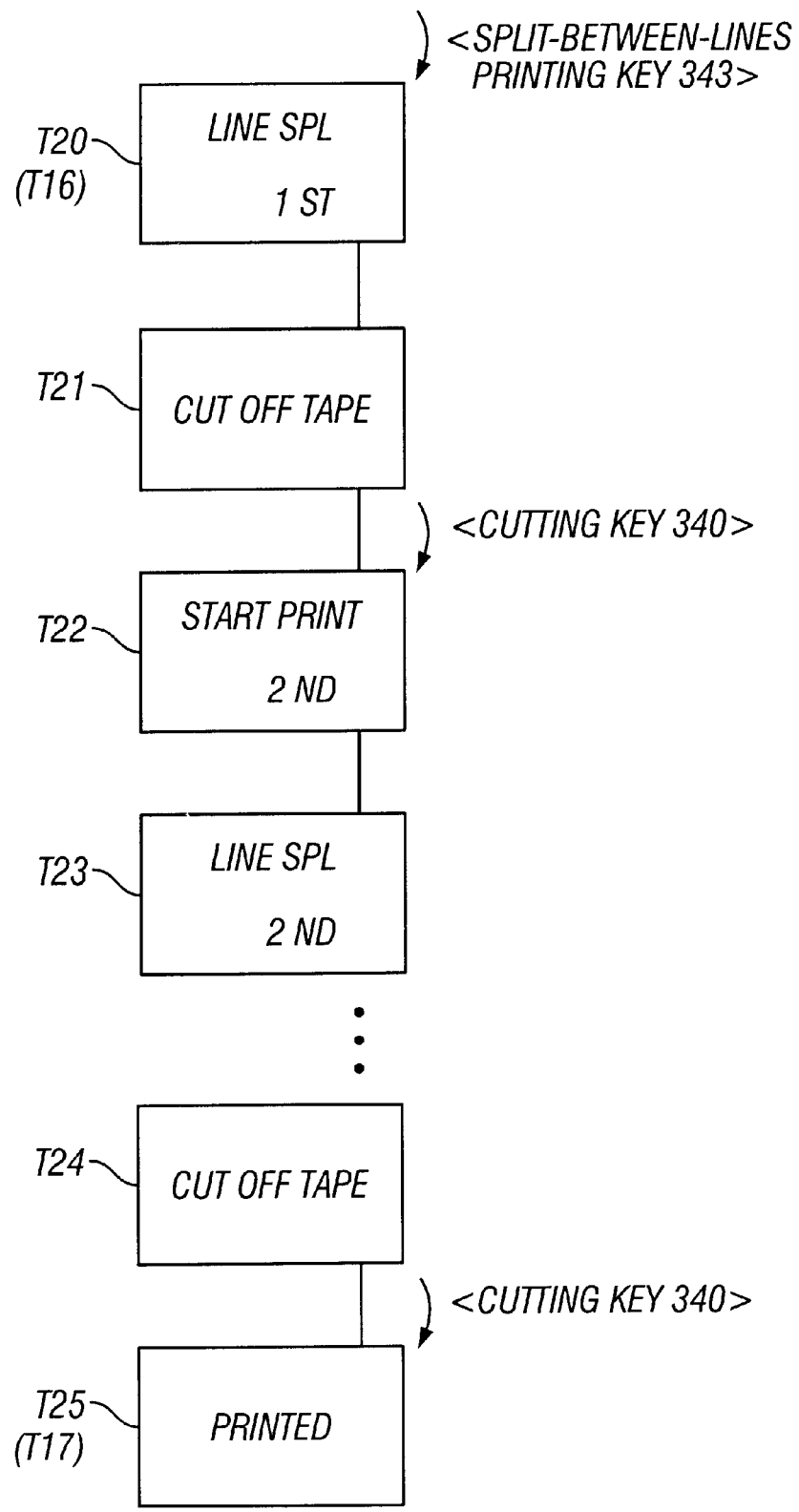
FIG. 15 is a diagram schematically showing images displayed on the screen which are useful in explaining the FIG. 14 split-between-lines printing process.

Now, in the present embodiment (second embodiment), similarly to the first embodiment described hereinabove, when the split-between-lines printing key 343 is depressed in the state of another display screen being displayed, e.g. when in the text display mode, the split printing keyboard interrupt is generated and, as shown in FIG. 15, a message "LINE SPL 1ST" is displayed (T20: corresponding to T16 in FIG. 7), to notify that the printing operation is "split-between-lines printing operation" different from a normal and collective printing operation and being carried out for "first portion of the print image". In the state of this message screen being displayed, the split-between-lines printing routine (S110) is started and carried out. After the split printing operation at the step S119 is terminated, if it is determined at a step S120 that an automatic cutting mode has been selected (Yes to S120), operations for feeding and cutting off the real tape T are automatically carried out at a step S121, whereas if it is determined that a manual cutting mode has been selected (No to S120), a message "CUT OFF TAPE" for prompting the user to operate the cutting key 340 is displayed at a step S125 (T21).

When the automatic tape-cutting process (S121) is terminated, or alternatively when the cutting key 340 is operated from the state of the screen T21 at the step S125, a first (i=1) tape (label) bearing the first (i=1) split image having the split dot width D(1) and printed according to the split printing width T(1) is obtained. Then, it is determined at a step S122 whether or not an n-th tape (label) has been produced, that is, whether or not i≧n holds.

At this time point of the procedure of the present case described, i=1 (<n) still holds (No to S122) and hence, after i is updated (incremented by 1) at a step S123, a message "START PRINT 2ND" (which should be interpreted as "Start next printing operation for the second portion") is displayed (T22) and then, a message "LINE SPL 2nd" is displayed to indicate that the split-between-lines printing is being carried out for the second portion (T23). In the state of the screen T23, the same process as carried out when i=1 is carried out again.

That is, similarly to the case where i=1, the second (i=2) background image loaded based on the ratio G into the print image data buffer at the step S115. In the illustrated example, the front and rear outer frame portions of a background image having the provisional split dot width F(2) in FIG. 16A is loaded based on the ratio G (=2) into the buffer at the step S115.

Next, it is determined at the step S116 whether or not a character string image is required to be allocated in the second (i=2) background image. In the illustrated example, as shown in FIG. 16B, the character string image of "TUESDAY" is required to be developed on the second (i=2) background image (Yes to S116) and hence, text data of "TUESDAY" of the second (j=2) line is developed as the character string image at the step S117 and the variable j (=2) is updated to 3 at the step S118

In this state, the second (i=2) split image having the split dot width D(2) shown in FIG. 16C has been prepared at the step S118, and hence next, at the step S119, the split image data loaded in the buffer is printed to produce the real tape T bearing the split image with the spit image printing width T(2).

Next, if it is determined that the automatic cutting mode has been selected (Yes to S120), the automatic tape-cutting process (S121) is carried out, or if it is determined that the manual cutting mode has been selected (No to S120), the cutting key 340 is operated at the step S125, whereby a second (i=2) tape (label) on which the second (i=2) split image having the split dot width D(2) is printed according to the split printing width T(2) is obtained. Next, since i=2 (No to S122), i is incremented to 3 at the step S123 and then, messages "START PRINT 3RD" to "LINE SPL 3RD) are displayed to indicate that the split-between-lines printing is started and being carried out for the third portion of the print image. While displaying the messages on the display screen, the same process as carried out when i=1 or 2 is carried out again.

That is, for example, the front and rear outer frame portions of the third (i-th: i=3) background image in FIG. 16A which has a provisional split dot width F(3) is loaded based on the ratio G (=2) into the buffer at the step S115. Then, text data of "MEETING" of the third (j-th: j=3) line is developed as a character string image at the step S117 (Yes to S116) and the variable j (=3) is updated to 4 at the step S118. In this state, the third (i=3) split image having the split dot width D(3) in FIG. 16C has been prepared at the step S118 and then, at the step S119, the split image data in the buffer is printed to produce the real tape T on which the split image having the split image printing width T(3) is printed.

Next, if it is determined at the step S120 that the automatic cutting mode has been selected, the automatic tape-cutting process (S121) is carried out at the step S121, or if it is determined at the step S120 that the manual cutting mode has been selected (No to S120), the cutting key 340 is operated (T24 in FIG. 15), whereby the third (i=3) tape (label) on which the third (i=3) split image having the split dot width D(3) is printed according to the split printing width T(3) is obtained. Next, since i=3 (No to S122), i is incremented to 4 at the step S123 and then, messages "START PRINT 4TH" and "LINE SPL 4TH" are displayed to indicate that the split-between-lines printing is started and being carried out for the fourth portion of the print image. While displaying the messages on the display screen, the program proceeds to a next step carried out for i=4.

That is, for example, an ornamental outer frame having a provisional split dot width F(4) in a fourth (i=4) background image in FIG. 16A is loaded based on the ratio G (=2) into the buffer at a step S115. In this state, a fourth (i=4) split image having the split dot width D(4) in FIG. 16C is prepared, but no character string image is developed as the j-th (j=4) line (No to S116) and next, the split image the data representative of which is loaded in the buffer is printed at the step S119, to produce the split image having the spit image-printing width T(4) and printed on the real tape T.

When the automatic tape-cutting process (S121) is terminated at the step S121 if it has been determined at the step S120 that the automatic cutting mode has been selected, or when the operation of the cutting key 340 is completed (T24 in FIG. 15) if it has been determined at the step S121 that the manual cutting mode has been selected (No to S120), a fourth (i=4) tape (label) on which the fourth (i=4) split image having the split dot width D(4) is printed according to the split printing width T(4) is obtained. Since i=4 (≧n) holds (Yes to S122), then, a message "PRINTED" is displayed (T25) to indicate the completion of the printing, followed by terminating the whole split-between-lines printing routine shown in FIG. 14 at the step S124.

As described above, according to this split image-forming method and device, assuming that without changing the size of a background image represented by the stored background image data, m (=e.g. 3) character string images are arranged in the background image, provisional split dot widths F(i) of m split images each including a character string image, and provisional split dot widths F(i) of (n−m) (e.g. n−m=4−3=1) split images each having only a background image therein, and the maximum provisional split dot width F(k) of the provisional split dot widths F(i) are determined. A ratio G (G≦W/F(k)) for adjusting the size of the split image having the maximum provisional split dot width F(k) to the real dot width W printable within the real tape width L is determined.

That is, if a background image and a character string image constituting each split image are loaded and combined at the ratio G (=2, for example), each of n (=4) split images can be arranged within the real dot width W. In other words, each of the split image increased or decreased at the ration G can be printed on the real tape width L. Therefore, according to the split image-forming method and device, the background image data and character string image data are loaded while adjusting the size thereof based on the ratio G, whereby it is possible to produce n split images each printable within the real tape width L.

Similarly to the example of the first embodiment described hereinabove, this feature of the present embodiment makes it possible for the tape printing apparatus 1 having the split image-forming method and device applied thereto to print each line of character string image without splitting the same, so that it is possible to prevent a juncture of connected split images from becoming conspicuous. Therefore, according to the split image-forming method and device, it is possible to form n split images, as image elements forming a print (basic) image that is larger in width than a tape width and has character string images arranged in a background image including an outer frame and a background pattern, such that the split images can be printed on respective tape strips, particularly such that the split images printed on the tape strips can be connected to each other to form a whole image which exhibits excellent appearance.

Further, an i-th split image is printed immediately after producing the same, and this printing operation is repeatedly carried out n times. Therefore, only one split image is required to be stored in the print image data buffer, described above with reference to FIG. 14, so that the capacity of the memory device can be saved. Moreover, the creation and printing of split images can be successively performed in parallel with each other, which enhances processing speed of the apparatus.

Of course, similarly to the embodiments described above, through allocating the split overlap width R(i) and the split printing width T(i) (i=1 to n, n=4 in FIGS. 16A to 16C) in the real tape width L, and printing an i-th split image in a split printing area having the split printing width T(i), or allocating each split overlap width R(i) to a suitable overlap margin position for connecting split images printed on respective tape strips, or forming an actual print image adjusted to the real tape width L in advance before a printing operation, or allocating the corresponding split dot width D(i) and split margin dot width E(i) in the actual print image instead of allocating the split printing width T(i) and the split overlap width R(i), the various advantageous effects described above can be obtained, including the attractive appearance of a label or the like combined by utilizing the overlap margins to paste up.

It should be noted that although in the example described above, each split dot width D(j) for each line is different from each other as shown in FIG. 16C, if each split image has an identical split dot width D(j), as in the case of FIG. 17A, it becomes easier to carry out internal processing, such as a process for determination of a ratio G.

Further, if the tape printing apparatus 1 is configured such that a portion to be split (spacing between lines) in the printing operation can be designated from the display screen 81, it becomes possible to produce labels modified in various ways according to user's ideas, such as a label comprised of first two lines printed on a first tape strip and a third line on a second tape strip.

Similarly, if the tape printing apparatus 1 is configured to be capable of designating an end (corresponding to a line space) at which one split printing operation is terminated or the number of lines for one split printing operation, it is possible to print a desired number of lines for each tape strip different in ground color, e.g. such that after printing a first tape (label), the first tape is replaced by a tape different in color for printing a second tape (label). This makes it possible to create a label or the like which is elaborately designed or laid out.

Figure 18:
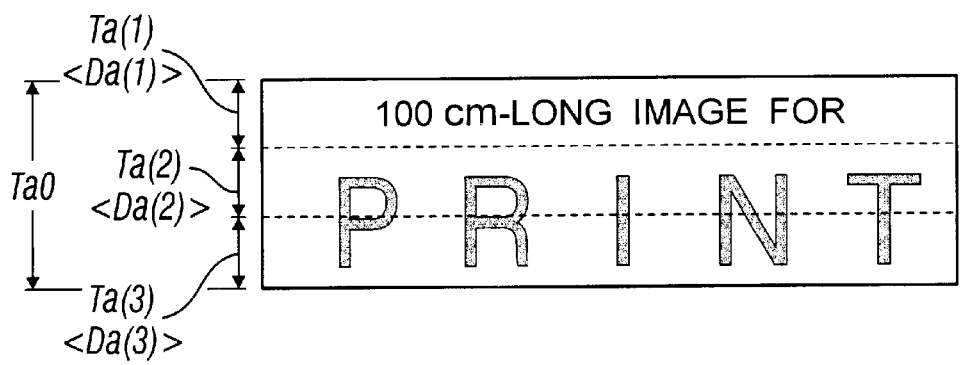
FIG. 18 shows an example of a basic image shown in FIG. 22 in a state split between the lines of characters.

Now, for instance, FIG. 18 shows a label which is 24 cm wide and 100 cm long.

If the label is approximately 8 cm wide and 33 cm long, which is approximately one third of each corresponding dimension mentioned above, the label can be printed on a tape having a width of 96 mm (9.6 cm). Even if the width of the label is approximately 24 cm, which is identical to the given width, if the length thereof is approximately one third of the given size, the image is similar to the one described above with reference to FIGS. 11 to 12C. Therefore, by splitting the width of the label, e.g. into a split printing width Ta(1) <split dot width Da(l)>=96 mm <1024 dots>, a split printing width Ta(2)<Da(2)>=72 mm <768 dots>, and a split printing width Ta(3)<Da(3)>=72 mm <768 dots> while setting a split overlap width R(2)=a split overlap width R(3)=a top overlap width Ru(2)=a top overlap width Ru(3)= 24 mm <256 dots>, it is possible to produce a label attractive in appearance.

However, if the label is 100 cm (1000 mm) long, it is difficult to align or register ends of the tape strips printed and cut off as portions of an entire label when the tape strips are affixed to a desired place (affixing area) to form the whole label.

Therefore, in the following, a split image-forming method and a split image-printing method as well a tape printing apparatus 1 to which these method are applied, according to a third embodiment, will be described with reference to FIG. 18 et seq. The split image-forming method according to the third embodiment makes it possible to form a plurality of split images printable on respective tape strips as a plurality of image elements in a longitudinal sequence to be connected to form a print (basic) image in which character string images are arranged in horizontal lines. More particularly, the split image-forming method makes it possible to form split images which can be formed into a print image having an attractive appearance simply by connecting split and printed character images to each other after the split images are printed on respective portions i.e. strips of a tape.

It should be noted that in the case of the third embodiment as well, similarly to the above second embodiment, a basic image may be split into n images after creating the same or n split images may be directly produced.

Therefore, in the following, description will made of a method by which a basic image is first prepared by arranging a FIG. 22 image (the same image as shown in FIG. 18) as a basic image therefor and then split into n images to thereby create n split images. Then, a method of directly producing n split images will be described.

According to the first-mentioned one of the split image-forming methods and device therefor, the basic image including m ($1 \leq m$) character string images each comprised of character images arranged in the longitudinal or horizontal direction is split into n ($1 < n$) images of a longitudinal sequence.

The third embodiment is distinguished from the first embodiment in which a basic image is horizontally split (into a plurality of images in a vertical sequence to be connected in the direction of the width of the basic image), only in that the basic image is vertically split (into a plurality of images in a horizontal sequence to be connected in the direction of the length of the basic image), so that in this embodiment, basically, it is possible to split the basic image by the same splitting method as employed in the first embodiment.

In the split image-forming method and device according to the third embodiment, first, a real tape width L (L>0) of a real tape as a printing object is set. This process (corresponding to the step S93 in FIG. 6, the steps S103 in FIG. 13 and S111 in FIG. 14) is described hereinabove and hence description thereof will be omitted.

After setting the real tape width L of the real tape, assuming that a basic dot width (basic image length) D0 in the longitudinal direction of the basic image is a dividend and a real dot width W printable on the real tape L is a divisor, an integer n ($n \geq Q$) which is equal to or larger than a quotient Q (including a decimal portion) of the dividend divided by the devisor is determined as a split number n.

Figure 22:
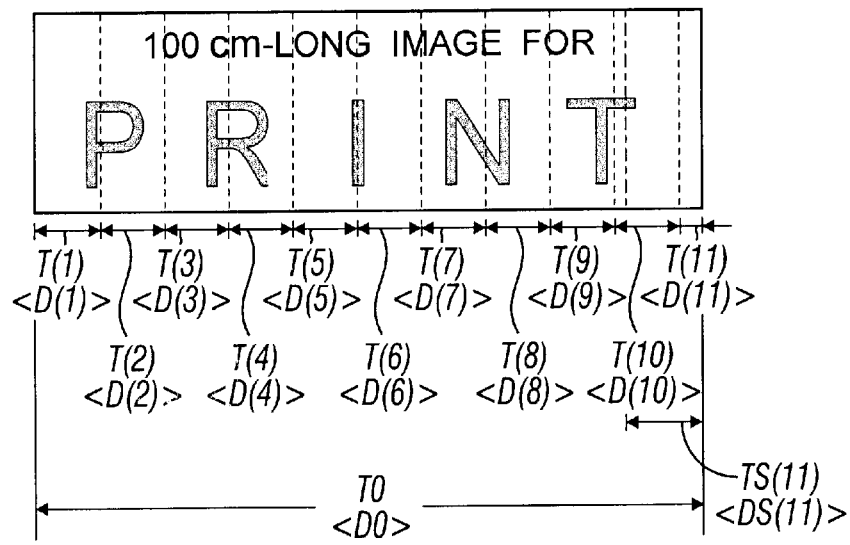
FIG. 22 shows an example of the basic image used in the FIG. 19 columnar split printing process.

The FIG. 22 image is 1000 mm long, which corresponds to the basic dot width D0=10667 dots (1000 <10667>) and hence, if the real tape width L is equal to 96 mm (corresponding to the real dot width W=1024 dots), for instance, the split number n=11 (Q=10.42) is determined.

Next, the basic dot width D0 is split into n split dot widths D(i) (i=1 to n, where D(i)$\leq$W, and the sum total $\Sigma$D(i)=D0), whereby the basic image is split into n split images each having a split dot width D(i).

In the illustrated example of FIG. 22, the basic image is simply split into split images having split dot widths D(1) to D(10) (=1024 dots) and D(11) (=427 dots).

As described above, in the split image-forming method and device, the basic dot width D0 in the longitudinal direction of the basic image having m character string images ($1 \leq m$, two (m (=2)) character string images different in size in FIG. 22) arranged therein is split into n split dot widths D(i) (i=1 to n, where D(i)$\leq$W, and the sum total $\Sigma$D(i)=D0), whereby the basic image is split into n images to produce n split images.

In the above process, each split dot width D(i) is smaller than the real dot width W printable within the real tape width L. and hence each split image can be printed on the real tape having the real tape width L. Further, since the basic image is split into n images of a longitudinal sequence, each split image is formed to contain a transverse image element of the character string image produced by splitting the m character string images into a longitudinal sequence of n spit images.

Therefore, according to the tape printing apparatus 1 having the split image-forming method and device applied thereto, a whole print (basic) image can be printed simply by printing the above n split images sequentially. Further, connecting portions for connecting split images to reconstruct a basic image are formed in the direction of the width of each character string image, which prevents the connecting portions for connecting character lines of respective characters from being displaced together, so that split print images can be combined into the whole image with ease.

Of course, in this embodiment as well, as described above, by allocating each split overlap width R(i) and split printing width T(i) (i=1 to n, n=11 in FIG. 22) in a real tape width L, an i-th split image can be printed in a split printing area having the split printing width T(i), or each split overlap width R(i) can be allocated such that the same is located to an overlap margin position for affixing or connecting respective split images to each other. Further, an actual print image adjusted to the real tape width L can be produced in advance before a printing operation, or instead of allocating each split printing width T(i) and split overlap width R(i), corresponding split dot width D(i) and split margin dot width E(i) can be allocated in the actual print image. All this enables more attractive labels and the like to be prepared by using overlap margins, thereby further increasing the abovementioned advantageous effects.

Figure 24:
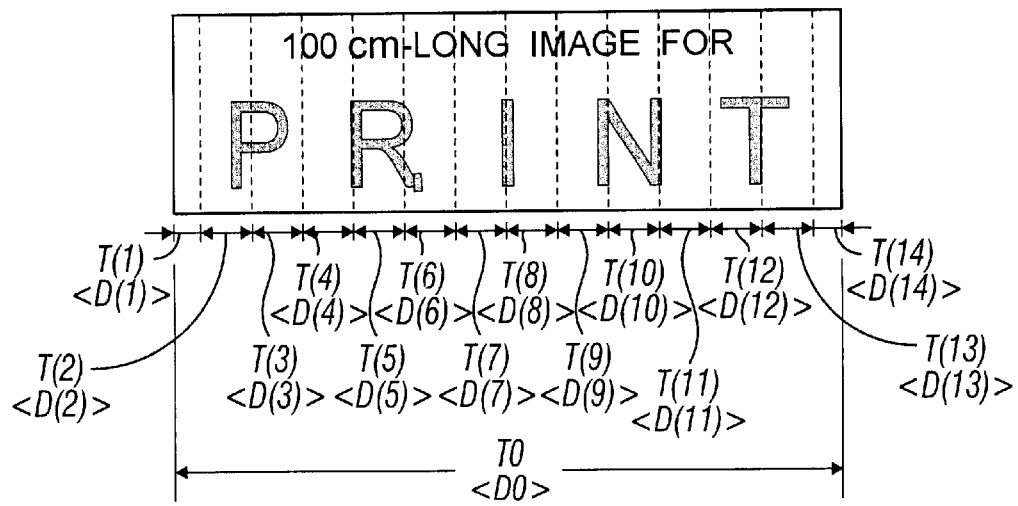
FIG. 24 is a diagram similar to FIG. 22, which is useful in explaining another example of the manner of columnar split printing carried out by using another split number.

Moreover, if the split number and the split overlap widths R(i), described above, are adjusted to split images such that respective characters, e.g. at a first line are contained in each split printing width T(i), that is, such that split image-connecting portions are located between characters, the connecting portions is made more inconspicuous, thereby improving the appearance of labels or the like (see FIG. 24).

As a result, according to the split image-forming method and device, it is possible to form a plurality of split images each printable on the tape, as a plurality of longitudinal image elements of a print (basic) image which is formed by arranging character string images having characters placed in the longitudinal direction. Especially, it is possible to form split images which can be combined into an attractive print image simply by carrying out a split printing operation and then connecting the resulting character images to each other, even if the character string images are long.

Further, in the split image-forming method and device, the length of a long side of an affixing area to which the printed tape (real tape) is to be affixed may be set as an imaginary tape width (imaginary tape length) T0 (T0>0), to thereby create a basic image having a dot width printable within the imaginary tape width T0 as a basic dot width D0.

In this case, since the basic image having a dot width printable within the imaginary tape width T0 as a basic dot width D0 is produced, the basic image is split, whereby it is possible to create split images each made correspondent to an affixing area. That is, according to the tape printing apparatus 1 having the split image-forming method and device applied thereto, a print (basic) image which is made correspondent to an affixing area can be synthesized simply by sequentially printing n split images and then connecting them.

Further, in the split image-forming method and device, a basic image may be created by storing in advance, an image of a reference size, which has m character string images of a reference size arranged therein, determining a ratio of the basic dot width D0 to a dot width in the longitudinal direction of the reference size image, and increasing or decreasing the reference size image at the determined ratio.

That is, as shown in FIGS. 16A to 16C, in the second embodiment, loaded image having the provisional basic dot width F0 is increased or decreased at the ratio G to create a basic image having the basic dot width D0. In the same manner, also in the third embodiment, it is basically possible to produce an image having a desired dot width, if a (reference size) image having a desired character string image of a reference size arranged therein is increased or decreased.

Of course, in the case of the example shown in FIG. 22, a basic image desired to be created is large in size (1000 mm long) and accordingly, when the existing image is used as an image of a reference size, it is normally supposed that the reference size image is increased in size to obtain a basic image. However, it is also possible to produce a small-sized basic image by using such a large-sized image as a reference size image.

According to the above split image-forming method and device, if image data representative of an image having a reference size is stored beforehand, it is possible to form split images of a basic image prepared by increasing or decreasing the reference size image.

Moreover, in any of the above cases, if the tape printing apparatus 1 is configured such that the locations to be split in printing, break points of split printing operations, etc. can be designated, it becomes possible to realize various kinds of ideas for producing labels or the like which are elaborately designed or laid out.

Next, a method of directly creating n split images by using the FIG. 22 image as a basic image will be described. That is, a split image-forming method of producing n split images as n (1<n) image elements in the longitudinal direction of the basic image, and the case in which the split image-forming method or device is applied to the tape printing apparatus 1 is described. The above basic image is formed by arranging m (1≦m) character string images each having characters placed in the longitudinal direction of the basic image.

Figure 19:
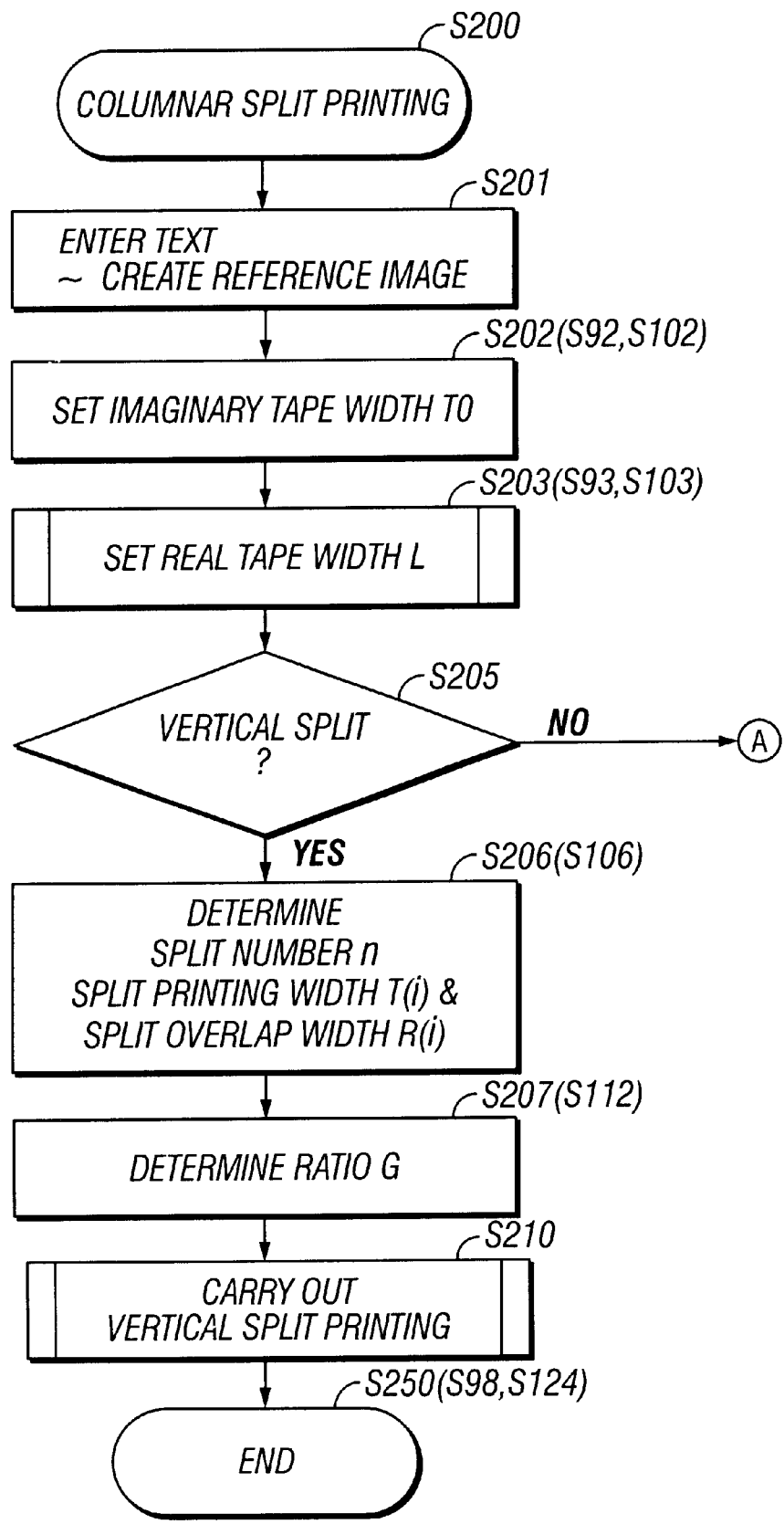
FIG. 19 is a flowchart showing an example of a columnar split printing process.

According to the split image-forming method and device, as shown in FIG. 19, in a columnar split printing process (S200), first, a text entry process to a reference size image-forming process are carried out at a step S201. A reference size image to be prepared here means the reference size image described hereinabove and hence if an existing image is provided, it may be used. Now, description is made assuming that reference size image which has a dot width F0 in the longitudinal direction and is similar in image to the basic image shown in FIG. 22, is formed in response to the entry of text data.

After producing the reference size image at the step S201, an imaginary tape width T0 is set at a step S202. Since this process (corresponding to S92 in FIG. 6 and S102 in FIG. 13) is carried out in the same manner as described above, detailed description thereof is omitted.

When the imaginary tape width T0 is set (S202), next, a real tape width L is set at a step S203 (corresponding to S93 in FIG. 6 and S103 in FIG. 13) and then, it is determined at a step S205 whether or not vertical split printing is to be carried out.

When vertical split printing is not to be carried out (No to S205), the basic image is required to be horizontally split (into a plurality of images in a lateral sequence) and hence the process as described above with reference to FIG. 6 is performed (via A shown in FIGS. 19 and 6).

When the vertical split printing is to be carried out (Yes to S205), next, assuming that a basic dot width D0 in the longitudinal direction of the basic image is a dividend and a real dot width W printable within the real tape L is a divisor, an integer n (n≧Q) which is equal to or larger than a quotient Q (including a decimal portion) is determined as a split number n, while the basic dot width D0 is allocated to n split dot widths D(i) (i=1 to n, where D(i)≦W, and the sum total ΣD(i)=D0), whereby each split printing width T(i) and split overlap width R(i) are determined at step a S206.

The FIG. 22 image is 1000 mm long in a horizontal direction which corresponds to the basic dot width (basic image length) D0=10667 dots (1000 <10667>) and hence, when the real tape width L is equal to 96 mm (corresponding to the real dot width W=1024 dots), for instance, the split number n=11 (Q=10.42) is determined.

In the case of the example shown in FIG. 22, the basic dot width is simply allocated to split images having split dot widths D(1) to D(10)=1024 dots and D(11)=427 dots, so that it is determined at the step S206 that the split printing width T(1) to T(10)=96 mm <1024 dots>, the split printing width T(11)=40 mm <427 dots>, the split overlap width R(1) to R(10)=0 and the split overlap width R(11)=56 mm <597 dots>.

Of course, similarly to the first and second embodiments, it is also possible to equally allocate the basic dot width D0 to the split dot widths D(1) to D(11) to thereby arrange each split overlap width R(i) such that the same is provided at an overlap margin position for connecting split images to each other, when an i-th split image is printed in a split printing area having the split printing width T(i).

After determining the split number n, each split printing width T(i), and split overlap width R(i) at the step S206, a ratio G (=D0/F0) is determined based on a dot width F0 in the longitudinal direction of the reference size image (image of a reference size) and the basic dot width D0, at a step S207 (corresponding to S112 in FIG. 14). In the present case, it is assumed that the ratio G=32 is determined.

Figure 20:
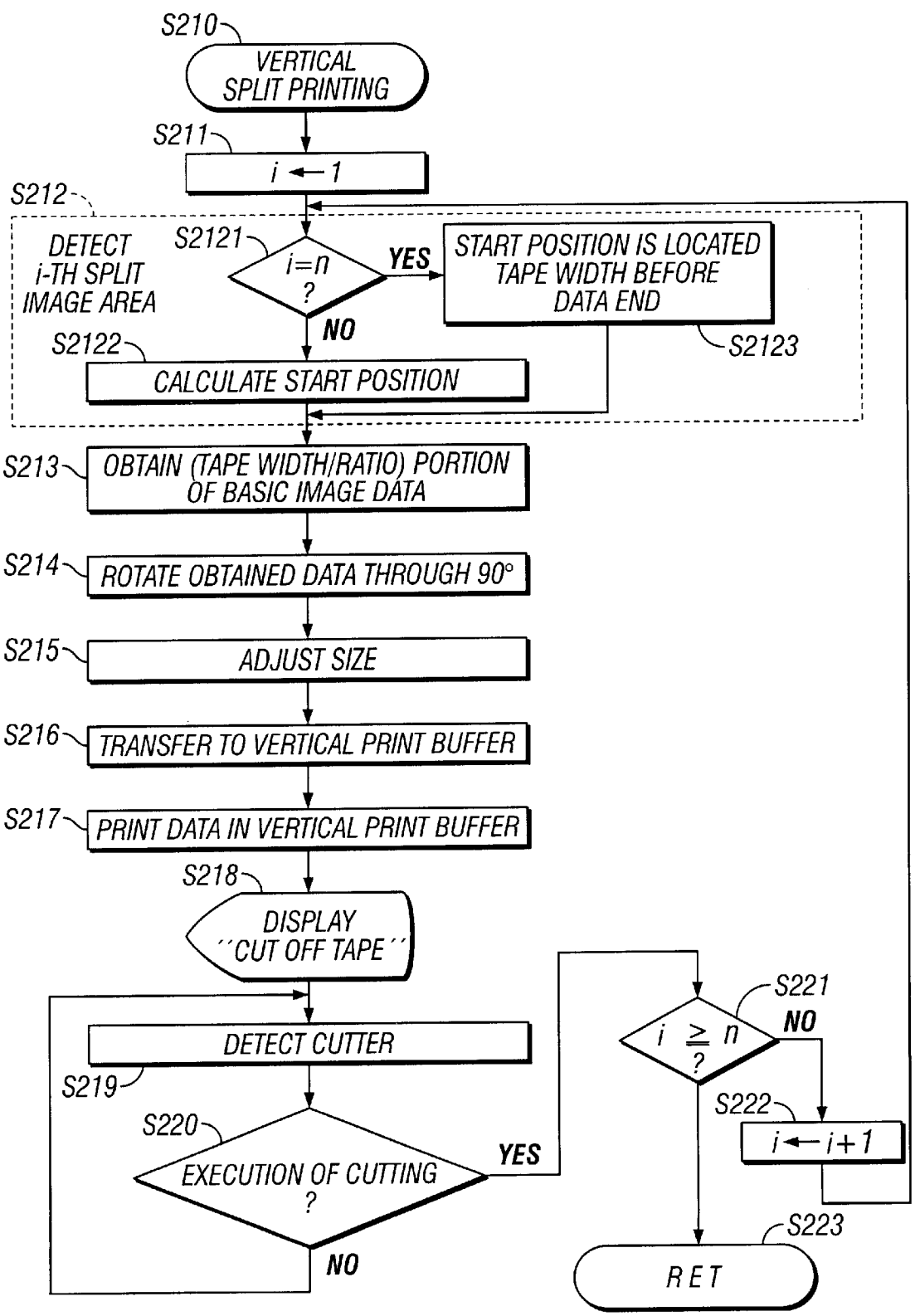
FIG. 20 is a flowchart showing an example of a vertical split printing process carried out in the FIG. 19 process.

After determining the ratio G at the step S207, as shown in FIG. 20, vertical split printing is carried out at a step S210.

When the vertical split printing is started, as shown in FIG. 20, first, a variable i is initialized to 1 at a step S211 and then an area in the reference size image, corresponding to an i-th (i=1) split image is detected at a step S212. A subroutine at the step S212 appearing in the figure will be described hereinafter.

In the case of the example shown in FIG. 22, the first (i=1) split image corresponds to a portion of the basic image which extends from a front end of the basic image through the split dot width d(l). Therefore, at the following step S213, the portion corresponding to the value of the tape width/ratio, i.e. image equal in width to the dot width D(1)/G=1024/32=32 dots is obtained from the front end of the reference size image.

After obtaining a required amount of image from the reference size image at the step S213, the obtained data is rotated through 90 degrees at a step S214. Then, after being increased or decreased in size at step a S215, the data is transferred to a vertical print buffer at a step S216 and image data in the print buffer is printed at a step S217.

Although in the description of the above subroutines (S214 to S217), the process of printing the FIG. 22 split image long in the direction of the width of the basic image in FIG. 22 is explained by using "rotation through 90 degrees", "vertical print buffer" and the like, for purposes of ease of understanding, it is possible to print the split image by employing the print image data buffer, mentioned above in the description of the second embodiment, without rotating the obtained data or using the vertical print buffer, i.e. by sequentially outputting dot information from the top of each of the split images shown in FIG. 22 which are long in the direction of the width of the basic image, for printing.

After printing the first (i=1) split image at the step S217, the message of "CUT OFF TAPE" is displayed on the message screen at a step S218.

Figure 21:
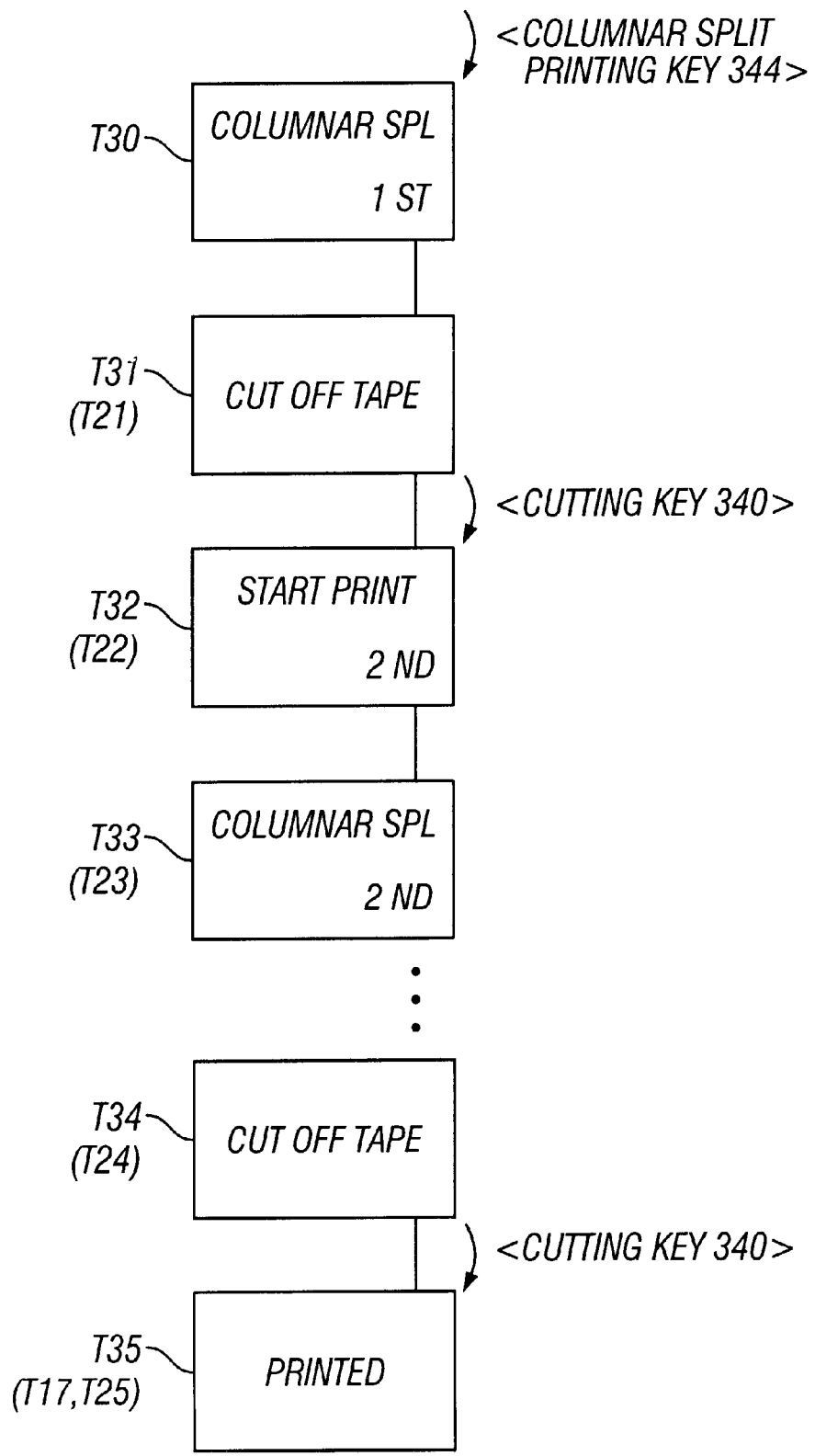
FIG. 21 is a diagram schematically showing images displayed on the screen which are useful in explaining the FIG. 19 columnar split printing process.

Now, also in the present embodiment, similarly to the first and second embodiments described hereinabove, when the columnar split printing key 344 is depressed in the state of another display screen, e.g. a screen in the text display mode, the columnar split printing keyboard interrupt is generated and the columnar split printing (S200) in FIG. 19 is started and carried out. When the vertical split printing process is started, a message "COLUMNAR SPL 1ST" (T30: corresponding to T16 in FIG. 7 and T20 in FIG. 15) is displayed as shown in FIG. 21, to indicate that the columnar split printing is being carried out for a first portion. With the message screen displayed, the vertical split printing processing is carried out, as shown in FIG. 20, and split printing is effected at the step S217, followed by displaying a message "CUT OFF TAPE" for prompting the user to operate the cutting key 340 at the step S218 (T31).

After the message "CUT OFF TAPE" is displayed (S218), a key entry wait state is continued (No to 220) until a tape cutting operation by the cutter 51 is started at a step S219. When the cutting key 340 is operated from the state of the screen T31, the cutter 51 is detected at the step S219 to cut off the tape (Yes to S220) and next, it is determined at a step S221 whether or not n tape strips are produced and cut off, that is, whether or not i≧n holds.

The above subroutines correspond to the cutting operation manually effected by key stroke, described in detail hereinbefore with reference to FIG. 14. Naturally, the automatic tape-cutting operation (corresponding to S121 in FIG. 14) may be carried out.

After terminating the manual (or automatic) tape-cutting operation and producing a first (i=1) tape (label) having a split image with a first (i=1) split dot width D(1) printed thereon at steps S218 to S220, it is determined at the step S221 whether or not n printed tape strips are produced and cut off. Since i=1 holds (No to S221) at this time point, next, i is updated (incremented by 1) at a step S222. Then, a message "START PRINT 2ND" (T32: corresponding to T22 in FIG. 15) is displayed to indicate the start of next printing for a second portion), and a message "COLUMNAR SPL 2ND" (T33: corresponding to T23 in FIG. 15) is displayed to indicate that the vertical split printing is being carried out for the second portion). With the screen T33 displayed, the same process as effected when i=1 is carried out again.

That is, similarly to the case where i=1, an area on a reference size image, corresponding to an i-th (i=2) split image is detected at the step S212. In the case of FIG. 22, a second (i=2) split image corresponds to the split dot width D(2), whose leading end is located at a position shifted from the leading end of the basic image by the split dot width D(1), and hence, at a next step (S213) for obtaining an image in an amount corresponding to (tape width/ratio), the image having the dot width D(2)/G=1024/32=32 dots is obtained from the reference size image, whose leading end is located at a position shifted from the leading end of the reference size image by 32 dots.

After obtaining the required amount of image from the reference size image at the step S213, similarly to the case where i=1, the obtained data is increased or decreased at the ratio G and then, the second (i=2) split image is printed at the steps S214 to S217. After terminating the manual (or automatic) tape-cutting operation and producing a second (i=2) tape (label) having a split image with a second (i=2) split dot width D(1) printed thereon at the steps S218 to S220, it is determined at the step S221 whether or not n printed tape strips are produced and cut off. Since i=2 holds (No to S221) at this time point, next, i is updated (incremented by 1) at the step S222. Thereafter, a message "START PRINT 3RD" is displayed to indicate the start of next printing for a third portion, and then a message "COLUMNAR SPL 3RD" is displayed to indicate that the vertical split printing is being carried out for the third portion). With the message displayed, the same process as effected when i=1 or 2 is carried out again.

In the same manner, ten tapes (labels) from i=1 to 10 are produced and it is determined at the step S221 whether or not n printed tape strips are produced and cut off. Since at this time point i=10 holds (No to S221), i is updated to 11 at the step S222. Thereafter, a message "START PRINT 11TH" is displayed to indicate the start of next printing for a 11th portion, and then a message "COLUMNAR SPL 11TH" is displayed to indicate that the vertical split printing is being carried out for the 11th portion). With the message displayed, the same process as effected when i=1 to 10 is carried out again.

That is, similarly to the case where i=1, an area on a reference size image, corresponding to an i-th (i=11) split image is detected at the step S212. However, in the case of FIG. 22, an eleventh (i=11) split image corresponds to a split dot width D(11)=427 dots (split printing width T(11=40 mm), whose leading end is located at a position shifted from the leading end of the basic image by the sum total of the split dot widths D(1) to D(10) and at the same time, as described above, it is determined that the split overlap width R(11)=56 mm <597 dots>. Accordingly, as viewed in FIG. 22, the eleventh (i=11) split image becomes a split image having a split dot width D(11) formed of a margin alone.

Therefore, an eleventh (11=n) tape (label) may be set as a tape formed of only a margin. Further, when it is desired to avoid printing of a split image having an half-finished or incomplete kind of dot number on a last (n-th) tape or just printing on a margin, as shown in FIG. 20, a subroutine (S212) may be carried out for detecting an i-th split image-printing area. In this subroutine, it is determined at a step S2121 whether or not i=n holds. When i≠ (or <) n (No to S2121), a start position for printing is detected at the step S2122, whereas when i=n (Yes to S2121), the start position is located or set a tape width before a trailing end of the basic image, that is, the split printing width TS(11) or a split dot width DS(11) shown in FIG. 22 may be set to a last (n-th) split image to be printed.

Now, description is made assuming that a split image having the split dot width DS(11) extending forward from the trailing end of the basic image, as viewed in FIG. 22, is printed.

In the above process, the area in the reference size image corresponding to the i-th (i=11) split image is detected at the step S212. In the case of FIG. 22, the eleventh (i=11) split image has the split dot width D(11), whose leading end is located at a position shifted from the trailing end of the basic image by the split dot width DS(11), and hence, at the next step (S213) for obtaining an image in an amount corresponding to (tape width/ratio), an image having the dot width DS(11)/G=1024/32=32 dots is obtained, whose leading end is located at a position shifted from the trailing end of the basic image by 32 dots.

After obtaining required amount of image from the reference image at the step S213, similarly to the cases where i=1 to 10, the obtained image data is increased or decreased at the ratio G and then, the eleventh (i=11) split image is printed at the steps S214 to S217. After terminating the manual (or automatic) tape-cutting operation and producing an eleventh (i=11) tape (label) having a split image with the eleventh (i=11) split dot width DS(11) printed thereon at the steps S218 to S220, it is determined at the step S221 whether or not n printed tape are strips produced and cut off. Since i=11 (≧n) (Yes to S221) at this time point, next, the message "PRINTED" is displayed (T35) and the vertical split printing subroutine (S210) in FIG. 20 is terminated at a step S223, followed by terminating the whole process of the columnar split printing (S200) in FIG. 19 at a step S250.

The eleven (n=11) tape strips (labels) prepared as described above are affixed to a desired affixing area and connected to each other to form a large label (having the basic image printed thereon). In this process, the tenth and eleventh labels are affixed using the split overlap width R(11) as an overlap margin such that identical images printed on the respective labels are placed one upon the other.

As described above, according to the split image-forming method and device, the basic dot width D0 in the longitudinal direction of the basic image having m character string images (1≦m, m (=2) character string images different in size in FIG. 22) arranged therein is allocated to n split dot widths D(i) (i=1 to n, where D(i)≦W, and the sum total ΣD(i)=D0), whereby n split images each having a split dot width D(i) are produced.

In the above process, each split image can be printed on the real tape having the real tape width L and according to the tape printing apparatus 1 having the split image-forming method and device applied thereto, the whole print (basic) image can be printed simply by printing each split image sequentially. Further, connecting portions for connecting split images are formed in the direction of the width of each character string image (vertical direction), which prevents the connecting portions from being displaced together, whereby print images can be combined with ease.

As a result, according to the split image-forming method and device, it is possible to form a plurality of split images each printable on tape strips, as a plurality of image elements in a longitudinal sequence of a print (basic) image containing character string images comprised of characters arranged in the longitudinal direction. More particularly, it is possible to form split images which can be combined into an attractive print image simply by carrying out a split printing operation and then connecting the printed tape strips to each other, even if the character string images are long.

Further, in the split image-forming method and device, the length of a long side of an affixing area to which a printed tape (real tape) is to be affixed is set as an imaginary tape width (imaginary tape length) T0 (T0>0) and a dot width printable within the imaginary tape width T0 is set as a basic dot width (basic image length) D0, while only each portion of the m character string images, which can be arranged within the split dot width D(i), is developed or loaded, whereby an i-th split image adapted to the affixing area is produced.

Therefore, according to the tape printing apparatus 1 having the split image-forming method and device applied thereto, a print (basic) image adapted to an affixing area can be synthesized simply by sequentially printing n split images sequentially for connection. Further, an i-th split image is printed immediately after it is formed and such a printing operation is repeatedly carried out n times, therefore, only one split image is required for one split printing operation, so that the capacity of the memory device can be saved. Moreover, the creation and printing of split images can be successively performed in parallel with each other, thereby enhancing processing speed of the apparatus.

Further, in the split image-forming method and device, a reference size image, which has m character string images of a reference size arranged therein, is stored in advance and a portion of the reference size image which can be arranged within the split dot width D(i) (i=1 to n) is increased or decreased in size at a ratio G determined from a dot width F0 in the longitudinal direction of the reference size image and the basic dot width D0, whereby an i-th split image is produced.

In the above process, if the reference size image is stored, it is possible to create split images of the basic image by increasing or decreasing the size of the reference size image, and hence, split images can be also produced by using an existing image as the reference size image.

Further, in the split image-forming method and device, the length of a long side of an affixing area to which a printed tape (real tape) is to be affixed is set as an imaginary tape width (imaginary tape length) T0 and a dot width printable within the imaginary tape width T0 is set as a basic dot width (basic image length) D0 whereby a ratio G is determined from a dot width F0 in the longitudinal direction of a reference size image and the basic dot width D0. However, the ratio G may be determined by setting the length of a short side of the affixing area to an imaginary tape width T0 and a dot width of the imaginary tape width T0 to a basic dot width D0.

Figure 23:
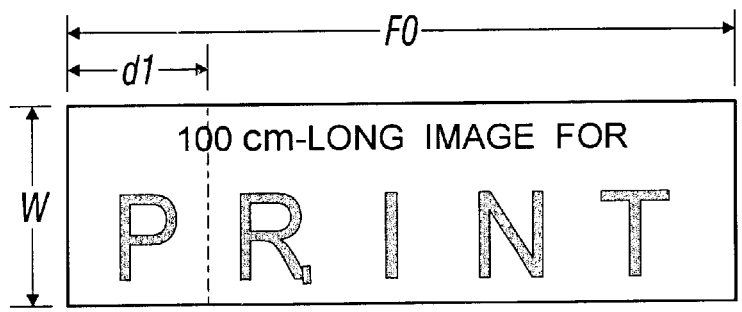
FIG. 23 shows an example of a reference size image.

That is, as viewed in FIG. 23, e.g. when the image of a reference size having a real dot width W printable within a real tape width L is available as the existing image data, the length of a short side of the affixing area may be set to an imaginary tape width T0, and a ratio G can be determined from the basic dot width D0 corresponding to the imaginary tape width T0 and the real dot width W in the direction of the width of the reference size image.

Further, in the above case, if the real tape width L (e.g. 96 mm) can be detected, the maximum dot width in the direction of the width of the reference size image, which can be printed on the real tape T, that is, the real dot width W (1024 dots) is unconditionally determined. Therefore, even if the reference size image does not actually exist, so long as the ratio G is determined from the basic dot width D0 of the imaginary tape width T0 and the real dot width W, for increasing or decreasing the size of the image at the ratio G, it is possible to print the resulting image within the imaginary tape width T0.

For instance, assuming that the same value as set in the above-mentioned first and second embodiments is set to the imaginary tape width T0, that is, the imaginary tape width T0=240 mm <D0=2560 dots> is set and at the same time the real tape width L=96 mm <1024 dots> (S93 in FIG. 6, the value is set based on information of the type of a tape T mounted in the apparatus, similarly to the case of S103 in FIG. 13) is set, the ratio G=240/96 <2560/1024>=2.5 is obtained. Accordingly, by developing or loading character string images in the same manner as carried out in creating a print image having the real dot width W to carry out a normal printing operation on the real tape T having the real tape width L, but at the same time by changing the size based on the ratio=2.5, it is possible to create a basic image whose short side has a basic dot width D0=2560 dots.

The above real dot width W=1024 dots is the maximum dot width printable within the real tape width L=96 mm and hence, so long as a print image has a dot width printable within the real tape width L=96 mm, even if the print image is expanded at the ratio=2.5, as described above, the resulting or expanded print image becomes a basic image printable within the imaginary tape width T0=240 mm.

In the above process, at the time point a portion of the basic image corresponding to a portion of the reference size image having a dot width d(1) in FIG. 23, for instance, is prepared, split images having a first (i=1) split printing width T(1) and a second (i=2) split printing width T(2), shown in FIG. 22, can be produced, which enables the first and second spit images to be directly printed. This makes it possible not only to save the capacity of a memory device for storing split image data items representative of respective split images, but also to dispense with or require only part of the capacity of the memory device for storing data of the reference size image, whereby the capacity of the memory device can be further saved. At the same time the creation and printing of each image can be performed in parallel with each other, thereby further enhancing processing speed of the apparatus.

Moreover, in the above process, when it is not required to take into account the length of a long side of an affixing area, it is possible to start the creation and printing of a split image, even without determining a split number or the like (i.e. even when S206 in FIG. 19 is omitted). In this case, an end of text data to be loaded as an image may be detected or it may be determined whether or not printing of the end of text data has been terminated, instead of effecting the subroutine at the step S2121 in FIG. 20. Further, subroutines at the steps S211 and S222 may be omitted.

According to the split image-forming method and device of the third embodiment and in the above cases, each split overlap width R(i) and/or each split printing width T(i) (i=1 to n) is/are allocated in a real tape width L and an i-th split image is printed in a split printing area having the split printing width T(i), whereby each of n split images can be suitably printed in the split printing area.

Further, instead of splitting the basic image, as described above with reference to FIG. 22 of the third embodiment, similarly to the first and second embodiments, it is also possible to equally allocate a basic dot width D0 to split dot widths D(1) to D(11) and assign each split overlap width R(i) to an overlap margin position of a tape strip for connecting an i-th split image printed in a split printing area of the tape strip having each split printing width T(i) to an adjacent one.

In the above case, it is possible to produce a label or the like having a basic image printed thereon, simply by connecting split images to each other by using each split overlap width R(i) as an overlap margin for connecting an i-th split image to an (i−1)-th split image printed immediately before printing the i-th split image and/or an (i+1)-th split image printed immediately after printing the i-th split image.

In this case, since split images are connected to each other by using overlap margins, it is possible to prevent the inconvenience that a background color of an affixing area is viewed through a gap between connected images, thereby producing more attractive labels.

Figure 17B:
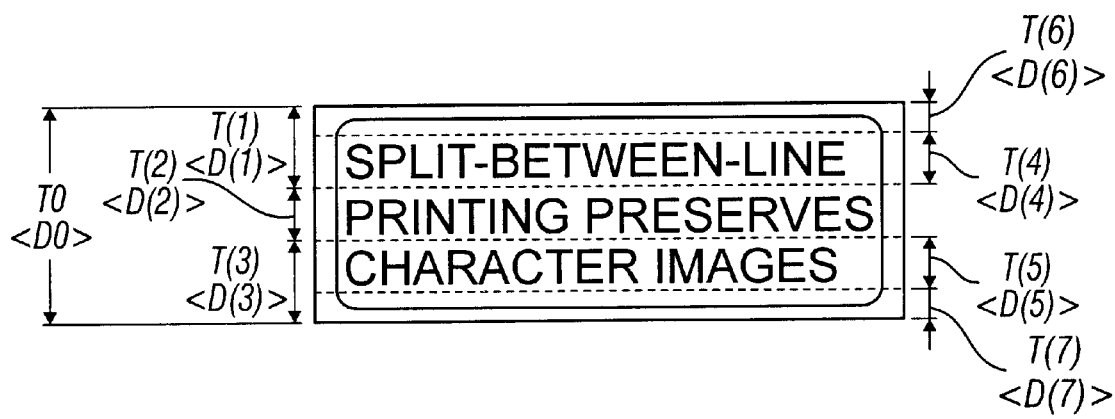

Moreover, if the split number and the split overlap widths R(i), described above, are adjusted to split images such that respective characters, e.g. on a first line are allocated in respective split printing widths T(i), that is, such that split image-connecting portions are located between characters, the connecting portions are made more inconspicuous, thereby improving the impression of labels (see FIG. 24). The above splitting method can be also applied to a case where a basic image is split horizontally i.e. in the direction of the length of lines instead of splitting the same vertically, i.e. in a direction transverse to the direction of the length of character strings or lines, when each character on each line is uniform in size, as shown in FIG. 17B. This makes it possible to obtain the same effects as obtained by the above split-between-lines method. The character string-splitting method becomes advantageous, particularly when respective lines in the figure are long.

It goes without saying that, also in this case, an actual print image adjusted to the real tape width L may be produced in advance before a printing operation, or instead of allocating each split printing width T(i) and split overlap width R(i), corresponding split dot width D(i) and split margin dot width E(i) may be allocated in the actual print image. This makes it possible to produce labels having more excellent appearance, by using overlap margins, thereby further increasing the above-mentioned advantageous effects of the present embodiment.

Moreover, if the tape printing apparatus 1 is configured such that the portions of the basic image to be split, break points of split printing operations can be designated when a printing operation is carried out, it becomes possible to realize various kinds of ideas for producing labels to thereby create labels or the like which are elaborately designed or laid out.

Although split overlap widths R(i) and split margin dot widths E(i) in the above embodiment are assumed to be for blank images, this is not limitative, but, similarly to the idea of processing described hereinabove with reference to FIG. 20, portions of split images, which correspond to the split overlap widths R(i) and the split margin dot widths E(i), may be produced in an overlapping manner such that identical or overlapping image portions are pasted to each other after printing. In this process, e.g. when one of the above identical portions is printed in a faint color, it is possible to paste the other or darker one onto the faint one, ensuring a proper affixing procedure.

Further, if a faint dotted line is provided to divide an overlap margin or a margin from a split image, it serves as a mark useful in connecting split images to each other. The dotted line is particularly useful not in the above overlapping printing but in a case where a connecting position has to be positively indicated, e.g. when a split image formed of only a margin is or blank prepared (such as the FIG. 20 processing carried out when i=11).

Although in the above respective embodiments, for purposes of ease of programming, it is assumed that a split image corresponding to the suffix (i) is produced and printed on an i-th occasion and hence split images are prepared and printed from a first (i=1) split image, in increasing order of number, it goes without saying that split images may be prepared and printed in decreasing order of number or in desired order regardless of the above orders.

It should be noted that other construction in the tape printing apparatus 1 can be applied in various fashions.

For instance, it is also possible to create a print image represented by print image data by providing the tape printing apparatus with an image registration function which permits selective designation of registered print images having letters and symbols entered via a keyboard, registered nonstandard characters, a predetermined outer frame or the like arranged therein, and dot numbers or dot groups of print images displayed on a display screen, to thereby plot the same by key entry made by the shift key 327 or the like. The tape printing apparatus 1 can also split such print images.

Further, although in FIG. 5, description is made basically of interrupt handling responsive to key entries, this is not limitative, but it goes without saying that the same control process can be realized by other methods, such as a method of management of independent programs for respective different processes, by multitask processing.

Although in the above embodiments the split image-forming method and device and the split image-printing method and device for printing split images according to the invention are applied to a tape printing apparatus of an ink jet type, this is not limitative, but the same can be applied to a tape printing apparatus of a sublimation transfer type for sublimating ink by using a heating element of a thermal head or of a melting transfer type.

As described above, according to the split image-forming method and the split image-printing method and their devices in the tape printing apparatus of the invention, it is possible to create a plurality of split images each printable on a tape, as elementary images constructing a print (basic) image which is larger in width than a tape and has character string images arranged in a background image including an outer frame and a background pattern, more particularly to form split images with excellent appearance when connected to each other after split printing, thereby printing the split images.

It is further understood by those skilled in the art that the foregoing are preferred embodiments of the invention, and that various changes and modification may be made without departing from the spirit and scope thereof.

What is claimed is:

1. A method of printing split images on a tape by a tape printing apparatus, comprising the steps of:

detecting a basic image width D0 representative of a width of a basic image which contains m (m is an integer equal to or larger than 1) lines of character string images and a background image formed exclusively by an outer frame and having said m lines of character string images arranged therein;

detecting provisional split image widths PRD(j) (j is an integer from 1 to m) each representative of a width of each of said m lines of character string images;

determining whether or not said basic image width D0 is larger than a tape image width W corresponding to a real tape width as a width of said tape, and at the same time all of said provisional split image widths PRD(j) are each smaller than said tape image width W; and dividing said basic image width D0 into n (n is an integer larger than 1, and at the same time m≦n) split image widths D(i) (i is an integer, provided that D(i)≦W) representative of respective widths of n split images including m split images containing said m lines of character string images, respectively, on condition that it is determined that said basic image width D0 is larger than said tape image width W, and at the same time said all of said provisional split images widths PRD(j) are each smaller than said tape image width W, to thereby divide said basic image into said n split images in a manner such that said m lines of character images can be separately printed on said tape without splitting any of said lines, the outer frame being split and each line of character string images being un-split, the split number n=line numbers m+2; and a printing step of allocating at least one of a split printing width T(i) corresponding to said split image width D(i) and a split overlap width R(i)(R(i)=L−T(i)) as a width of a margin, in said real tape width L, to thereby print said n split images on said tape separately from each other by correlating an i-th split image of said n split images to a split printing area having said split printing width T(i) on said tape.

2. A method of printing split images on a tape by a tape printing apparatus, comprising:
   the steps of:
   storing a background image which has a provisional basic image width F0 and is formed exclusively by an outer frame;
   assuming that m (m is an integer equal to or larger than 1) character string images having respective m provisional image widths F(j) (j is an integer from 1 to m) each representative of a width of a corresponding one of said character string images are arranged in said background image, calculating n (n is an integer equal to or larger than m) provisional split image widths F(i) (i is an integer, provided that a sum total $\Sigma F(i)=F0$) representative of respective widths of n split images, said n provisional split image widths F(i) including said m provisional image widths F(j), and a maximum provisional split image width F(k) (k is an integer from 1 to n) of said n provisional split image widths F(i);
   setting a real tape width L as a width of said tape;
   determining a ratio G ($G \leq W/F(k)$) based on which each of said split images should be increased or decreased in size in a manner such that one of said split images having said maximum provisional split image width F(k) can be arranged within a tape image width W representative of said real tape width L; and
   dividing said background image into n split background images each having a split image width D(i) (provided that $D(i)=G \times F(i)$) representative of a width of a corresponding one of said n split background images, based on said ration G, and at the same time arranging said character string images in respective corresponding ones of said split background images based on said ratio G, to thereby form n split images each having said split image width D(i), the outer frame being split and the character string images being in lines which are un-split, the split number n=line numbers m+2; and
   a printing step of allocating at least one of a split printing width T(i) corresponding to said split image width D(i) and a split overlap width R(i)($R(i)=L-T(i)$) as a width of a margin, in said real tape width L, to thereby print said n split images on said tape separately from each other by correlating an i-th split image of said n split images to a split printing area having said split printing width T(i) on said tape.

3. A method according to claim 1 or 2, wherein said printing step includes assigning said split margin width R(i) to at least one of a top overlap margin position and a bottom overlap margin position for use in connecting an i-th split image printed said tape to at least one of an (i−1)-th split image printed immediately before printing said i-th split image and an (i+1)-th split image printed immediately after printing said i-th split image in the direction of a width of said tape.

4. A method according to claim 1 or 2, further including an actual print image-forming step of allocating at least one of said split image width D(i) and a split margin image width E(i)($E(i)=W-D(i)$) representative of a width of a margin, in each of n image areas each having said tape image width W, and assigning an i-th split image of said split images to an area having said split image width D(i) within a corresponding one of said n image areas, to thereby produce n actual print images each having said tape image width W; and
   said printing step includes printing said n actual print images on said tape separately from each other.

5. A method according to claim 4, wherein said actual print image-forming step includes assigning said split margin image width E(i) to at least one of an upper margin position and a lower margin position where adjacent ones of said actual print images overlap, when said i-th split image is connected to at least one of an (i−1)-th split image and an (i+1)-th split image in the direction of a width thereof.

6. A split image-printing device for a tape printing apparatus, which prints split images on a tape, comprising:
   a first detecting section for detecting a basic image width D0 representative of a width of a basic image which contains m (m is an integer equal to or larger than 1) lines of character string images and a background image formed exclusively by an outer frame and having said m lines of character string images arranged therein;
   a second detecting section for detecting provisional split image widths PRD(j) (j is an integer from 1 to m) each representative of a width of each of said m lines of character string images;
   a determining section for determining whether or not said basic image width D0 is larger than a tape image width W corresponding to a real tape width as a width of said tape, and at the same time all of said provisional split image widths PRD(j) are each smaller than said tape image width W; and
   a dividing section for dividing said basic image width D0 into n (n is an integer larger than 1, and at the same time $M \leq n$) split image widths D(i) (i is an integer, provided that $D(i) \leq W$) representative of respective widths of n split images including m split images containing said m lines of character string images, respectively, on condition that it is determined that said basic image width D0 is larger than said tape image width W, and at the same time said all of said provisional split image widths PRD(j) are each smaller than said tape image width W, to thereby divide said basic image into said n split images in a manner such that said m lines of character images can be separately printed on said tape without splitting any of said lines, the outer frame being split and each line of character string images being un-split, the split number n=line numbers m+2; and
   a printing device for allocating at least one of a split printing width T(i) corresponding to said split image width D(i) and a split overlap width R(i)($R(i)=L-T(i)$) as a width of a margin, in said real tape width L, to thereby print said n split images on said tape separately from each other by correlating an i-th split image of said n split images to a split printing area having said split printing width T(i) on said tape.

7. A split image-printing device for a tape printing apparatus, which prints split images on a tape, comprising:
   a storage device for storing a background image which has a provisional basic image width F0 and is formed exclusively by an outer frame;
   a calculating section for, assuming that m (m is an integer equal to or larger than 1) character string images having respective m provisional image widths F(j) (j is an integer from 1 to m) each representative of a width of a corresponding one of said character string images are arranged in said background image, calculating n (n is an integer equal to or larger than m) provisional split image widths F(i) (i is an integer, provided that a sum total $\Sigma F(i)=F0$) representative of respective widths of n split images, said n provisional split image widths F(i) including said m provisional image widths F(j), and a maximum provisional split image width F(k) (k is an integer from 1 to n) of said n provisional split image widths F(i);

a tape width-setting section for setting a real tape width L as a width of said tape;

a ratio-determining section for determining a ratio G (G≦W/F(k)) based on which each of said split images should be increased or decreased in size in a manner such that one of said split images having said maximum provisional split image width F(k) can be arranged within a tape image width W representative of said real tape width L; and a split image-forming section for dividing said background image into n split background images each having a split image width D(i) (provided that D(i)= G×F(i)) representative of a width of a corresponding one of said n split background images, based on said ratio G, and at the same time arranging said character string images in respective corresponding ones of said split background images based on said ratio G, to thereby form n split images each having said split image width D(i), the outer frame being split and the character string images being in lines which are un-split, the split number n=line numbers m+2; and a printing device for allocating at least one of a split printing width T(i) corresponding to said split image width D(i) and a split overlap width R(i) (R(i)=L−T(i)) as a width of a margin, in said real tape width L, to thereby print said n split images on said tape separately from each other by correlating an ith split image of said n split images to a split printing area having said split printing width T(i) on said tape.

8. A split image-printing device according to claim 6 or 7, wherein said printing device includes an assigning section for assigning said split margin width R(i) to at least one of a top overlap margin position and a bottom overlap margin position for use in connecting an i-th split image printed said tape to at least one of an (i−1)-th split image printed immediately before printing said i-th split image and an (i+1)-th split image printed immediately after printing said i-th split image in the direction of a width of said tape.

9. A split image-printing device according to claim 6 or 7, further including an actual print image-forming section for allocating at least one of said split image width D(i) and a split margin image width E(i)(E(i)=W−D(i)) representative of a width of a margin, in each of n image areas each having said tape image width W, and assigning an i-th split image of said split images to an area having said split image width D(i) within a corresponding one of said n image areas, to thereby produce n actual print images each having said tape image width W, and wherein said printing device includes means for printing said n actual print images on said tape separately from each, other.

10. A split image-printing device according to claim 9, wherein said actual print image-forming section includes an assigning section for assigning said split margin image width E(i) to at least one of an upper margin position and a lower margin position where adjacent ones of said actual print images overlap, when said i-th split image is connected to at least one of an (i−1)-th split image and an (i+1)-th split image in the direction of a width thereof.

* * * * *